(12) United States Patent
Kameyama

(10) Patent No.: US 8,532,394 B2
(45) Date of Patent: Sep. 10, 2013

(54) IMAGE PROCESSING APPARATUS, IMAGE PROCESSING METHOD AND COMPUTER READABLE MEDIUM

(75) Inventor: Hirokazu Kameyama, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/426,425

(22) Filed: Mar. 21, 2012

(65) Prior Publication Data

US 2012/0236937 A1 Sep. 20, 2012

Related U.S. Application Data

(60) Division of application No. 12/690,025, filed on Jan. 19, 2010, now Pat. No. 8,363,953, which is a continuation of application No. PCT/JP2008/063226, filed on Jul. 16, 2008.

(30) Foreign Application Priority Data

| Jul. 20, 2007 | (JP) | ................................ | 2007-190149 |
| Sep. 10, 2007 | (JP) | ................................ | 2007-234756 |
| Jun. 5, 2008 | (JP) | ................................ | 2008-148576 |
| Jun. 5, 2008 | (JP) | ................................ | 2008-148584 |

(51) Int. Cl.
*G06K 9/46* (2006.01)
*G06K 9/66* (2006.01)

(52) U.S. Cl.
USPC ....... 382/195; 375/240.08; 382/239; 382/248

(58) Field of Classification Search
USPC .................... 375/240.08; 382/195, 232, 239, 382/248
See application file for complete search history.

(56) References Cited

U.S. PATENT DOCUMENTS

| 5,915,046 | A  | * | 6/1999 | Echigo et al. ................. | 382/248 |
| 5,926,572 | A  |   | 7/1999 | Kim et al. | |
| 6,671,411 | B1 | * | 12/2003 | Satoh ............................ | 382/239 |
| 6,798,834 | B1 |   | 9/2004 | Murakami et al. | |
| 7,020,335 | B1 | * | 3/2006 | Abousleman ................. | 382/199 |
| 7,120,304 | B2 | * | 10/2006 | Funamoto ..................... | 382/239 |
| 7,315,652 | B2 | * | 1/2008 | Takahashi et al. ............ | 382/233 |
| 7,493,138 | B2 | * | 2/2009 | Nagatomo et al. ......... | 455/550.1 |
| 7,558,466 | B2 | * | 7/2009 | Kishi ............................ | 386/343 |
| 7,697,036 | B2 | * | 4/2010 | Omata ....................... | 348/220.1 |

(Continued)

FOREIGN PATENT DOCUMENTS

| JP | 7-222145 A | 8/1995 |
| JP | 8-18976 A | 1/1996 |

(Continued)

OTHER PUBLICATIONS

Yang et al., "MPEG-4 based Stereoscopic and Multiview Video Coding," Proceedings of 2004 International Symposium on Intelligent Multimedia, Video and Speech Processing, Oct. 20, 2004, pp. 61-64, XP010801384.

*Primary Examiner* — Gregory M Desire
(74) *Attorney, Agent, or Firm* — Birch, Stewart, Kolasch & Birch, LLP.

(57) ABSTRACT

An image processing apparatus includes an encoding manner storing section that stores encoding manners in association with quantities of characteristics of objects, a characteristic region detecting section that detects a plurality of characteristic regions from an image, and a compressing section that compresses the images of the plurality of characteristic regions by encoding manners stored in the encoding manner storing section in association with the quantities of characteristics of objects included in the plurality of characteristic regions respectively.

14 Claims, 34 Drawing Sheets

(56) References Cited

U.S. PATENT DOCUMENTS

| | | | |
|---|---|---|---|
| 8,363,953 B2 * | 1/2013 | Kameyama | 382/195 |
| 2001/0021274 A1 * | 9/2001 | Lee | 382/240 |
| 2003/0122942 A1 | 7/2003 | Parker et al. | |
| 2006/0017835 A1 * | 1/2006 | Jacobsen | 348/345 |
| 2006/0140279 A1 | 6/2006 | Murakami et al. | |
| 2006/0165305 A1 * | 7/2006 | Hasebe et al. | 382/243 |
| 2006/0204057 A1 * | 9/2006 | Steinberg | 382/118 |
| 2006/0280380 A1 | 12/2006 | Li | |
| 2007/0121720 A1 | 5/2007 | Yamane et al. | |
| 2007/0133891 A1 | 6/2007 | Jeong | |
| 2007/0165951 A1 | 7/2007 | Akahori et al. | |
| 2008/0089072 A1 | 4/2008 | Kim et al. | |
| 2008/0263012 A1 * | 10/2008 | Jones | 707/3 |
| 2012/0236937 A1 * | 9/2012 | Kameyama | 375/240.08 |

FOREIGN PATENT DOCUMENTS

| | | |
|---|---|---|
| JP | 8-79756 A | 3/1996 |
| JP | 9-186996 A | 7/1997 |
| JP | 10-70716 A | 3/1998 |
| JP | 10-126778 A | 5/1998 |
| JP | 2828977 B2 | 11/1998 |
| JP | 11-262018 A | 9/1999 |
| JP | 2000-261794 A | 9/2000 |
| JP | 2003-189242 A | 7/2003 |
| JP | 2003-250132 A | 9/2003 |
| JP | 2004-88615 A | 3/2004 |
| JP | 2006-350498 A | 12/2006 |
| JP | 2007-88897 A | 4/2007 |
| JP | 2007-158410 A | 6/2007 |
| JP | 2007-166617 A | 6/2007 |
| JP | 2007-188419 A | 7/2007 |
| JP | 2009-230703 A | 10/2009 |
| JP | 2009-230704 A | 10/2009 |
| JP | 2009-245207 A | 10/2009 |
| JP | 2009-251892 A | 10/2009 |
| WO | WO 2004/080050 A2 | 9/2004 |
| WO | WO 2007/047250 A2 | 4/2007 |

* cited by examiner

| MOVING SPEED | TEMPORAL RESOLUTION INDEX |
|---|---|
| HIGH ↓ LOW | HIGH ↓ LOW |

FIG. 9

| FACING DIRECTION | FACE ELEMENT MATCHING DEGREE | INFO AMOUNT |
|---|---|---|
| FORWARD-OBLIQUE ↓ BACKWARD | HIGH ↓ LOW | LARGE ↓ SMALL |

*FIG. 10*

| OBJECT CATEGORY | ENCODING MODE | DIRECTION OF INTRA-PREDICTION | UNIT OF MOTION COMPENSATION | MB SIZE (PER AREA) |
|---|---|---|---|---|
| FACE | INTRA-ENCODING | PREDICTION MODE 2 | 0.5 PIXEL | 4×4 |
| HUMAN BODY | INTRA-ENCODING | PREDICTION MODE 0 | 1 PIXEL | 8×8 |
| CAR REGISTRATION PLATE | INTER-ENCODING | PREDICTION MODE 0 | 0.5 PIXEL | 4×4 |
| CAR | INTRA-ENCODING | PREDICTION MODE 1 | 1 PIXEL | 8×8 |
| * | INTER-ENCODING | PREDICTION MODE 2 | 2 PIXELS | 16×16 |

FIG. 25

QUANTIZING STEP CORRECTION VALUE Δquv
(OBJECT CATEGORY, IMAGE COMPLEXITY, ENCODING DIFFERENCE)

| OBJECT CATEGORY | DIRECTION OF INTRA-PREDICTION | DEGREE OF PRIORITY |
|---|---|---|
| FACE | PREDICTION MODE 1 | 1 |
| | PREDICTION MODE 2 | 2 |
| | PREDICTION MODE 0 | 3 |
| | ⋮ | ⋮ |
| HUMAN BODY | PREDICTION MODE 0 | 1 |
| | PREDICTION MODE 2 | 2 |
| | PREDICTION MODE 1 | 3 |
| | ⋮ | ⋮ |

FIG. 28

IMAGE PROCESSING APPARATUS, IMAGE PROCESSING METHOD AND COMPUTER READABLE MEDIUM

CROSS REFERENCE TO RELATED APPLICATION

This application is a Divisional of copending U.S. application Ser. No. 12/690,025, filed on Jan. 19, 2010, which is a continuation application of PCT/JP2008/063226 filed on Jul. 16, 2008 which claims priority from a Japanese Patent Applications
NO. 2007-190149 filed on Jul. 20, 2007,
NO. 2007-234756 filed on Sep. 10, 2007,
NO. 2008-148576 filed on Jun. 5, 2008 and
NO. 2008-148584 filed on Jun. 5, 2008
the contents of which are incorporated herein by reference. This patent application incorporates herein by reference the contents of Japanese Patent Applications No. 2008-078636 filed on Mar. 25, 2008, No. 2008-078641 filed on Mar. 25, 2008, No. 2008-091562 filed on Mar. 31, 2008, and No. 2008-098600 filed on Apr. 4, 2008.

BACKGROUND

1. Technical Field

The present invention relates to an image processing apparatus, an image processing method and a computer readable medium. More particularly, the present invention relates to an image processing apparatus and an image processing method for processing images, and a computer readable medium for use in the image processing apparatus.

2. Description of the Related Art

A known moving image coding apparatus compares a coded screen image and a to-be-coded screen image in order to identify a changed region within the screen, divides the to-be-coded screen image into a plurality of image blocks, and codes image blocks including the changed region, for example, as disclosed in Japanese Patent No. 2828977. When coding the image blocks including the changed region, this moving image coding apparatus assigns a larger number of information bits to image blocks containing a further limited region of the changed region than to image blocks containing the remaining region of the changed region. Also, a known digital image generating method generates additional information relating to the importance of a subject of a digital image and a background region corresponding to the subject, and saves a compressed digital image resulting from compressing the digital image in association with the additional information, for example, as disclosed in Japanese Patent Application Publication No. 2003-250132. There is a known video recorder/player that changes the level of compressing input data dynamically according to the importance of the data, and stores important data with a small compression level (see, e.g., Japanese Patent Application Publication No. 2003-189242). Further, there is a known moving image compressor that keeps the image of a monitored object displayed on the screen of a monitor clear even when the image data supplied from the monitoring camera includes a large motion, to allow the viewer to sufficiently observe the situation of the monitored area (see, e.g., Japanese Patent Application Publication No. 10-70716).

The techniques disclosed in the above-mentioned patent documents, however, can not compress each of a plurality of regions according to the character of the region. The invention of Japanese Patent Application Publication No. 2003-189242 determines a motion vector based on a displacement vector of a moving region. The invention of Japanese Patent Application Publication No. 10-70716 can increase the quantization coarseness of a moving region. However, the techniques of Japanese Patent Application Publication No. 2003-189242 and Japanese Patent Application Publication No. 10-70716 cannot compress images with a suitable compression rate, because the techniques cannot compress and code any object in a moving region in a way adapted to the object.

SUMMARY

Therefore, it is an object of an aspect of the innovations herein to provide an image processing apparatus, an image processing method and a computer readable medium which are capable of overcoming the above drawbacks accompanying the related art. The above and other objects can be achieved by combinations described in the independent claims. The dependent claims define further advantageous and exemplary combinations of the innovations herein.

According to the first aspect related to the innovations herein, one exemplary image processing apparatus may include a characteristic region detecting section that detects a plurality of characteristic regions in an image, a condition storing section that stores thereon assignment conditions differing in accordance with characters of characteristic regions, so that different compression strengths are assigned in accordance with the characters of the characteristic regions, a compressing section that respectively compresses a plurality of characteristic region images which are images of the plurality of characteristic regions, and a compression control section that controls compression strengths at which the compressing section respectively compresses the plurality of characteristic region images, in accordance with characters of the plurality of characteristic regions, with reference to the conditions stored on the condition storing section.

The characteristic region detecting section may detect the plurality of characteristic regions in a plurality of moving-image-component images included in a moving image. The compression control section may control the compression strengths at which the compressing section respectively compresses the plurality of characteristic region images in accordance with the characters of the plurality of characteristic regions, with reference to the conditions stored on the condition storing section.

The condition storing section may store thereon the conditions differing in accordance with types of the characteristic regions. The compression control section may control the compression strengths at which the compressing section respectively compresses the plurality of characteristic region images, in accordance with types of the plurality of characteristic regions, with reference to the conditions stored on the condition storing section.

The characteristic region detecting section may detect the plurality of characteristic regions with different types of characters in the plurality of moving-image-component images, and the compressing section may respectively compress a plurality of characteristic region moving images each of which includes a plurality of characteristic region images with the same type of character in the plurality of moving-image-component images. The compression control section may control a compression strength at which the compressing section compresses each of the plurality of characteristic region moving image, in accordance with the type of the character of the plurality of characteristic region images included in the characteristic region moving image, with reference to the conditions stored on the condition storing section.

The condition storing section may store thereon image quality reduction amounts differing in accordance with the types of the characteristic regions, the compressing section may include an image quality reducing section that reduces image qualities of the plurality of characteristic region moving images each of which includes the plurality of characteristic region images with the same type of character in the plurality of moving-image-component images, and the compression control section may control an image quality reduction amount by which the image quality reducing section reduces the image quality of each of the plurality of characteristic region moving images, in accordance with the type of the character of the plurality of characteristic region images included in the characteristic region moving image, with reference to the image quality reduction amounts stored on the condition storing section.

According to the second aspect related to the innovations herein, one exemplary image processing method may include detecting a plurality of characteristic regions in an image, storing assignment conditions differing in accordance with characters of characteristic regions, so that different compression strengths are assigned in accordance with the characters of the characteristic regions, compressing a plurality of characteristic region images which are images of the plurality of characteristic regions, and controlling compression strengths at which the plurality of characteristic region images are respectively compressed in the compressing in accordance with characters of the plurality of characteristic regions, with reference to the conditions stored in the storing.

According to the third aspect related to the innovations herein, one exemplary computer readable medium storing therein a program for an image processing apparatus may provided. The program causes the image processing apparatus to function as a characteristic region detecting section that detects a plurality of characteristic regions in an image, a condition storing section that stores thereon assignment conditions differing in accordance with characters of characteristic regions, so that different compression strengths are assigned in accordance with the characters of the characteristic regions, a compressing section that respectively compresses a plurality of characteristic region images which are images of the plurality of characteristic regions, and a compression control section that controls compression strengths at which the compressing section respectively compresses the plurality of characteristic region images in accordance with characters of the plurality of characteristic regions, with reference to the conditions stored on the condition storing section.

According to the fourth aspect related to the innovations herein, provided is an image processing apparatus including a characteristic region detecting section that detects a plurality of characteristic regions from an image; and a compressing section that compresses images of the plurality of characteristic regions by different encoding manners according to the quantities of characteristics of objects included in the plurality of characteristic regions respectively. The image processing apparatus may further include an encoding manner storing section that stores encoding manners in association with quantities of characteristics of objects, and the compressing section may compress the images of the plurality of characteristic regions by encoding manners stored in the encoding manner storing section in association with the quantities of the characteristics of the objects included in the plurality of characteristic regions respectively.

The encoding manner storing section may store encoding manners in association with categories of objects, and the compressing section may compress the images of the plurality of characteristic regions by encoding manners stored in the encoding manner storing section in association with categories of the objects included in the plurality of characteristic regions respectively. The characteristic region detecting section may detect the plurality of characteristic regions from each of a plurality of moving image constituent images included in a moving image, which is the aforementioned image, and the compressing section may compress the images of the plurality of characteristic regions in each of the plurality of moving image constituent images, by encoding manners stored in the encoding manner storing section in association with the categories of the objects included in the plurality of characteristic regions respectively.

According to the fifth aspect of the innovations herein, provided is an image processing method, including: detecting a plurality of characteristic regions from an image; and compressing images of the plurality of characteristic regions by different encoding manners according to the quantities of characteristics of objects included in the plurality of characteristic regions respectively. According to the sixth aspect related to the innovations herein, provided is a computer readable medium storing therein a program for an image processing apparatus. The program controls the image processing apparatus to function as: a characteristic region detecting section that detects a plurality of characteristic regions from an image; and a compressing section that compresses images of the plurality of characteristic regions by different encoding manners according to the quantities of characteristics of objects included in the plurality of characteristic regions respectively.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 9 illustrates a different example of the data stored on the condition storing section 2750.

FIG. 10 illustrates an example of the data stored on the information amount calculating section 2720.

FIG. 15B illustrates exemplary block configurations of a movement analyzing section 2285a and a difference processing section 2287a.

FIG. 20B shows one example block configuration of a motion analyzing section 3285a and a difference processing section 3287a, which are included in the inter-grade difference compressing section 3282a.

FIG. 25 is a table showing example data stored in an encoding manner storing section 3410.

FIG. 28 is a table showing another example data stored in the encoding manner storing section 3410.

DESCRIPTION OF EXEMPLARY EMBODIMENTS

Some aspects of the invention will now be described based on the embodiments, which do not intend to limit the scope of the present invention, but exemplify the invention. All of the features and the combinations thereof described in the embodiment are not necessarily essential to the invention.

Figure 1:
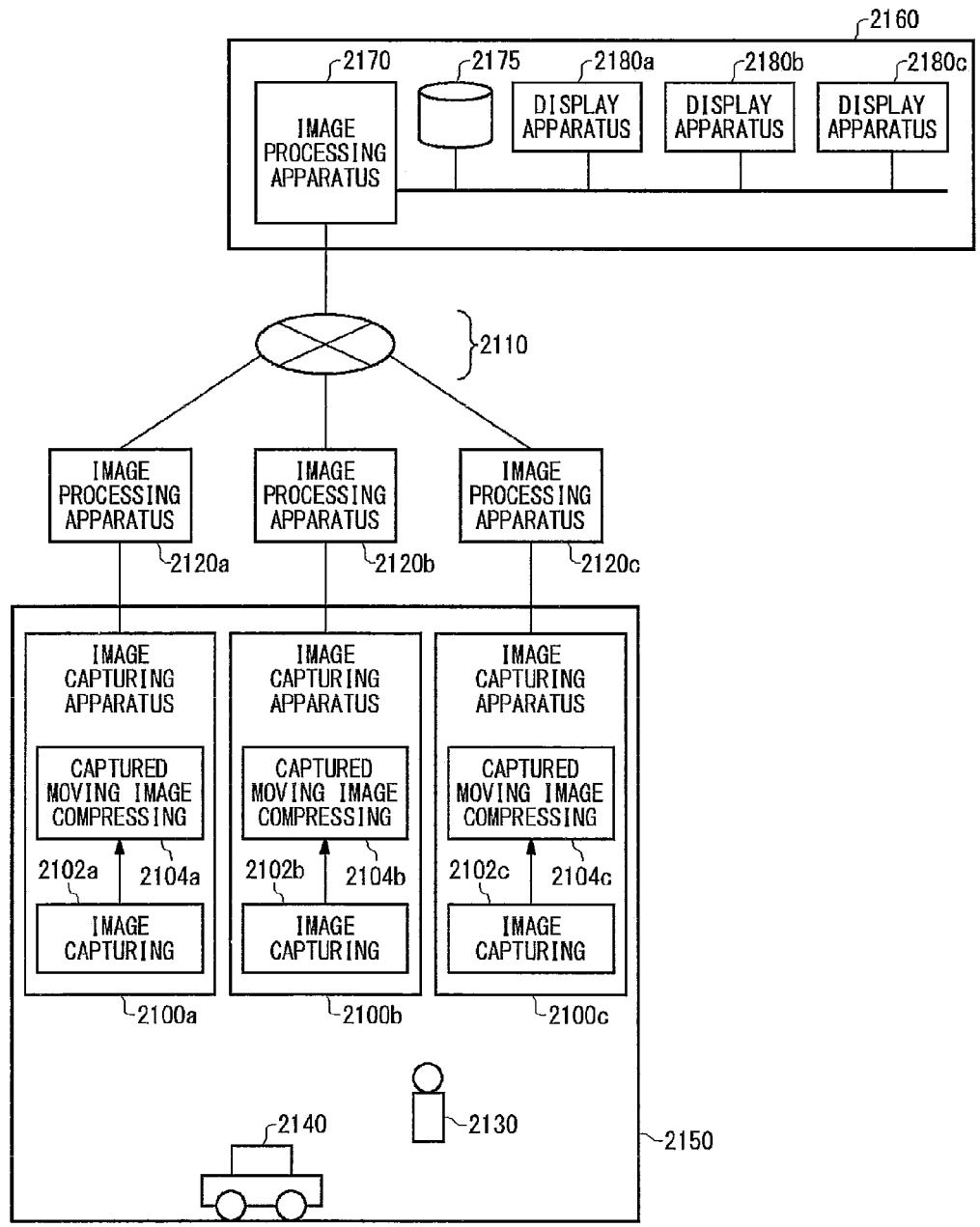
FIG. 1 illustrates an example of an image processing system 2010 relating to an embodiment of the present invention.

FIG. 1 illustrates an example of an image processing system 2010 relating to an embodiment of the present invention. The image processing system 2010 is designed to maintain high quality of the image of a characteristic subject with it being possible to reduce the data amount of the entire image.

The image processing system 2010 includes a plurality of image capturing apparatuses 2100a to 2100c (hereinafter collectively referred to as the image capturing apparatus 2100) that capture images of a monitored space 2150, a plurality of image processing apparatuses 2120a to 2120c (hereinafter collectively referred to as the image processing apparatus 2120) that process the images, an image processing apparatus 2170, a communication network 2110, an image database 2175, and a plurality of display apparatuses 2180a to 2180c (hereinafter collectively referred to as the display apparatus 2180).

The image processing apparatus 2120a is connected to the image capturing apparatus 2100a. The image processing apparatus 2120b is connected to the image capturing apparatus 2100b. The image processing apparatus 2120c is connected to the image capturing apparatus 2100c. The image processing apparatus 2170 and the display apparatus 2180 are provided within a space 2160 which is different from the monitored space 2150.

The following describes the operations of the image capturing apparatus 2100a, the image processing apparatus 2120a, the image processing apparatus 2170, and the display apparatus 2180a. The image capturing apparatus 2100a captures an image of the monitored space 2150, MPEG-codes the captured moving image to generate captured moving image data, and outputs the generated captured moving image data to the image processing apparatus 2120a to which the image capturing apparatus 2100a is connected.

Here, the image capturing apparatus 2100a includes an image capturing section 2102a and a captured moving image compressing section 2104a. The image capturing section 2102a image-captures the monitored space 2150, to generate a plurality of moving-image-component images that are included in a captured moving image. The image capturing section 2102a may generate moving-image-component images in the RAW format. The captured moving image compressing section 2104a performs color estimation (coinciding) processing on the moving-image-component images in the RAW format generated by the image capturing section 2102a to obtain a captured moving image including a plurality of moving-image-component images, and compresses the captured moving image by using such a technique as the MPEG coding. In this manner, the captured moving image compressing section 2104a generates the captured moving image data.

The image processing apparatus 2120a obtains the captured moving image data generated by the image capturing apparatus 2100a. The image processing apparatus 2120a decodes the captured moving image data obtained from the image capturing apparatus 2100a to generate the captured moving image, and detects a plurality of characteristic regions in the generated captured moving image. Here, the characteristic regions contain different types of characters including a person 2130 and a moving article 2140 such as a vehicle. Based on the captured moving image, the image processing apparatus 2120a generates a plurality of characteristic region moving images in a one-to-one correspondence with the characters of different types. In each characteristic region moving image, a corresponding one of the characteristic regions has a higher image quality than the remaining region. The image processing apparatus 2120a also generates a background region moving image that is a moving image of a background region of the captured moving image excluding the characteristic regions. The background region moving image has a lower image quality than the characteristic region moving images.

The image processing apparatus 2120a respectively codes the characteristic region moving images and the background region moving image, to generate a plurality of pieces of characteristic region moving image data and a piece of background region moving image data. At the same time, the image processing apparatus 2120a associates the pieces of characteristic region moving image data and the piece of background region moving image data with each other, and transmits the pieces of characteristic region moving image data and the piece of background region moving image data which are associated with each other, to the image processing apparatus 2170 via the communication network 2110.

The image processing apparatus 2170 respectively decodes the pieces of characteristic region moving image data and the piece of background region moving image data, which are associated with each other and received from the image processing apparatus 2120a, to obtain a plurality of characteristic region moving images and a background region moving image. The image processing apparatus 2170 combines the characteristic region moving images and the background region moving image to generate a single combined moving image, and provides the combined moving image to the display apparatus 2180a. The display apparatus 2180a displays the moving image provided from the image processing apparatus 2170.

The image processing apparatus 2170 may record the combined moving image or the captured moving image data obtained from the image processing apparatus 2120a onto the image database 2175. The image processing apparatus 2170 may supply the combined moving image which is recorded on the image database 2175 to the display apparatus 2180a in response to a request issued by the display apparatus 2180a. The image processing apparatus 2170 may decode, as mentioned above, the captured moving image data which is recorded on the image database 2175 and supply the resulting moving image to the display apparatus 2180a, in response to a request issued by the display apparatus 2180a. The image database 2175 may have a non-volatile recording medium such as a hard disk, and record the combined moving image supplied from the image processing apparatus 2170 on the recording medium.

The image capturing apparatuses 2100b and 2100c respectively include constituents having the same functions as the constituents of the image capturing apparatus 2100a. The image capturing apparatuses 2100b and 2100c have the same functions and operations as the image capturing apparatus 2100a, except that the image capturing apparatuses 2100b and 2100c respectively supply the captured moving image data to the image processing apparatuses 2120b and 2120c. Hence, the image capturing apparatuses 2100b and 2100c are not explained herein. Note that the following description may refer to the image capturing sections 2102a to 2102c as the image capturing section 2102 and may refer to the captured moving image compressing sections 2104a to 2104c as the captured moving image compressing section 2104.

The image processing apparatuses 2120b and 2120c may have the same functions and operations as the image processing apparatus 2120a, except that the image processing apparatuses 2120b and 2120c respectively obtain the captured moving image data from the image capturing apparatuses 2100b and 2100c. Hence, the image processing apparatuses 2120b and 2120c are not explained herein. The image processing apparatus 2170 generates a single moving image based on a plurality of pieces of characteristic region moving image data and a piece of background region moving image data which are associated with each other and received from each of the image processing apparatuses 2120b and 2120c, and supplies the single moving image to a corresponding one of the display apparatuses 2180b and 2180c. The display apparatuses 2180b and 2180c respectively display the moving images supplied from the image processing apparatus 2170.

When utilized as a monitoring system, for example, the image processing system 2010 relating to the present embodiment may be capable of keeping high-quality images of a person, a moving article, and other characteristic subjects to be monitored. In addition, the image processing system 2010 relating to the present embodiment may be capable of reducing the data amount of the moving images.

Figure 2:
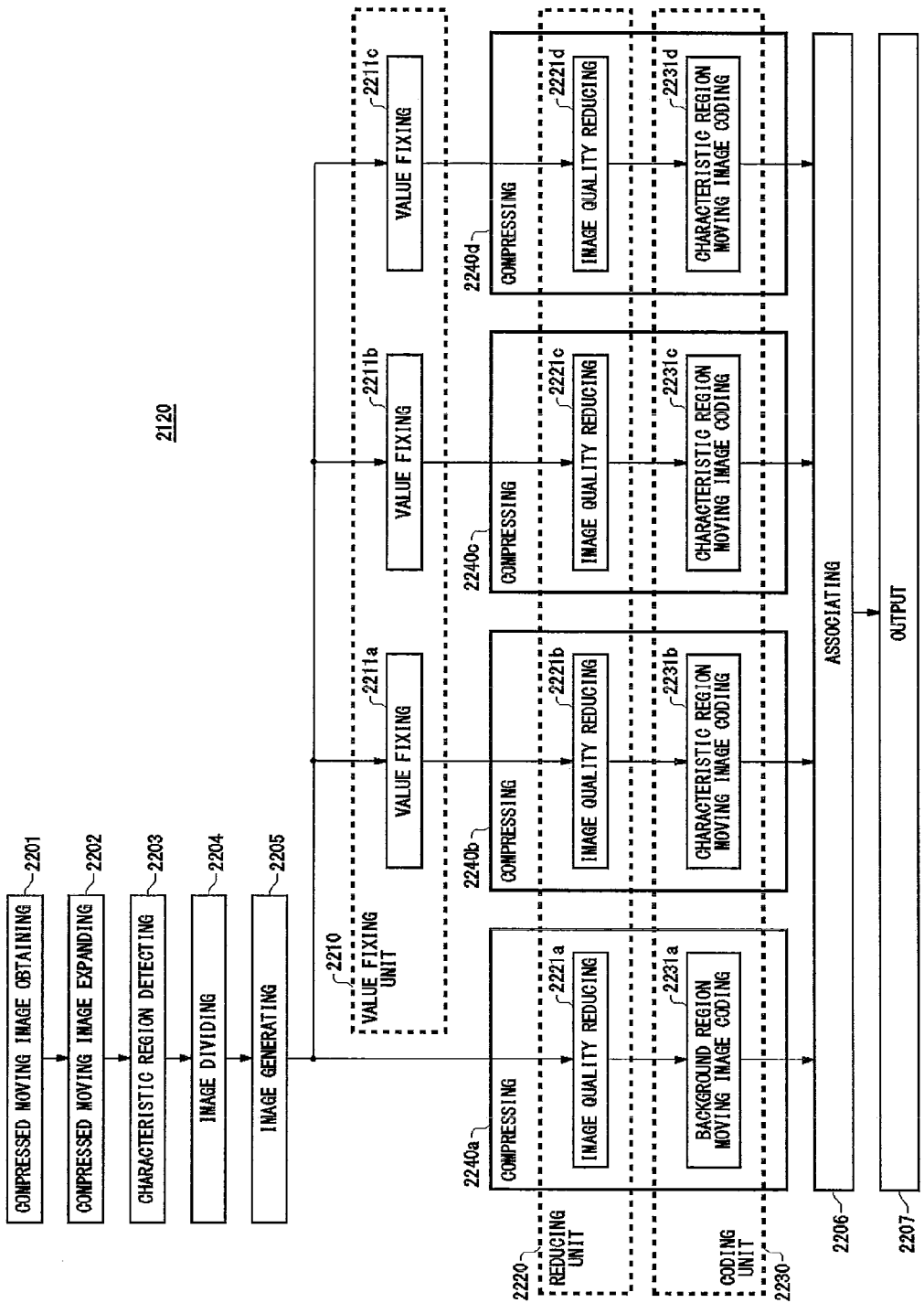
FIG. 2 illustrates an exemplary block configuration of an image processing apparatus 2120.

FIG. 2 illustrates an exemplary block configuration of the image processing apparatus 2120. The image processing apparatus 2120 includes a compressed moving image obtaining section 2201, a compressed moving image expanding section 2202, a characteristic region detecting section 2203, an image dividing section 2204, an image generating section 2205, a value fixing unit 2210, a reducing unit 2220, a coding unit 2230, an associating section 2206, and an output section 2207.

The value fixing unit 2210 includes a plurality of value fixing sections 2211a to 2211c (hereinafter collectively referred to as the value fixing section 2211). The reducing unit 2220 includes a plurality of image quality reducing sections 2221a to 2221d (hereinafter collectively referred to as the image quality reducing section 2221).

The coding unit 2230 includes a background region moving image coding section 2231a and a plurality of characteristic region moving image coding sections 2231b to 2231d (hereinafter collectively referred to as the characteristic region moving image coding section 2231). Here, the background region moving image coding section 2231a and the characteristic region moving image coding sections 2231b to 2231d may be collectively referred to as the coding section 231.

The image quality reducing section 2221a and the background region moving image coding section 2231a together function as a compressing section 2240a. The image quality reducing section 2221b and the characteristic region moving image coding section 2231b together function as a compressing section 2240b. The image quality reducing section 2221c and the characteristic region moving image coding section 2231c together function as a compressing section 2240c. The image quality reducing section 2221d and the characteristic region moving image coding section 2231d together function as a compressing section 2240d. These compressing sections 2240a to 2240d are collectively referred to as the compressing section 2240.

The compressed moving image obtaining section 2201 obtains a compressed moving image. Specifically speaking, the compressed moving image obtaining section 2201 obtains the captured moving image data which is generated by the image capturing apparatus 2100. The compressed moving image expanding section 2202 decompresses the moving image obtained by the compressed moving image obtaining section 2201, to generate the moving-image-component images included in the moving image. Specifically speaking, the compressed moving image expanding section 2202 decodes the captured moving image data obtained by the compressed moving image obtaining section 2201, to generate the moving-image-component images included in the moving image. The moving-image-component images may be frame images, field images or the like.

The characteristic region detecting section 2203 detects characteristic regions in the moving-image-component images included in the moving image. The image dividing section 2204 divides each of the moving-image-component images into the characteristic regions and a background region.

The image generating section 2205 extracts characteristic region images from the moving-image-component images, to generate a plurality of characteristic region compression moving images. Here, each characteristic region compression moving image includes a plurality of characteristic region images. Specifically speaking, the image generating section 2205 generates a plurality of characteristic region compression moving images used for generating a plurality of characteristic region moving images and a background region compression moving image used for generating a background region moving image, by duplicating the moving image.

The value fixing section 2211 sets, at a fixed value, the pixel values of a region other than the characteristic region (hereinafter referred to as a non-characteristic region) in the moving-image-component images included in each of the characteristic region compression moving images. For example, the value fixing section 2211 sets, at a predetermined value, the pixel values of the non-characteristic regions of the characteristic region compression moving images (for example, sets the luminance values at zero). The compressing section 2240 then compresses each of the characteristic region compression moving images, which includes the moving-image-component images in which the pixel values of the non-characteristic region are set at the fixed value, at the strength determined according to the characteristic amount of the characteristic region compression moving image. As described, the compressing section 2240 individually compresses the characteristic region compression moving images and the background region compression moving image, at the strengths determined according to the characteristic amounts of the compression moving images.

As explained in the above, the characteristic region detecting section 2203 detects the characteristic regions in the images. The image dividing section 2204 divides each image into the characteristic regions and the background region. The compressing section 2240 compresses the characteristic region images showing the characteristic regions and the background region image showing the background region, individually at different strengths. The compressing section 2240 compresses the characteristic region moving images each including a plurality of characteristic region images and the background region moving image including a plurality of background region images, respectively at different strengths.

Each of the compressing sections 2240*b*, 2240*c* and 2240*d* is configured to compress a characteristic region moving image of a predetermined type. Each of the compressing sections 2240*b*, 2240*c* and 2240*d* compresses a characteristic region moving image showing a character of a predetermined type. Here, the compression strengths at which the characteristic region moving images showing characters of different types are compressed are determined in advance in association with the types of the characters. Each of the compressing sections 2240*b*, 2240*c* and 2240*d* compresses a characteristic region moving image showing a predetermined type of character at a predetermined compression strength associated with the predetermined type of character. In this manner, the compressing section 2240 uses compressors provided in a one-to-one correspondence with the image regions defined by the image dividing section 2204, so as to compress a plurality of regions in parallel.

The compressing section 2240 may be implemented by a single compressor. In this case, the compressing section 2240 may sequentially in time compress the characteristic region moving images and the background region moving image. Alternatively, the compressing section 2240 may compress the captured moving image obtained by the decoding operation of the compressed moving image expanding section 2202, by compressing the regions defined by the image dividing section 2204 at the compression rates determined in advance for the character types and the background of the regions. In this manner, the compressing section 2240 may generate a single piece of moving image data.

Note that the characteristic region detecting section 2203 detects a plurality of characteristic regions with different types of characters in a plurality of moving-image-component images included in a moving image. The image dividing section 2204 divides each of the moving-image-component images into a plurality of characteristic regions and a background region. The compressing section 2240 compresses a plurality of characteristic region moving images and a background region moving image respectively at the strengths determined in accordance with the characteristic amounts of the moving images. Here, the characteristic amount herein indicates any one of the type of the subject, the size of the subject, the moving speed of the moving article, and the size of the characteristic region.

Specifically speaking, the image quality reducing section 2221 compresses the characteristic region moving images and the background region moving image by reducing their image qualities according to their respective characteristic amounts. In more details, the image quality reducing section 2221 compresses the characteristic region moving images and the background region moving image by reducing the resolutions or frame rates according to their respective characteristic amounts. The coding section 2231 compresses the characteristic region moving images and the background region moving image by coding the moving images with the use of values set according to their respective characteristic amounts. For example, the coding section 2231 compresses the characteristic region moving images and the background region moving image by coding the moving images with the use of code amounts assigned according to their respective characteristic amounts.

The associating section 2206 associates, with each other, a plurality of pieces of characteristic region moving image data and a piece of background region moving image data which are generated by the plurality of compressing sections 2240 by compressing the characteristic region moving images and the background region moving image. This association is achieved, for example, by adding tag information. The output section 2207 transmits the pieces of characteristic region moving image data and the piece of background region moving image data, which are associated with each other by the associating section 2206, to the communication network 2110.

According to the configuration shown in FIG. 2, the compressing sections 2240 included in the image processing apparatus 2120 compress the characteristic region images and the background region image in a one-to-one correspondence. According to a different configuration, however, the image processing apparatus 2120 may include a single compressing section 2240, which may compress the characteristic region images and the background region image respectively at different strengths. For example, the characteristic region images and the background region image may be sequentially supplied to the single compressing section 2240 in a time-sharing manner, and the single compressing section 2240 may sequentially compress the characteristic region images and the background region image respectively at the different strengths.

Alternatively, the single compressing section 2240 may compress the characteristic region images and the background region image respectively at different strengths by quantizing a plurality of pieces of image information of the characteristic regions and a piece of image information of the background region respectively with different quantization coefficients. Furthermore, the characteristic region images and the background region image may be converted into images with different image qualities, and the resulting images may be supplied to the single compressing section 2240. The single compressing section 2240 may respectively compress the supplied images which are obtained from the characteristic region images and the background region image.

In the above-mentioned embodiments where the single compressing section 2240 quantizes the image of each region with a different quantization coefficient or compresses the image of each region having a different image quality, the single compressing section 2240 may compress a single entire image or each of the partial regions of an image which are defined by the image dividing section 2204 as described with reference to FIG. 2. When the single compressing section 2240 compresses a single entire image, the image dividing operation by the image dividing section 2204 and the value fixing operation by the value fixing section 2211 are not necessary. Thus, the image processing apparatus 2120 may be configured without the image dividing section 2204 and the value fixing unit 2210.

Figure 3:
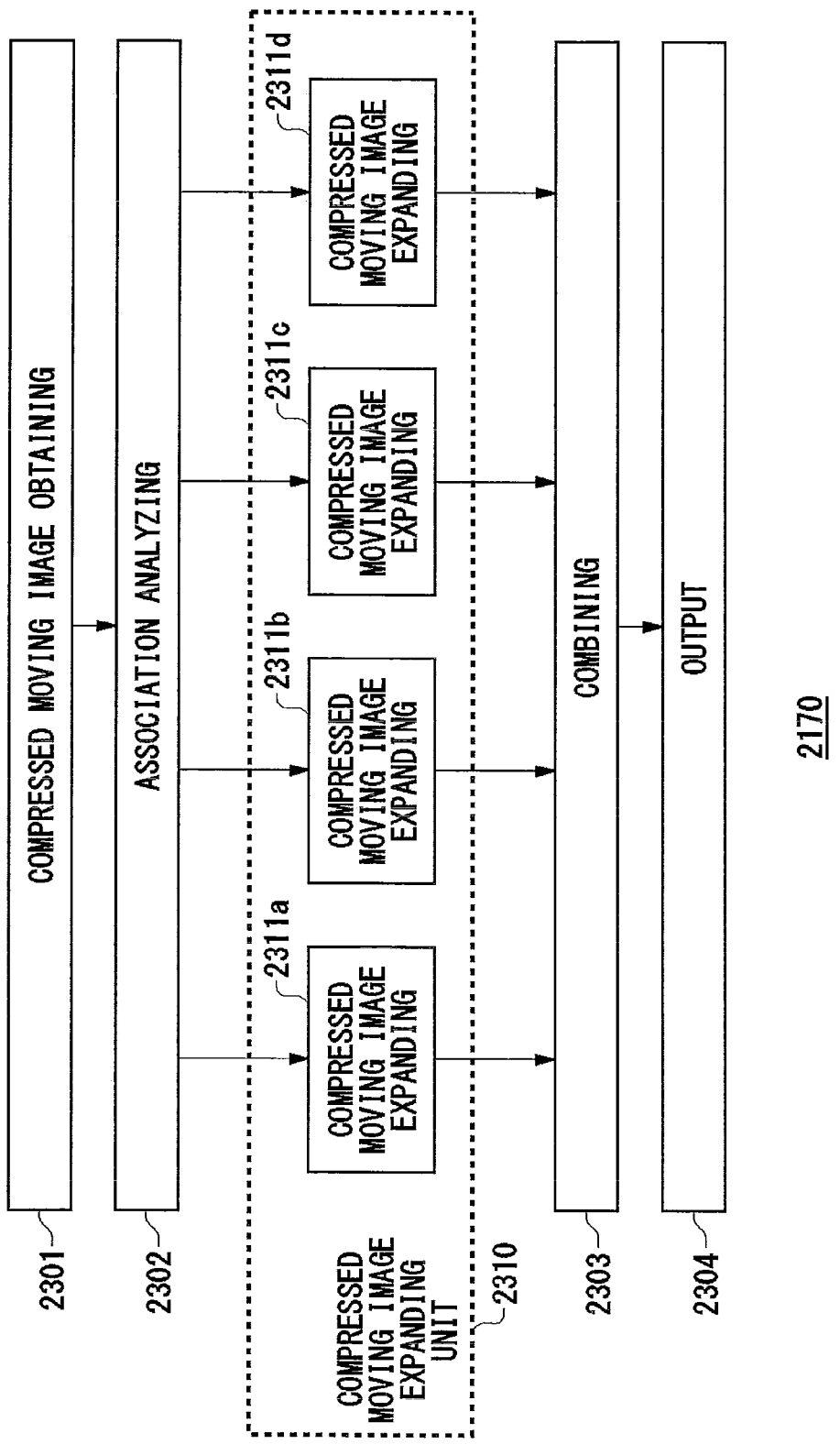
FIG. 3 illustrates an exemplary block configuration of an image processing apparatus 2170.

FIG. 3 illustrates an exemplary block configuration of the image processing apparatus 2170. The image processing apparatus 2170 includes a compressed moving image obtaining section 2301, an association analyzing section 2302, a compressed moving image expanding unit 2310, a combining section 2303, and an output section 2304. The compressed moving image expanding unit 2310 includes a plurality of compressed moving image expanding sections 2311a to 2311d (hereinafter collectively referred to as the compressed moving image expanding section 2311).

The compressed moving image obtaining section 2301 obtains the pieces of characteristic region moving image data and the piece of background region moving image data, which are associated with each other, output from the output section 2207. The association analyzing section 2302, for example, analyzes the added tag information, to retrieve the pieces of characteristic region moving image data and the piece of background region moving image data, which are associated with each other, obtained by the compressed moving image obtaining section 2301.

The compressed moving image expanding section 2311 decodes the pieces of characteristic region moving image data and the piece of background region moving image data. Specifically speaking, the compressed moving image expanding section 2311a decodes the background region moving image data. Each of the compressed moving image expanding sections 2311b-2311d decodes one of the pieces of characteristic region moving image data. In this way, the compressed moving image expanding sections 2311a to 2311d obtain a background region moving image and a plurality of characteristic region moving images. Here, the compressed moving image expanding sections 2311b to 2311d are provided in a one-to-one correspondence with a plurality of characters of different types, and each of the compressed moving image expanding sections 2311b to 2311d decodes a piece of characteristic region moving image data of one of the types.

The combining section 2303 combines together the moving-image-component images obtained by the decoding operation of the compressed moving image expanding section 2311. Specifically speaking, the combining section 2303 generates moving-image-component images by overlapping the moving-image-component images included in the characteristic region moving images resulting from the decoding operations of the compressed moving image expanding sections 2311b to 2311d onto the moving-image-component images included in the background region moving image. The output section 2304 supplies the moving image including the moving-image-component images generated by the combining section 2303, to the display apparatus 2180. Here, the output section 2304 may record the moving image including the moving-image-component images generated by the combining section 2303, onto the image database 2175. The image processing apparatus 2170 may record the pieces of characteristic region moving image data and the piece of background region moving image data in association with each other which are output from the output section 2207, onto the image database 2175. In this case, the compressed moving image obtaining section 2301 may obtain the pieces of characteristic region moving image data and the piece of background region moving image data in association with each other from the image database 2175.

According to the present embodiment, the compressed moving image expanding unit 2310 includes a plurality of compressed moving image expanding sections 2311 whose number corresponds to the number of the types of characters. In other embodiments, however, the compressed moving image expanding unit 2310 may include a single compressed moving image expanding section 2311, and the single compressed moving image expanding section 2311 may sequentially decode the piece of background region moving image data and the pieces of characteristic region moving image data. When the image processing apparatus 2120 provides a single piece of moving image data to the image processing apparatus 2170, the single compressed moving image expanding section 2311 may decode the provided single piece of moving image data, and the output section 2304 may output the moving image obtained by the decoding operation.

Figure 4:
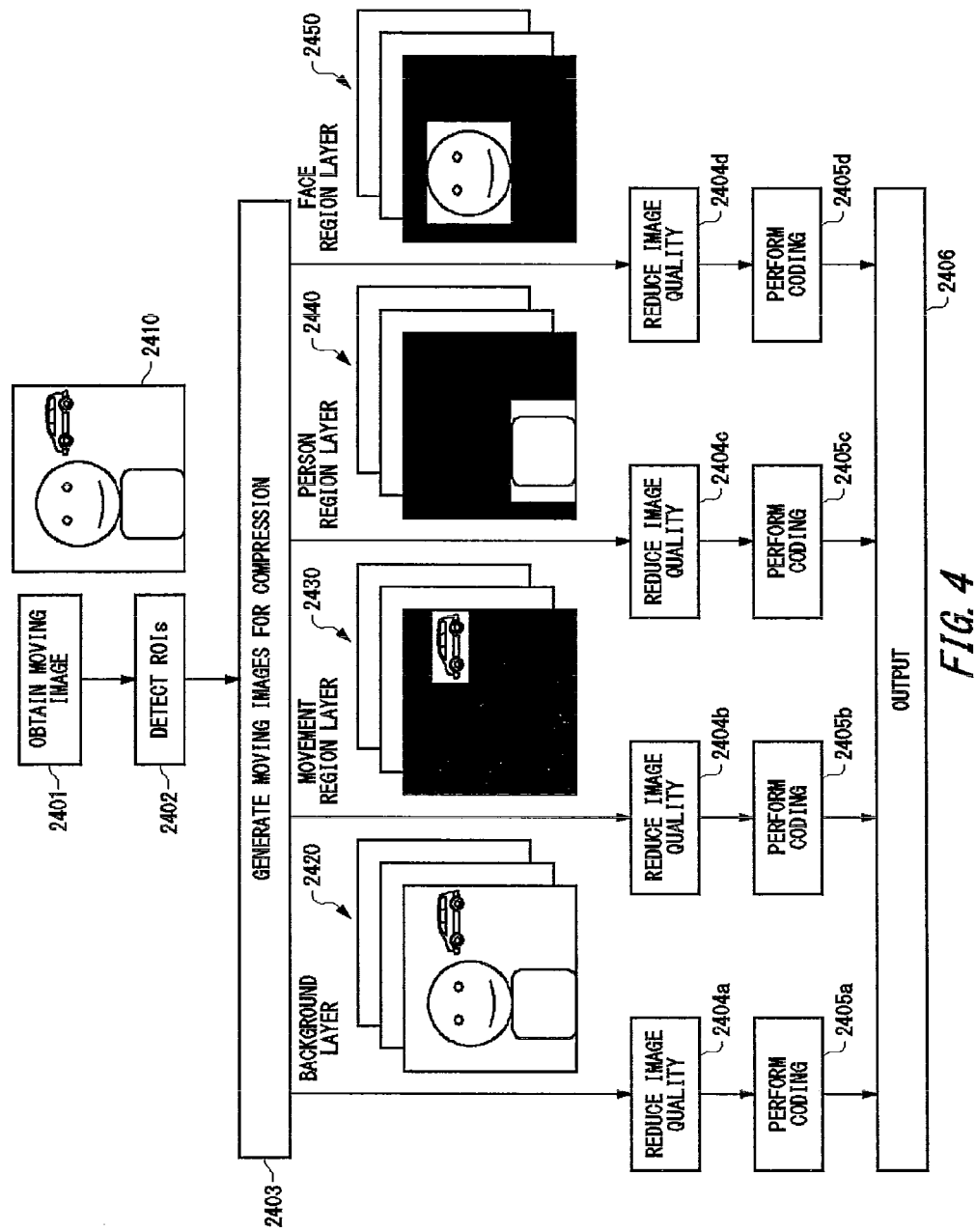
FIG. 4 illustrates an exemplary flow of the operations performed by the image processing apparatus 2120.

FIG. 4 illustrates an exemplary flow of the operations performed by the image processing apparatus 2120. The compressed moving image obtaining section 2201 obtains the captured moving image data in the step 2401. The compressed moving image expanding section 2202 generates a plurality of frame images 2410 by decoding the captured moving image data. The characteristic region detecting section 2203 detects regions of interest (ROIs), which are shown as an example of the characteristic regions, based on what is shown by each frame image 2410 or the frame images 2410 in the step 2402.

The characteristic region detecting section 2203 detects regions containing a person's face, a person's body, and a moving article, as ROIs of different types. For example, the characteristic region detecting section 2203 detects a region containing an object that matches a predetermined pattern of a person's face at a degree higher than a predetermined degree of match by way of the pattern matching technique or the like, and designates the detected face region as a ROI. Furthermore, the characteristic region detecting section 2203 detects a body region containing an object that matches a pattern of a person's body is higher than a predetermined degree of match by way of the pattern matching technique or the like, and designates the detected region as a ROI. Here, the characteristic region detecting section 2203 may detect the body region in the vicinity of the face region.

The characteristic region detecting section 2203 identifies a movement region containing a moving article based on what is shown by the plurality of frame images. For example, the characteristic region detecting section 2203 identifies, as the movement region, a region in which the pixel values change between frame images more than a predetermined value. Furthermore, the characteristic region detecting section 2203 extracts objects from the frame images by using the edge extraction technique or the like. The characteristic region detecting section 2203 may subsequently identify objects that match each other at a higher degree than a predetermined degree of match and are positioned differently in different frame images and identify a region containing the identified objects as a movement region.

As stated above, the characteristic region detecting section 2203 detects a region satisfying a predetermined condition relating to image contents, as a ROI. Specifically speaking, the characteristic region detecting section 2203 detects a region containing an object satisfying a predetermined condition, as a ROI. For example, the characteristic region detecting section 2203 detects, as a ROI, a region containing an object which matches a predetermined shape at a higher degree than a predetermined degree of match Furthermore, the characteristic region detecting section 2203 detects, as a ROI, a region in which the image changes more significantly than a predetermined change. For example, the characteristic region detecting section 2203 detects, as a ROI, a region in which the pixel values change between frame images more than a predetermined change.

The characteristic region detecting section 2203 can detect, as a ROI, a region that shows a portion of a person's head, a portion of a person's body such as a hand, or at least a portion of a living object other than a person, in addition to the person's face and the person's body listed above. Note that the living object includes particular tissues within the living object, for example, a tumor tissue or blood vessel. In addition, the characteristic region detecting section 2203 may detect, as a ROI, a region that shows money, a card such as a cash card, a vehicle, or a license plate of a vehicle, apart from the living object.

Other than the pattern matching technique including the template matching, the characteristic region detecting section 2203 may use the result of machine learning (for example, adaboost) disclosed in, for example, Japanese Patent Application Publication No. 2007-188419 in order to detect a ROI. For example, the characteristic region detecting section 2203 learns the distinctiveness of the image characteristic amount extracted from the image of a predetermined subject, based on the image characteristic amount extracted from the image of the predetermined subject and the image characteristic amount extracted from the image of a subject different from the predetermined subject. The characteristic region detecting section 2203 may detect, as a ROI, a region from which the image characteristic amount that has the distinctiveness matching the learned distinctiveness is extracted. In this manner, the characteristic region detecting section 2203 can detect, as a ROI, a region showing the predetermined subject. The characteristic region detecting section 2203 may detect a ROI which has any shape, for example, a rectangular shape.

The characteristic region detecting section 2203 may detect a characteristic region by using the method disclosed in Japanese Patent Application No. 2008-078641. For example, the characteristic region detecting section 2203 discards some of the pixels of a captured image in which an object is to be detected at a single predetermined rate or at predetermined rates. In this manner, the characteristic region detecting section 2203 generates an image group composed of the captured image and one or more pixel-discarded images. The characteristic region detecting section 2203 applies a first filter to a first image, to calculate an evaluation value. Here, the first image has a relatively small size among the images included in the generated image group, and the first filter acts on a two-dimensional region on the image and generates the evaluation value representing the likelihood that an object of a particular type is present within the region. The first filter may be selected from a group of filters which respectively act on regions of different sizes, and be designed to act on a relatively small region, where each filter has a predetermined number of pixels in accordance with the size of the region on the image. The characteristic region detecting section 2203 extracts, from the first image, a primary candidate region which produces an evaluation value exceeding a predetermined first threshold value.

The characteristic region detecting section 2203 then applies a second filter to a region corresponding to the primary candidate region in a second image to calculate an evaluation value, where the second image has more pixels by a predetermined number than the first image and the second filter is selected from the group of filters and designed to act on a larger region by a predetermined size than the first filter is. In this manner, the characteristic region detecting section 2203 extracts a secondary candidate region which produces an evaluation value exceeding a predetermined second threshold value.

The characteristic region detecting section 2203 applies the above-mentioned group of filters that are designed to act on regions of different sizes to the regions of corresponding sizes included in the group of images, to repeat the above-described extracting operation of extracting the candidate region. Here, the characteristic region detecting section 2203 repeatedly performs the extracting operations in such a manner as to start from an extracting operation of applying a filter that is designed to act on a relatively small region and sequentially increase the size of the region on which the applied filter acts on. Specifically speaking, the characteristic region detecting section 2203 repeatedly and sequentially performs the extracting operations in such a manner as to start with an extracting operation of applying a filter that is designed to act on a relatively small region to a relatively small image and to end with an extracting operation of applying a filter that is designed to act on a relatively large region to a relatively large image. The characteristic region detecting section 2203 repeatedly performs two or more extracting operations, to extract a final candidate region. In this manner, the characteristic region detecting section 2203 detects an object of a particular type. The characteristic region detecting section 2203 then detects a region in which the particular type of object is present, as a characteristic region. As described above, the characteristic region detecting section 2203 limits the application of the filters to a region that is extracted in an immediately preceding extracting operation. In other words, the respective extracting operations sequentially judge whether the object is present. As a result, the characteristic region detecting section 2203 can accurately detect the characteristic regions. In addition, since the above-described method uses small images to roughly detect the characteristic region, the characteristic region detecting section 2203 can detect the characteristic regions within a shorter time.

Alternatively, the characteristic region detecting section 2203 may detect a characteristic region by using the method disclosed in Japanese Patent Application No. 2008-078636.

For example, the characteristic region detecting section 2203 detects a characteristic region by means of a plurality of filters, each of which is designed to act on a two-dimensional region having a predetermined size in the captured image and calculates one of the different characteristic amounts relating to the outline of and the area occupied by an object of a particular type. Specifically speaking, the characteristic region detecting section 2203 applies those filters to a region having a predetermined size on the captured image in which the object is to be detected, to calculate a plurality of characteristic amounts. Here, each of the filters is associated with a relation between the characteristic amount calculated by the filter and a primary evaluation value representing the likelihood of the presence of the object of the particular type. The characteristic region detecting section 2203 refers to such relations and obtains primary evaluation values related to the calculated characteristic amounts. The characteristic region detecting section 2203 then integrates the primary evaluation values corresponding to the filters, to obtain a secondary evaluation value representing the likelihood that the object of the particular type is present in the region. The characteristic region detecting section 2203 compares the secondary evaluation value with a threshold value in order to extract a region which produces a secondary evaluation value exceeding the threshold value and in which the object of the particular type is highly likely to be present. In the above-described manner, the characteristic region detecting section 2203 detects the extracted region as a characteristic region in which the object of the particular type is present. As described above, the characteristic region detecting section 2203 combines a plurality of filters that extract characteristic amounts relating to a variety of characters of the outline of and the area occupied by an object. Therefore, the characteristic region detecting section 2203 can extract the characteristic regions more accurately when compared with a characteristic region detecting operation performed only with reference to, for example, the outline shape of an object.

The characteristic region detecting section 2203 may combine the methods disclosed in Japanese Patent Application Nos. 2008-078636 and 2008-078641 in order to detect a characteristic region. Specifically speaking the filters described above in relation to the method disclosed in Japanese Patent Application No. 2008-078636 may include a plurality of sets of filters, where each set of filters corresponds to a region of a particular size. The filters in each set have a predetermined number of pixels. Each filter may be associated with the above-mentioned relation between the characteristic amount and the primary evaluation value. The characteristic region detecting section 2203 discards some of the pixels of a captured image in which objects are to be detected at a single predetermined rate, or at predetermined rates. In this manner, the characteristic region detecting section 2203 generates an image group composed of the captured image and one or more pixel-discarded images. The characteristic region detecting section 2203 applies a plurality of first filters to a first image, to calculate a plurality of characteristic amounts. Here, the first image has a relatively small size among the images included in the image group, and the first filters are designed to act on a relatively small region. Based on the relations respectively associated with the first filters, the characteristic region detecting section 2203 obtains primary evaluation values corresponding to the calculated characteristic amounts. The characteristic region detecting section 2203 then integrates the primary evaluation values to obtain a secondary evaluation value representing the likelihood that an object of a particular type is present in the region. The characteristic region detecting section 2203 compares the obtained secondary evaluation value with a first threshold value, in order to extract a primary candidate region which produces a secondary evaluation value exceeding the first threshold value and in which the object of the particular type is highly likely to be present.

The characteristic region detecting section 2203 applies a plurality of second filters to a region corresponding to the primary candidate region in a second image, to calculate a plurality of characteristic amounts. Here, the second image is included in the image group and has more pixels by a predetermined number than the first image, and the second filters are designed to act on a larger region by a predetermined size than the first filters are. Based on the relations associated with the second filters, the characteristic region detecting section 2203 obtains primary evaluation values corresponding to the calculated characteristic amounts. The characteristic region detecting section 2203 then integrates the primary evaluation values corresponding to the second filters, to obtain a secondary evaluation value representing the likelihood that the object of the particular type is present in the region corresponding to the primary candidate region. The characteristic region detecting section 2203 compares the obtained secondary evaluation value with a second threshold value, in order to extract a secondary candidate region which produces a secondary evaluation value exceeding the second threshold value and in which the object of the particular type is highly likely to be present.

The characteristic region detecting section 2203 repeatedly performs the extracting operations of extracting the candidate regions, by applying the above-mentioned plurality of sets of filters, where each set is designed to act on a region of a different size, to the regions of correspondingly different sizes in the image group. Here, the characteristic region detecting section 2203 repeatedly performs the extracting operations in such a manner as to start from an extracting operation of applying filters that are designed to act on a relatively small region and sequentially increase the size of the region on which the applied filters act on. Specifically speaking, the characteristic region detecting section 2203 repeatedly and sequentially performs the extracting operations in such a manner as to start with an extracting operation of applying filters that are designed to act on a relatively small region to a relatively small image and to end with an extracting operation of applying filters that are designed to act on a relatively large region to a relatively large image. The characteristic region detecting section 2203 repeatedly performs two or more extracting operations, to extract a final candidate region. In this manner, the characteristic region detecting section 2203 detects an object of a particular type. The characteristic region detecting section 2203 detects a region in which the object of the particular type is present, as a characteristic region.

The characteristic region detecting section 2203 may detect a characteristic region by using the method disclosed in Japanese Patent Application No. 2008-098600. For example, the characteristic region detecting section 2203 detects a characteristic region from a plurality of captured images included in the moving images captured by a plurality of image capturing apparatuses 2100. For example, it is assumed that the image capturing apparatuses 2100a and 2100b capture the images of the same scene. For example, the image capturing apparatuses 2100a and 2100b may serve as a stereo camera. In the following description, an image pair denotes a pair of a first captured image captured by the image capturing apparatus 2100a and a second captured image captured by the image capturing apparatus 2100b. The characteristic region detecting section 2203 detects an object of a particular type in the image pair, and detects a region in which the detected object of the particular type is present as a characteristic region.

The characteristic region detecting section 2203 extracts a region in which the object of the particular type is shown in each of the first and second captured images forming the image pair. Here, the characteristic region detecting section 2203 may detect the region in which the object of the particular type is shown at a low accuracy. The characteristic region detecting section 2203 then detects the object of the particular type by detecting a pair of corresponding regions from among the extracted regions on the first and second captured images. For example, the characteristic region detecting section 2203 calculates the distance from the image capturing apparatuses 2100a and 2100b to the subject shown in the regions with reference to the images of the pair of regions. The characteristic region detecting section 2203 uses the three-dimensional shape of the subject which is obtained based on the distance to the object, in order to detect the object of the particular type.

When detecting the pair of corresponding regions, the characteristic region detecting section 2203 divides, into a plurality of sub-regions, each of the regions in which the object of the particular type is shown, which are detected from the first and second captured images forming the image pair. The characteristic region detecting section 2203 calculates a characteristic amount characterizing a partial image in each sub-region, and then calculates a vector representing the characteristic amounts of the sub-regions. Here, the characteristic amount can be exemplified by pixel values, and the vector can be exemplified by a gradient vector (for example, a pixel value gradient vector). The characteristic region detecting section 2203 calculates a logical distance between the calculated vector of the region on the first image and the calculated vector of the region on the second image. The characteristic region detecting section 2203 detects, as the pair of corresponding regions, a pair of regions which have a shorter logical distance therebetween than a predetermined value. Here, the logical distance may be exemplified by a square-root of sums of squares of the differences between the components of the vectors. In the above manner, the characteristic region detecting section 2203 can accurately extract the pair of corresponding regions from the image pair, thereby accurately calculating the distance to the subject. As a result, the characteristic region detecting section 2203 can accurately recognize the three-dimensional shape of the subject, and thus can accurately detect the object of the particular type.

The characteristic region detecting section 2203 may detect a characteristic region by using the method disclosed in Japanese Patent Application No. 2008-091562. For example, the characteristic region detecting section 2203 extracts a subject-similar shape similar to a subject of a particular type from each of the captured images included in a moving image, along with the dimensions of the subject-similar shape and the position information of the subject-similar shape in the view angle of the image capturing apparatus 100. The position information in the view angle can be exemplified by the position in the image region within the captured image. The characteristic region detecting section 2203 judges whether the extracted subject-similar shape represents the subject of the particular type, and then extracts the subject of the particular type. For example, the characteristic region detecting section 2203 may count the number of subjects with the subject-similar shape which have the same dimensions as the extracted subject-similar shape in a predetermined search region including the subject with the subject-similar shape, and extract the subject with the subject-similar shape as the subject of the particular type when the counted number is more than or equal to a threshold value. The characteristic region detecting section 2203 may detect, as a characteristic region, the region containing the subject of the particular type. In this manner, the characteristic region detecting section 2203 can detect, as the subject of the particular type, a subject having a subject-similar shape that is present in the image region within which a large number of subjects having dimensions similar to predetermined dimensions are detected. Here, the characteristic region detecting section 2203 can be prevented from detecting, as the subject of the particular type, a subject having the subject-similar shape that is present in a different region than this image region. As a result, the characteristic region detecting section 2203 can be configured so as to be less likely to mistakenly detect, as the subject of the particular type, subjects having the subject-similar shape that are present in the different region than the above image region.

When the image capturing apparatus 2100 has a variable view angle, the above-mentioned position information in the view angle may be exemplified by the direction in which the image capturing apparatus 2100 faces when capturing images and the position on the captured image. When a plurality of image capturing apparatuses 2100 can be used to capture images of a larger continuous field than when a single image capturing apparatus 2100 is used, the above-mentioned position information in the view angle can be exemplified by the directions in which the respective image capturing apparatuses 2100 face when capturing images and the positions on the captured images respectively captured by the image capturing apparatuses 2100.

Based on the ROIs detected in the above-described manners, the image processing apparatus 2120 generates compression moving images in the step 2403. Specifically speaking, the image dividing section 2204 divides each frame image into the ROIs and the remaining region. Subsequently, the image generating section 2205 generates a characteristic region moving image 2430, a characteristic region moving image 2440, a characteristic region moving image 2450 and a background region moving image 2420, by duplicating the frame images 2410. Specifically speaking, the image generating section 2205 generates the characteristic region moving image 2450 for the face region, the characteristic region moving image 2440 for the person region, the characteristic region moving image 2430 for the movement region and the background region moving image 2420 for the background region, by duplicating the frame images 2410.

The image processing apparatus 2120 then uses the value fixing section 2211 and the image quality reducing section 2221, in order to reduce the image qualities of the characteristic region moving images 2430, 2440 and 2450 and the background region moving image 2420 in the steps 2404a, 2404b, 2404c and 2404d. Specifically speaking, in the frame image included in each of the characteristic region moving images 2430, 2440 and 2450, the value fixing section 2211 maintains the pixel values in the corresponding one of the ROIs defined by the image dividing section 2404 and sets the pixel values in the region other than the corresponding ROI at a predetermined value (for example, set the luminance values at zero). Here, the value fixing section 2211 may set the pixel values in the region other than the ROI at an average pixel value of the region neighboring the ROI.

In the above-described manner, the image generating section 2205 and the value fixing section 2211 generate the characteristic region moving images 2430, 2440 and 2450 and the background region moving image 2420 each of which includes a plurality of frame images having the same view angle. As described in detail later, the image processing apparatus 2170 generates a moving image by overlapping, onto the background region moving image 2420, moving images in which the values in the non-ROI regions are set at a fixed value, for example, the characteristic region moving images 2430, 2440 and 2450. Hence, the background region moving image 2420 and the characteristic region moving images 2430, 2440 and 2450 can be respectively treated as a background layer, a movement region layer, a person region layer, and a face region layer.

In the frame image included in each of the characteristic region moving images 2430, 2440 and 2450, the image quality reducing section 2221 reduces the image quality of the image in the ROI according to the type of the character. Specifically speaking, the image qualities of the face, person and movement regions are defined in advance by at least one of the parameters including the resolution, the number of gray levels, and the number of colors. For example, it is designated in advance that the face, person and movement regions are arranged in the descending order of resolution.

The image quality reducing section 2221 changes the image of the ROI in the frame image included in each of the characteristic region moving images 2430, 2440 and 2450, into an image having predetermined resolution, number of gray levels and number of colors, in accordance with the type of the character. The image quality reducing section 2221 also sets the image quality of the frame image included in the background region moving image so as to be lower than the image qualities of the images in the ROIs. For example, the image quality reducing section 2221 sets the resolution of the frame image included in the background region moving image so as to be lower than the resolutions of the images in the ROIs.

The image quality reducing section 2221 reduces the frame rates of the background region moving image 2420 and the characteristic region moving images 2430, 2440 and 2450. For example, each type of character, that is to say, each of the face, person and movement regions is associated with a predetermined frame rate. The image quality reducing section 2221 reduces the frame rate of each of the characteristic region moving images 2430, 2440 and 2450 by discarding, at predetermined intervals, some of the frame images included in each of the characteristic region moving images 2430, 2440 and 2450 in accordance with the predetermined frame rate associated with the type of character. The image quality reducing section 2221 also reduces the frame rate of the background region moving image 2420 by discarding some of the frame images included in the background region moving image 2420 in accordance with the predetermined frame rate.

Here, the image quality reducing section 2221a reduces the image quality of the background region moving image 2420. The image quality reducing sections 2221b, 2221c and 2221d respectively reduce the image qualities of the characteristic region moving images 2430, 2440 and 2450.

Subsequently, the background region moving image coding section 2231a and the characteristic region moving image coding sections 2231b to 2231d respectively code the corresponding moving images whose image qualities have been reduced by the image quality reducing section 2221, in the steps 2405a, 2405b, 2405c and 2405d. For example, the background region moving image coding section 2231a and the characteristic region moving image coding sections 2231b to 2231d MPEG-code the corresponding moving images whose image qualities have been reduced by the image quality reducing section 2221.

For example, the background region moving image coding section 2231a MPEG-codes the background region moving image in accordance with the coding setting for the background region moving image. The characteristic region moving image coding sections 2231b, 2231c and 2231d respectively MPEG-code the corresponding characteristic region moving images in accordance with the coding settings respectively for the movement, person and face region moving images. Here, the coding setting includes setting a quantization table for MPEG coding, for example. The coding setting is described with reference to FIG. 5.

In the step 406, the associating section 2206 associates, to each other, a piece of background region moving image data and a plurality of pieces of characteristic region moving image data which are obtained by the coding operations of the background region moving image coding section 2231a and the characteristic region moving image coding sections 2231b to 2231d, by adding tag information, and the output section 2207 outputs the piece of background region moving image data and the pieces of characteristic region moving image data to the image processing apparatus 2170. Here, the associating section 2206 may add timing information to the tag information, where the timing information is, for example, time stamps and includes information indicating the display timings of the frame images included in the background region moving image and the characteristic region moving images. The associating section 2206 may add, to the tag information, characteristic region information indicating the range of each characteristic region, identification information identifying the image capturing apparatus 100 which has generated the captured moving image data from which the background region moving image and the characteristic region moving images are generated, and other information.

As described above, the characteristic region detecting section 2203 detects a plurality of characteristic regions showing different types of subjects, from a plurality of moving-image-component images included in a moving image. The compressing section 2240 compresses a plurality of characteristic region moving images respectively at strengths determined in accordance with the types of the subjects. In the present embodiment, the different types of subjects include, for example, a person's face and a person's body. In other embodiments, however, the different types of subjects may include the license plate of an automobile and a different part of an automobile than the license plate.

The different types of subjects may include front and side views of a person's face. The different types of subjects may include stationary and moving subjects. The characteristic region detecting section 2203 may detect, as a plurality of characteristic regions with different types of characters, a plurality of regions containing a plurality of subjects which are positioned away from the image capturing apparatus 2100 by different distances.

The compression strengths at which the compressing section 2240 compresses the characteristic region moving images may descend in the order of a movement region, a person's body, the side view of a person's face, and the front view of a person's face, which are exemplary characters of different types. Since the image processing system 2010 is used as a monitoring system in the present embodiment, the image processing system 2010 is configured to detect a region containing a person's face as a ROI and set the image quality of the detected ROI higher than the image quality of the non-ROI region. The image processing system 2010, however, can be used for capturing images of a street, for example. When used for such a purpose, the image processing system 2010 may detect a region containing a person's face as a ROI and set the image quality of the detected ROI lower than the image quality of the non-ROI region in order to protect personal information. For example, the compression strengths at which the compressing section 2240 compresses the characteristic region moving images and the background region moving image may descend in the order of the front view of a person's face, the side view of a person's face, a person's body, a movement region and a background region.

The characteristic region detecting section 2203 may detect a plurality of characteristic regions containing subjects that move at different speeds, from a plurality of frame images. In this case, as the speeds of the subjects increase, the frame rates of the moving images obtained by the image quality reducing section 2221 by converting the characteristic region moving images increase. Which is to say, the compressing section 2240 may compress the characteristic region moving images respectively at strengths determined in accordance with the speeds of their subjects.

As described above, the image processing apparatus 2120 sets, at fixed values, the values in the non-ROI regions in the frame images respectively included in the characteristic region moving images, and generates a plurality of characteristic region moving images and a background region moving image which all have the same view angle. Therefore, the image processing apparatus 2120 may be able to use a general-purpose coder for compressing the characteristic region moving images at high compression rates without using a specially designed coder. For example, when the characteristic region moving images are coded by way of motion vectors as in the MPEG coding technique, the pixel values may often have a differential value of 0 in the macroblocks within the non-ROI region whose values are set at a fixed value. As a result, the above-mentioned value fixing operation may be able to lower the manufacturing cost of the image processing apparatus 2120 with it being possible to maintain high compression rates.

In the above description, the compressing section 2240 compresses the characteristic region moving images including the frame images in which the values in the non-ROI regions are set at fixed values. The compressing section 2240 may clip the images within the ROIs from the frame images included in the characteristic region moving images, compress the clipped images, and output the compressed images as the characteristic region moving images.

When the characteristic region detecting section 2203 detects no ROIs, the output section 2207 outputs the background region moving image data output from the compressing section 2240a, to the image processing apparatus 2170. In this case, the image generating section 2205 may not need to generate the characteristic region moving images 2430, 2440 and 2450. Under the condition that the characteristic region detecting section 2203 detects ROIs, the image generating section 2205 generates the characteristic region moving images 2430, 2440 and 2450, and the output section 2207 outputs a plurality of pieces of characteristic region moving image data and a piece of background region moving image data, which are obtained in the above-described manner, to the image processing apparatus 2170. During this period, the compressing section 2240a may continue compressing the background region moving image 2420 at a predetermined background region compression rate.

While the characteristic region detecting section 2203 detects no ROIs, the compressing section 2240 may compress the background region moving image at a predetermined no-ROI compression rate which is lower than the above background region compression rate and higher than the compression rates for the characteristic region moving images. Under the condition that the characteristic region detecting section 2203 detects ROIs, the compressing section 2240 may compress the background region moving image at the above background region compression rate. Here, the compressing section 2240 may compress the characteristic region moving images at compression rates lower than the no-ROI compression rate.

The compressing section 2240 may compress the background region moving image at the no-ROI compression rate until a predetermined time period elapses after the characteristic region detecting section 2203 detects ROIs, and compress the background region moving image at the background region compression rate after the predetermined time period has elapsed. With such a configuration, even when the characteristic region detecting section 2203 does not detect, as a ROI, a region which is originally expected to be detected as a ROI, the image processing apparatus 2120 may be able to provide a background region moving image with a reasonably high image quality. The compressing section 2240 may compress the respective regions at different compression rates in the following manner. The characteristic region detecting section 2203 detects ROIs in the frame images, and the positions of the detected ROIs are used to estimate a ROI in a different frame image. In the different frame image, the region containing the ROI has a higher image quality than the non-ROI region.

Figure 5:
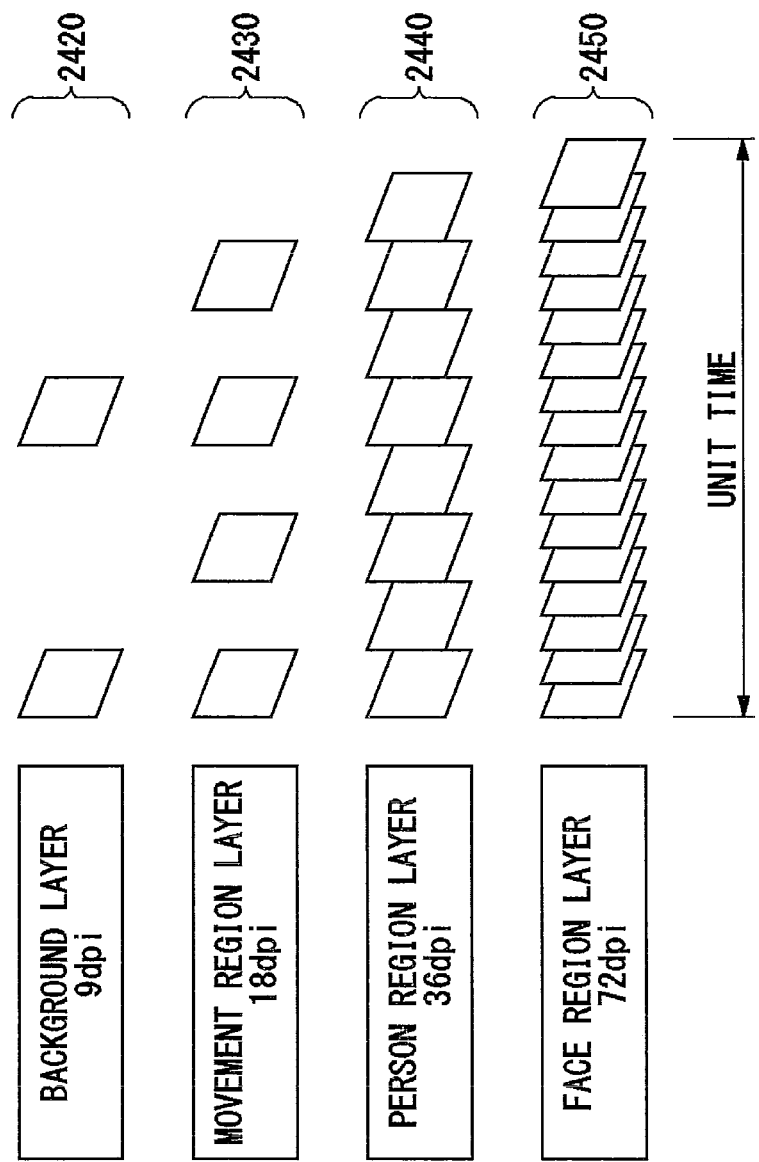
FIG. 5 shows, as an example, the image qualities of characteristic region moving images and the image quality of a background region moving image.

FIG. 5 shows, as an example, the image qualities of the characteristic region moving images and the image quality of the background region moving image. To simplify the explanation, it is assumed that the captured moving image data obtained by the compressed moving image obtaining section 2201 has a frame rate of 16 fps and that the frame images included in the captured moving image data have a resolution of 72 dpi.

The resolution ratio of the resolution of the frame image included in the background region moving image 420 after the image-quality reduction to the resolution of the frame image 410 included in the captured moving image is set at 1/8 in advance. The image quality reducing section 2221 generates 9-dpi frame images by discarding some of the pixels of the frame images included in the background region moving image 2420 before the image-quality reduction, where the resolution of 9 dpi is one-eighth of the resolution of the frame images included in the background region moving image 2420 before the image-quality reduction which is generated by the image generating section 2205 by duplicating the captured moving image. Furthermore, the frame rate ratio of the frame rate of the background region moving image 2420 after the image-quality reduction to the frame rate of the captured moving image is set at 1/8 in advance. The image quality reducing section 2221 generates a 2-fps background region moving image 2420 by discarding some of the frame images included in the background region moving image 2420 before the image-quality reduction, where the frame rate of 2 fps is one-eighth of the frame rate of the background region moving image 2420 before the image-quality reduction.

Similarly, the resolution ratios and the frame rate ratios are designated in advance in association with the respective characteristic region moving images. For example, the resolution ratio and the frame rate ratio are set at 1/4 for the characteristic region moving image 2430, the resolution ratio and the frame rate ratio are set at 1/2 for the characteristic region moving image 2440, and the resolution ratio and the frame rate ratio are set at 1/1 for the characteristic region moving image 2450. In this case, the image quality reducing section 2221b generates the characteristic region moving image 2430 with the frame rate of 4 fps and the frame image resolution of 18 dpi. The image quality reducing section 2221c generates the characteristic region moving image 2440 with the frame rate of 8 fps and the frame image resolution of 36 dpi. The image quality reducing section 2221d generates the characteristic region moving image 2450 with the frame rate of 16 fps and the frame image resolution of 72 dpi.

In the above-described exemplary case, the image quality reducing section 2221 reduces the image qualities of the frame images by discarding some of the pixels of the frame images included in the characteristic region moving images and the background region moving image. Alternatively, the image quality reducing section 2221 may reduce the image qualities of the frame images by using filters each of which passes a predetermined frequency band, for example, low pass filters. If such is the case, the filter associated with each type of character may have predetermined properties, where the different types of characters include the background region, the movement region, the person region, and the face region and the filter properties include the frequency band passing through each filter and the degree of the passage.

In addition to or in place of the image-quality reduction performed by the image quality reducing section 2221, the coding section 2231 may reduce the image qualities of the frame images. For example, the coding section 2231 can reduce the image qualities by increasing the values of the quantization tables used for the MPEG coding. The values of each quantization table may be set in advance in accordance with a corresponding one of the different types of characters. For example, the background region moving image coding section 2231a and the characteristic region moving image coding sections 2231b to 2231d may code the corresponding moving images by using the quantization tables with predetermined values. Referring to the quantization tables, the values are associated with frequency components. Such values may be set in advance differently in accordance with the different types of characters.

The image quality reducing section 2221 may also average a plurality of frame images included in the background region moving image. In this way, when an object representing a moving article is included in the frame images, the image quality reducing section 2221 can obtain a frame image in which the object representing the moving article is averaged. When such averaged frame images are successively displayed, a viewer may enjoy watching smooth movement of the moving article.

According to the above-described embodiment, the image generating section 2205 duplicates the captured moving image to generate the characteristic region moving images and the background region moving image, and the compressing section 2240 compresses the generated characteristic region moving images and background region moving image by discarding some of the frame images and pixels. Alternatively, the image generating section 2205 may generate the characteristic region moving images and the background region moving image with lowered frame rates by discarding some of the frame images included in the captured moving image in accordance with the frame rate ratios. After this, the value fixing section 2211 performs the value fixing operation, and the image quality reducing section 2221 reduces the resolutions to reduce the image qualities of the characteristic region moving images and the background region moving image.

Figure 6:
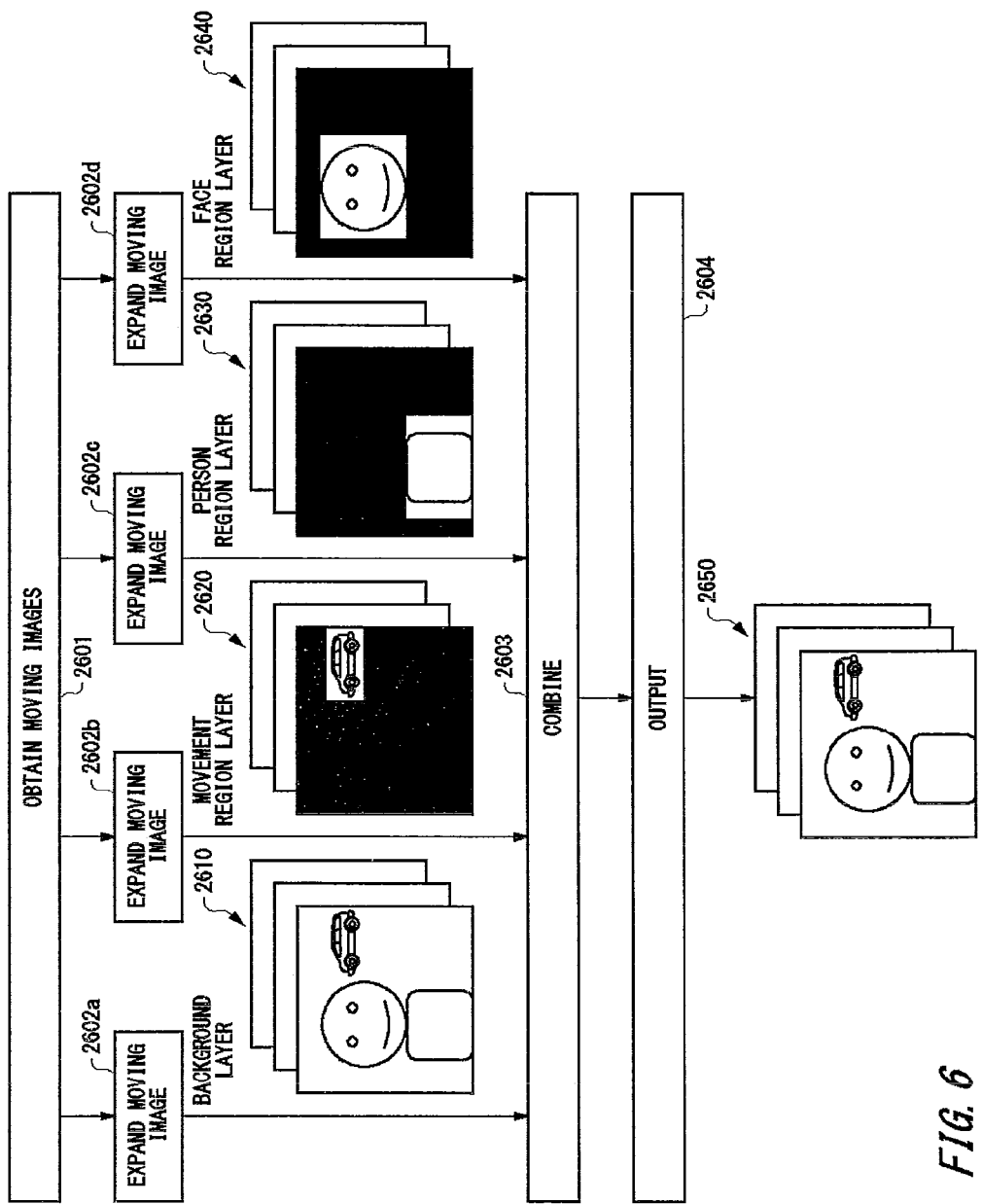
FIG. 6 illustrates an exemplary flow of the operations performed by the image processing apparatus 2170.

FIG. 6 illustrates an exemplary flow of the operations performed by the image processing apparatus 2170. The compressed moving image obtaining section 2301 obtains a plurality of pieces of characteristic region moving image data and a piece of background region moving image data which are associated with each other, from the image processing apparatus 2120, and obtains timing information, identification information identifying the image capturing apparatus 2100 and other information with reference to the added tag information, in the step 2601. The compressed moving image expanding section 2311 decodes the pieces of characteristic region moving image data and the piece of background region moving image data, to generate a background region moving image 2610 representing a background layer in the step 2602a. At the same time, the compressed moving image expanding section 2311 generates a characteristic region moving image 2620 representing a movement region layer, a characteristic region moving image 2630 representing a person region layer, and a characteristic region moving image 2640 representing a face region layer in the steps 2602b, 2602c and 2602d.

The combining section 2303 combines together the frame images included in the background region moving image 2610 and the characteristic region moving images 2620, 2630 and 2640 in the step 2603. Here, the combining section 2303 enlarges the frame images included in the background region moving image 2610 and the characteristic region moving images 2620, 2630 and 2640 in accordance with their respective resolutions in such a manner that the identical subjects in the respective frame images overlap each other, and layers the enlarged frame images to generate a combined frame image.

The combining section 2303 clips the images of the characteristic regions from the frame images included in the characteristic region moving images 2620, 2630, and 2640, and overlays the clipped images onto the frame image included in the background region moving image 2610. In this manner, the combining section 2303 generates the combined frame image. When the background region moving image 2610 and the characteristic region moving images 2620, 2630 and 2640 have different frame rates, the combining section 2303 combines together the most recent frame images of the background region moving image 2610 and the characteristic region moving images 2620, 2630 and 2640.

In the above-described manner, the combining section 2303 generates a combined frame image. The combining section 2303 further generates a combined moving image 2650 including a plurality of combined frame images. The output section 2304 selects the display apparatus 2180 which is to display the combined moving image with reference to the tag information obtained by the compressed moving image obtaining section 2301, and supplies the combined moving image to the selected display apparatus 2180 in the step 2604.

Figure 7:
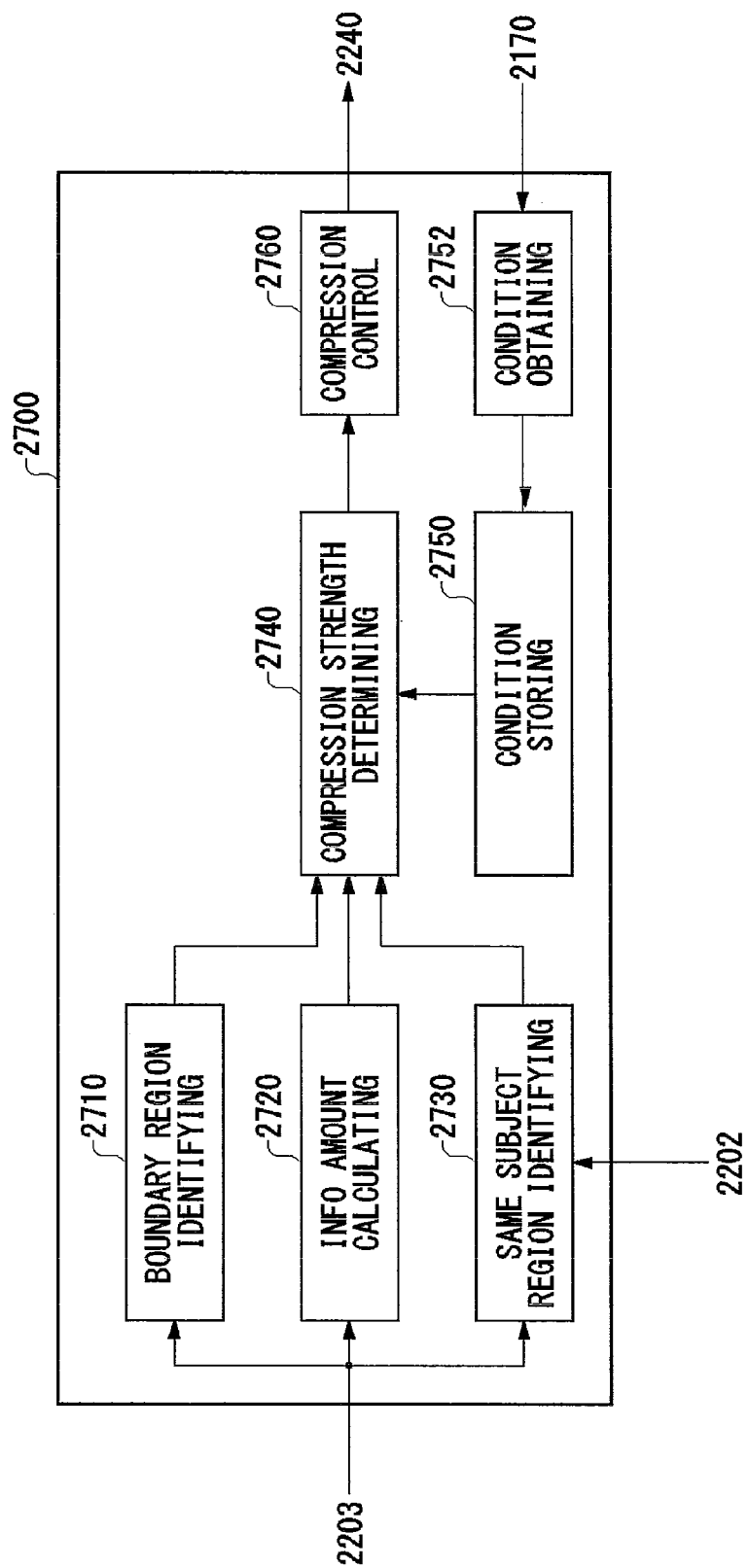
FIG. 7 illustrates an exemplary configuration of a compression control unit 2700 included in the image processing apparatus 2120.

FIG. 7 illustrates an exemplary configuration of a compression control unit 2700 further included in the image processing apparatus 2120. The compression control unit 2700 includes a boundary region identifying section 2710, an information amount calculating section 2720, a same subject region identifying section 2730, a compression strength determining section 2740, a condition storing section 2750, a condition obtaining section 2752 and a compression control section 2760.

The condition storing section 2750 stores assignment conditions differing in accordance with the characters of the characteristic regions, so that different compression strengths are assigned in accordance with the characters of the characteristic regions. Specifically speaking, the condition storing section 2750 stores conditions differing in accordance with the types of the characteristic regions.

By referring to the conditions stored on the condition storing section 2750, the compression control section 2760 controls the compression strengths at which the compressing section 2240 compresses the characteristic region images, in accordance with the characters of the characteristic regions.

Specifically speaking, with reference to the conditions stored on the condition storing section 2750, the compression control section 2760 controls the compression strengths at which the compressing section 2240 compresses the characteristic region images, in accordance with the characters of the characteristic regions. In more detail, with reference to the conditions stored on the condition storing section 2750, the compression control section 2760 controls the compression strengths at which the compressing section 2240 compresses the characteristic region images, in accordance with the types of the characteristic regions.

The compressing section 2240 compresses a plurality of characteristic region moving images each of which includes a plurality of characteristic region images having the same type of character in a plurality of moving-image-component images. Here, the compression control section 2760 controls the compression strengths at which the compressing section 2240 compresses the characteristic region moving images, with reference to the conditions stored on the condition storing section 2750, in accordance with the types of the characters of the characteristic region images included in the characteristic region moving images.

The condition storing section 2750 may store image-quality reduction amounts differing in accordance with the types of the characteristic regions. The image quality reducing section 2221 may reduce the image qualities of the characteristic region moving images each of which includes characteristic region images having the same type of character in the moving-image-component images. Here, the compression control section 2760 may control the image quality reduction amounts by which the image quality reducing section 2221 reduces the image qualities, with reference to the image quality reduction amounts stored on the condition storing section 2750, in accordance with the types of the characters of the characteristic region images included in the characteristic region moving images.

The compression control section 2760 may control the compression strengths at which the compressing section 2240 compresses the characteristic region moving images, with reference to the conditions stored on the condition storing section 2750, in accordance with the types of the characters of the characteristic region images included in the characteristic region moving images. Here, the compressed moving image obtaining section 2201 obtains a plurality of moving images which are captured from different positions. For example, the compressed moving image obtaining section 2201 obtains a plurality of moving images captured by the image capturing apparatuses 2100*a* to 2100*c*.

The same subject region identifying section 2730 identifies a characteristic region which is extracted from in a moving-image-component image included in one of the moving images obtained by a moving image obtaining section that is configured to obtain moving images and which contains the same subject as a characteristic region extracted from a moving-image-component image included in a different one of the obtained moving images. Specifically speaking, the same subject region identifying section 2730 refers to the moving images obtained by the compressed moving image expanding section 2202 by expanding the compressed moving image data obtained by the compressed moving image obtaining section 2201, and identifies a characteristic region which is extracted from a moving-image-component image included in one of the referred moving images and which contains the same subject as a characteristic region extracted from a moving-image-component image included in a different one of the referred moving images. The compression control section 2760 controls the compression strength at which the compressing section 2240 compresses the characteristic region image of at least one of the characteristic regions which are identified by the same subject region identifying section 2730 so as to include the same subject, with reference to the conditions stored on the condition storing section 2750, in accordance with the character of the characteristic region, and sets the compression strength at which the compressing section 2240 compresses the characteristic region image of a different characteristic region higher than the compression rate at which the compressing section 2240 compresses the characteristic region image of the above-mentioned at least one characteristic region.

The boundary region identifying section 2710 identifies a boundary region which is positioned in the vicinity of the boundary between a characteristic region and a non-characteristic region. The compression strength determining section 2740 determines the compression strength at which the image of the boundary region is compressed, where the compression strength for the boundary region falls between the compression strength at which the image of the characteristic region is compressed and the compression strength at which the image of the background region is compressed. The compressing section 2240 compresses the image of the boundary region at the compression strength determined by the compression strength determining section 2740. As described in the above, the compressing section 2240 compresses the images of the characteristic region, the background region and the boundary region at different strengths.

The compression strength determining section 2740 brings the compression strength at which the image of a given region in the vicinity of a characteristic region is compressed closer to the compression strength at which the image of the characteristic region is compressed, as the given region becomes closer to the characteristic region. The compressing section 2240 compresses the image of the boundary region at the compression strength which is determined by the compression strength determining section 2740 in accordance with the position of the boundary region.

The compression strength determining section 2740 determines the after-compression image quality of the image of the characteristic region in accordance with the type of the character of the characteristic region, determines the after-compression image quality of the image of the background region so as to be lower than the after-compression image quality of the image of the characteristic region, and determines the after-compression image quality of the image of the boundary region so as to fall between the after-compression image quality of the image of the characteristic region and the after-compression image quality of the image of the background region. The image quality reducing section 2221 reduces the image qualities of the images of the characteristic, background and boundary regions, to the image qualities determined by the compression strength determining section 2740.

More specifically, the compression strength determining section 2740 determines the after-compression resolution of the image of the characteristic region in accordance with the type of the character of the characteristic region, determines the after-compression resolution of the image of the background region so as to be lower than the after-compression resolution of the image of the characteristic region, and determines the after-compression resolution of the image of the boundary region so as to fall between the after-compression resolution of the image of the characteristic region and the after-compression resolution of the image of the background region. The image quality reducing section 2221 reduces the resolutions of the images of the characteristic, background and boundary regions, to the resolutions determined by the compression strength determining section 2740.

The information amount calculating section 2720 calculates the amount of the information provided by a subject contained in a characteristic region. In the case of a ROI which is a face region, for example, the object in the ROI has information relating to a person's face, and the information amount calculating section 2720 calculates the amount of the information. For example, the information amount may be a value indicative of how easily the person's face is recognized in the image. In this case, the information amount may be the area of the person's face or the number of pixels included in the image region representing the person's face.

The compressing section 2240 compresses the characteristic region images. Here, the compression strength determining section 2740 increases the compression strengths at which the compressing section 2240 compresses the characteristic region images as the information amounts increase. When a person's face appears sufficiently large in a ROI, the ROI often still has an image quality sufficiently high to distinguish the face even after the ROI is compressed at a high strength and its image quality is thus slightly reduced. Therefore, when the image processing apparatus 2120 relating to the present embodiment is put into a practical use, an ROI is compressed at a high rate, for example, when a person's face appears sufficiently large in the ROI. As a result, the image processing apparatus 2120 may be able to prevent an unnecessary increase in the data amount of the images.

The characteristic region detecting section 2203 may detect, as a characteristic region, a region containing an object which satisfies a predetermined condition at a degree higher than a predetermined value. The characteristic region detecting section 2203 may detect, as a characteristic region, a region containing an object which satisfies a predetermined condition relating to what is shown by the image at a degree higher than a predetermined value, where the predetermined condition is used to judge whether the object is the head of the person 2130.

In this case, the information amount calculated by the information amount calculating section 2720 may increase, as the degree at which the object contained in the characteristic region satisfies the condition increases. As the degree of satisfaction increases, the compression strength determining section 2740 may increase the compression strength at which the compressing section 2240 compresses the characteristic region.

The characteristic region detecting section 2203 may detect, as a characteristic region, a region containing an object whose pattern matches a predetermined pattern at a degree higher than a predetermined degree of match In this case, the information amount calculated by the information amount calculating section 2720 may increase, as the degree of match increases. As the degree of match increases, the compression strength determining section 2740 may increase the compression strength at which the compressing section 2240 compresses the characteristic region.

The information amount calculating section 2720 may identify the distance between the image capturing apparatus 2100 which has captured the image and the subject contained in the characteristic region. In this case, as the identified distance decreases, the information amount calculated by the information amount calculating section 2720 may increase. Furthermore, as the size of the characteristic region increases, the information amount calculated by the information amount calculating section 2720 may increase.

When the characteristic region detecting section 2203 detects a plurality of characteristic regions with different types of characters from an image, the information amount calculating section 2720 may respectively calculate the information amounts of the subjects contained in the characteristic regions. The compression strength determining section 2740 may determine the compression strengths respectively for the characteristic region images in such a manner that the compression rate increases as the information amount increases. The compressing section 2240 may compress the characteristic region images at the compression rates determined by the compression strength determining section 2740.

When the characteristic region detecting section 2203 detects a characteristic region from each of the moving-image-component images included in a moving image, the information amount calculating section 2720 may calculate the information amounts of the subjects contained in a plurality of characteristic regions in each of the moving-image-component images. The compression strength determining section 2740 may determine the compression strengths at which the compressing section 2240 compresses the characteristic region images of the respective moving-image-component images, in such a manner that the compression strengths increase as the information amounts increase. The compressing section 2240 may compress the characteristic region images of the respective moving-image-component images at the compression strengths determined by the compression strength determining section 2740.

The same subject region identifying section 2730 identifies a plurality of characteristic regions that contain the same subject, from among the characteristic regions of the respective moving-image-component images. Specifically speaking, the same subject region identifying section 2730 identifies ROIs that contain the same person from a plurality of frame images.

The compression strength determining section 2740 determines the compression strengths for characteristic region images in one or more moving-image-component images that have characteristic regions whose information amounts fall within a predetermined range of information amounts within which the maximum information amount among the information amounts of the characteristic regions identified by the same subject region identifying section 2730 falls, where the determined compression strengths are lower than the compression strength for a characteristic region image in at least one different moving-image-component image. With such a configuration, for example, when some of the frame images of a moving image contain a lot of information about a subject, those frame images are recorded at a high image quality, and other frame images containing the same subject may be compressed at a higher strength. As a result, the image processing system 2010 relating to the present embodiment may be able to record images of a subject which are captured at desirable timings at high image qualities, with it being possible to effectively reduce the data amount of a moving image.

The condition obtaining section 2752 obtains the information which is to be stored on the condition storing section 2750, from a source outside the image processing apparatus 2120. Specifically speaking, the condition obtaining section 2752 may obtain assignment conditions differing in accordance with the characters of characteristic regions, so that different compression strengths are assigned in accordance with the characters of characteristic regions. Specifically speaking, the condition obtaining section 2752 may obtain assignment conditions differing in accordance with the types of characteristic regions. For example, the condition obtaining section 2752 may obtain image-quality reduction amounts differing in accordance with the types of characteristic regions, which is to say, reduction amounts in spatial resolution differing in accordance with the types of characteristic regions, reduction amounts in temporal resolution differing in accordance with the types of characteristic regions, or the like. The condition storing section 2750 may store the image-quality reduction amounts differing in accordance with the types of characteristic regions, which are obtained by the condition obtaining section 2752. In this way, the condition storing section 2750 may store the assignment conditions obtained by the condition obtaining section 2752.

The condition obtaining section 2752 may obtain assignment conditions differing in accordance with the characters of the regions indicated by characteristic regions. Specifically speaking, the condition obtaining section 2752 may obtain assignment conditions differing in accordance with the numbers, the sizes or the positions of the characteristic regions. Furthermore, the condition obtaining section 2752 may obtain assignment conditions differing in accordance with the characters of the objects contained in the characteristic region images. Specifically speaking, the condition obtaining section 2752 may obtain assignment conditions differing in accordance with the shapes, the facing directions, the moving directions or the moved distance of the objects contained in the characteristic region images.

The condition obtaining section 2752 may obtain the above-mentioned assignment conditions, from the image processing apparatus 2170 or display apparatus 2180, via the communication network 2110. For example, the image processing apparatus 2170 may transmit, to the image processing apparatus 2120, information indicating the image quality level which is determined in accordance with the remaining space of the recording medium of the image database 2175. For example, as the remaining space decreases, the image processing apparatus 2170 may decrease the image quality level indicated by the information to be transmitted to the image processing apparatus 2120.

Figure 8:
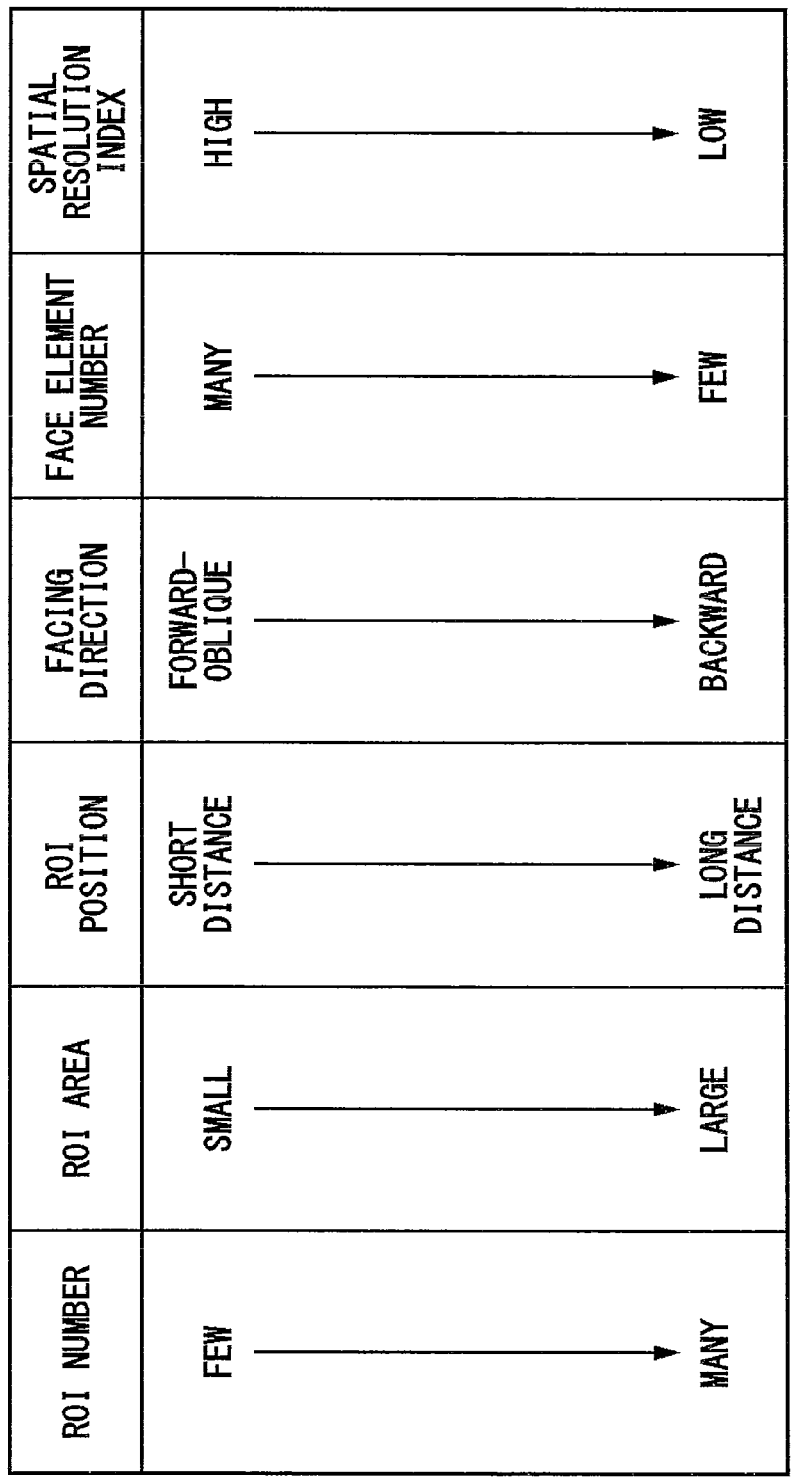
FIG. 8 illustrates an example of the data stored on a condition storing section 2750.

FIG. 8 illustrates, by using a table, an example of the data stored on the condition storing section 2750. The condition storing section 2750 stores a spatial resolution index in association with each of the parameters including a ROI number representing the number of detected ROIs, a ROI area representing the area of the detected ROI, a ROI position representing the position of the detected ROI, a facing direction representing the direction in which a person's face is directed in the ROI, and a face element number representing the number of objects which are recognized as face objects in the ROI. Here, the face element number may denote the number of objects which match, at the degree higher than a predetermined degree of match, objects that are expected to be included in a face, such as eyes, a mouth and a nose.

The spatial resolution index may indicate the image quality of an after-compression frame image. Specifically speaking, the spatial resolution index may indicate at least one of the resolution, the number of gray levels and the number of colors of the after-compression frame image and the quantization coefficient indicating the degree of quantization by the coding unit 2230. As mentioned, the spatial resolution index includes the resolution of the real space and the resolution of the color space. Here, as the spatial resolution index increases, the image quality increases.

Referring to the data stored on the condition storing section 2750 as illustrated in FIG. 8, as the ROI number decreases, the spatial resolution index may increase. Furthermore, as the ROI area decreases, the spatial resolution index may increase. Furthermore, when the ROI position indicates the distance between a predetermined position on a frame image and the center of the ROI, as the distance decreases, the spatial resolution index may increase. In this case, as the ROI becomes positioned closer to a predetermined position at which a face is expected to appear, the spatial resolution index increases.

Furthermore, as the face indicated by the object contained in the ROI becomes directed in a more forward-oblique direction, the spatial resolution index increases. As the face becomes directed in a more backward direction, the spatial resolution index may decrease. Furthermore, as the face element number increases, the spatial resolution index may increase.

When the characteristic region detecting section 2203 detects a ROI which is a face region, the compression strength determining section 2740 calculates, for the detected ROI which is a face region, such parameters as the ROI number, the ROI area, the ROI position, the facing direction, and the face element number. The compression strength determining section 2740 then refers to the data stored on the condition storing section 2750 in order to calculate the spatial resolution index indicating the level of the spatial resolution. For example, the compression strength determining section 2740 extracts spatial resolution indices which are stored on the condition storing section 2750 in association with the calculated ROI number, ROI area, ROI position, facing direction, and face element number, and calculates the sum of the extracted spatial resolution indices.

The compression strength determining section 2740 increases the spatial resolution, as the sum increases. The compression strength determining section 2740 may determine the spatial resolution with reference to a predetermined table in which a sum of spatial resolution indices is associated with a spatial resolution.

In place of the spatial resolution index, the condition storing section 2750 may directly store the resolution, the number of gray levels, the number of colors, or the quantization coefficient indicating the degree of the quantization by the coding unit 2230. The spatial resolution index may be indicative of the spatial frequency band within which the after-compression frame image is expected to have a significant frequency component.

FIG. 9 illustrates, by using a table, a different example of the data stored on the condition storing section 2750. The condition storing section 2750 stores a temporal resolution index in association with the moving speed of the ROI. Here, the temporal resolution index may be indicative of the temporal resolution of an after-compression moving image. Specifically speaking, the temporal resolution index may be indicative of the frame rate or bit rate of the after-compression moving image. Here, as the temporal resolution index increases, the temporal resolution may increase. As seen from the data stored on the condition storing section 2750 as illustrated in FIG. 9, the temporal resolution index may increase as the moving speed increases.

When the characteristic region detecting section 2203 detects a ROI which is a face region from each frame image, the compression strength determining section 2740 calculates the moving speed of the ROI based on the position of the ROI in each frame image. The compression strength determining section 2740 then extracts a temporal resolution index which is stored on the condition storing section 2750 in association with the calculated moving speed. The compression strength determining section 2740 then determines the temporal resolution in accordance with the extracted temporal resolution index. In place of the temporal resolution index, the condition storing section 2750 may directly store an after-compression frame rate or bit rate.

According to FIGS. 8 and 9, the exemplary image-quality index values stored on the condition storing section 2750 are assigned to face-region ROIs. The condition storing section

2750, however, may additionally store a spatial resolution index and a temporal resolution index which are associated with parameters similar to the above, for person-region and movement-region ROIs. Which is to say, a spatial resolution index and a temporal resolution index are designated in association with each of the objects which are expected to be contained in ROIs. Therefore, the image quality levels can be respectively determined for the images of the ROIs in frame images.

As described above, the condition storing section 2750 can store after-compression image qualities or code amounts of ROIs, in association with each of the types of objects. Therefore, the condition storing section 2750 can store the priority order representing the image qualities of ROIs, the ratio of the after-compression code amounts between ROIs, or the like, in association with each of the types of objects.

As described in the above, the compression strength determining section 2740 determines the compression strength at which the image of a characteristic region is compressed, in accordance with the character of the characteristic region. Specifically speaking, the compression strength determining section 2740 determines the compression strength at which the image of a characteristic region is compressed, in accordance with the type of the character of the characteristic region. The compression strength determining section 2740 sets the compression strength at which the image of a background region is compressed higher than the compression strength for the image of the characteristic region.

The condition storing section 2750 stores reduction amounts in spatial resolution differing in accordance with the types of characteristic regions, or reduction amounts in temporal resolution differing in accordance with the types of the characteristic regions. The compression control section 2760 controls the reduction amounts in spatial or temporal resolution which are realized by the image quality reducing section 2221, with reference to at least one of the reduction amounts in the spatial resolution and the reduction amounts in the temporal resolution, which are stored on the condition storing section 2750, in accordance with the types of the characters of the characteristic region images included in characteristic region moving images.

The condition storing section 2750 stores conditions differing in accordance with the characters of the regions indicated by characteristic regions. The compression control section 2760 controls the compression strengths at which the compressing section 2240 respectively compresses characteristic region images, with reference to the conditions stored on the condition storing section 2750, in accordance with the characters of the regions indicated by the characteristic region.

Specifically speaking, the condition storing section 2750 stores conditions differing in accordance with the numbers of characteristic regions, the sizes of characteristic regions, or the positions of characteristic regions. The compression control section 2760 controls the compression strengths at which the compressing section 2240 compresses the respective characteristic region images, with reference to the conditions stored on the condition storing section 2750, in accordance with the numbers, sizes or positions of the regions indicated by the characteristic regions.

The condition storing section 2750 stores conditions differing in accordance with the characters of the objects contained in characteristic region images. The compression control section 2760 controls the compression strengths at which the compressing section 2240 compresses the respective characteristic region images, with reference to the conditions stored on the condition storing section 2750, in accordance with the characters of the objects contained in the characteristic region images.

The condition storing section 2750 may store conditions differing in accordance with the shapes of the objects contained in the characteristic region images, the facing directions of the objects, the moving directions of the objects, or the moved distances of the objects. The compression control section 2760 may control the compression strengths at which the compressing section 2240 compresses the respective characteristic region images, with reference to the conditions stored on the condition storing section 2750, in accordance with the shapes of the objects contained in the characteristic region images, the facing directions of the objects, the moving directions of the objects, or the moved distances of the objects.

FIG. 10 illustrates, by using a table, an example of the data stored on the information amount calculating section 2720. The information amount calculating section 2720 stores the information amount in association with a facing direction and a face element matching degree, where the facing direction denotes the direction in which a person's face is directed and the face element matching degree denotes the degree at which an object contained in an ROI matches an object that is supposed to be present in the person's face.

The information amount calculating section 2720 identifies the facing direction based on what is shown by the image of an object representing a person's face contained in a face-region ROI. For example, the information amount calculating section 2720 identifies the facing direction based on the positions of objects representing eyes, a nose, and a mouth in an object representing a person's head. The information amount calculating section 2720 increases the information amount as the identified facing direction is more forward-oblique, and decreases the information amount as the identified facing direction is more backward.

The information amount calculating section 2720 calculates the degree of match between the outline of an object representing a person's face and a predetermined person's face pattern, for example, by using the pattern matching technique. The information amount calculating section 2720 increases the information amount as the calculated degree of match increases.

As described above, the information amount calculating section 2720 increases the information amount, as the degree at which the object contained in the characteristic region satisfies a predetermined condition increases, where the predetermined condition is related to what is shown by the image and indicates that the object contained in the characteristic region is an object that is supposed to be present in the face of the person 2130. The information amount calculating section 2720 identifies the facing direction of the head of the person 2130 which is represented by an object that satisfies the predetermined condition at a higher degree than a predetermined value, and increases the information amount as the degree of match between the identified facing direction of the head and a predetermined direction increases.

Figure 11:
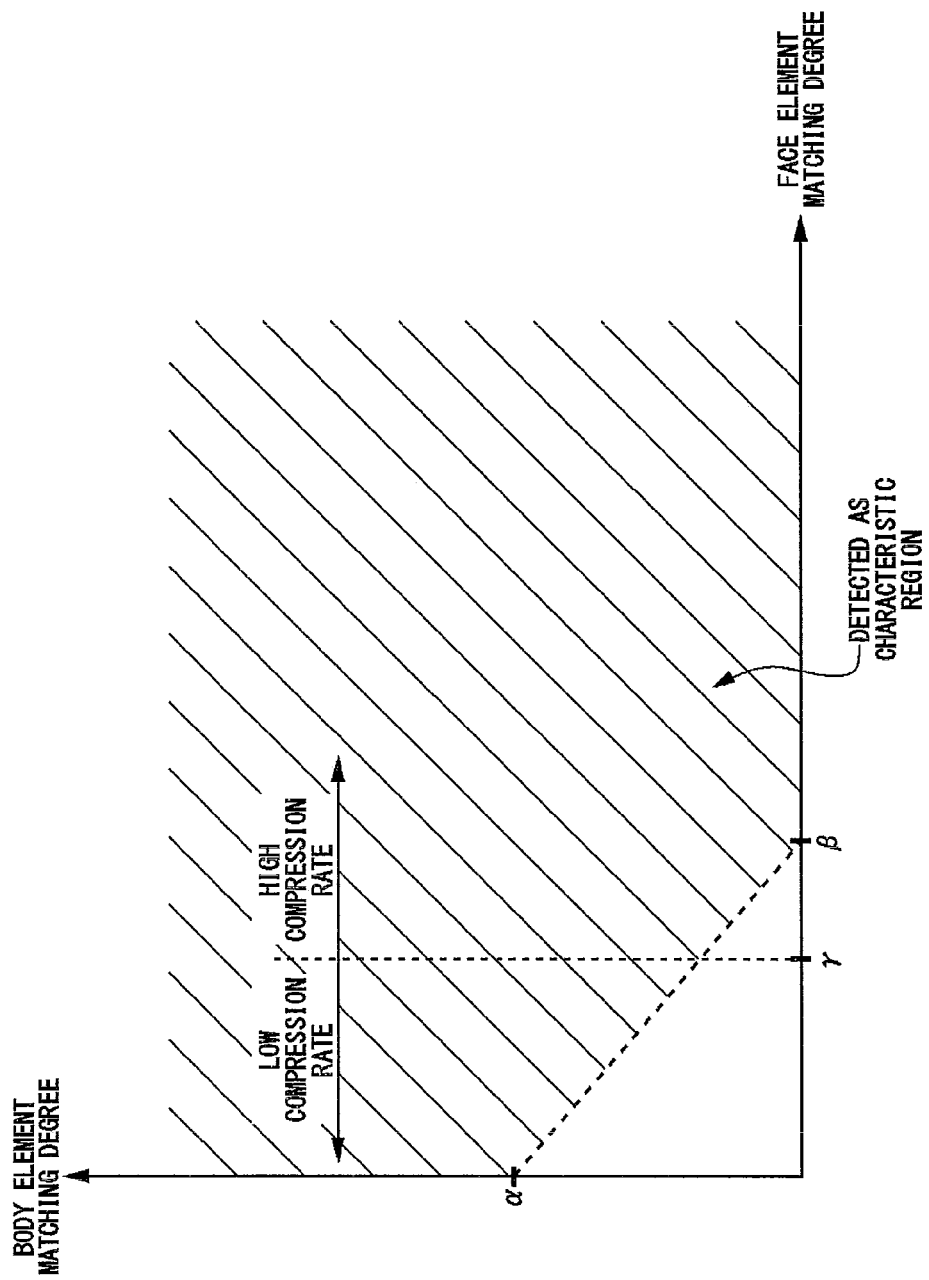
FIG. 11 illustrates an exemplary operation of determining a compression strength performed by a compression strength determining section 2740.

FIG. 11 illustrates an exemplary operation of determining the compression strength which is performed by the compression strength determining section 2740. With reference to FIG. 11, the following describes the domain in which the compression strength determining section 2740 controls the compression strength, by way of a space the coordinate axes of which represent a face element match degree and a body element match degree. Here, the body element match degree may be the degree of match between, for example, the outline of an object contained in a frame image and a predetermined pattern of a person's body.

The characteristic region detecting section 2203 calculates the body element match degree and the face element match degree for an object contained in a frame image. Here, a line is defined which connects a point on the coordinate axis of the body element match degree which indicates a value $\alpha$ and a point on the coordinate axis of the face element match degree which indicates a value $\beta$. With respect to this line, a domain is defined which does not include the origin of the space. When the body element match degree and face element match degree calculated for the object are included within this domain, the characteristic region detecting section 2203 detects a region containing the object as a ROI. The method described with reference to FIG. 11 is only one of the ROI detecting methods. The characteristic region detecting section 2203 can detect ROIs by using different methods.

The compression strength determining section 2740 decreases the compression strength as the face element match degree decreases for an object whose face element match degree is lower than a predetermined value $\gamma$. Alternatively, the compression strength determining section 2740 decreases the compression strength as the face element match degree decreases for an object whose face element match degree is higher than or equal to the predetermined value $\gamma$.

As explained above, the compression strength determining section 2740 determines a low compression strength for a region that contains an object which is highly likely to be a person but highly unlikely to be the person's face. In this manner, the compression strength determining section 2740 determines a low compression strength for a ROI in which the person's face does not appear sufficiently clear. Therefore, the present embodiment may be able to avoid a case where such a ROI is compressed at a high strength and it becomes more difficult to distinguish the face. In the above description with reference to FIG. 11, the compression strength determining section 2740 determines the compression strength by using the face element match degree that is one of the indices indicative of the information amount to make the description simple. The compression strength determining section 2740 may determine the compression strength by using other indices of the information amount than the face element match degree.

Figure 12:
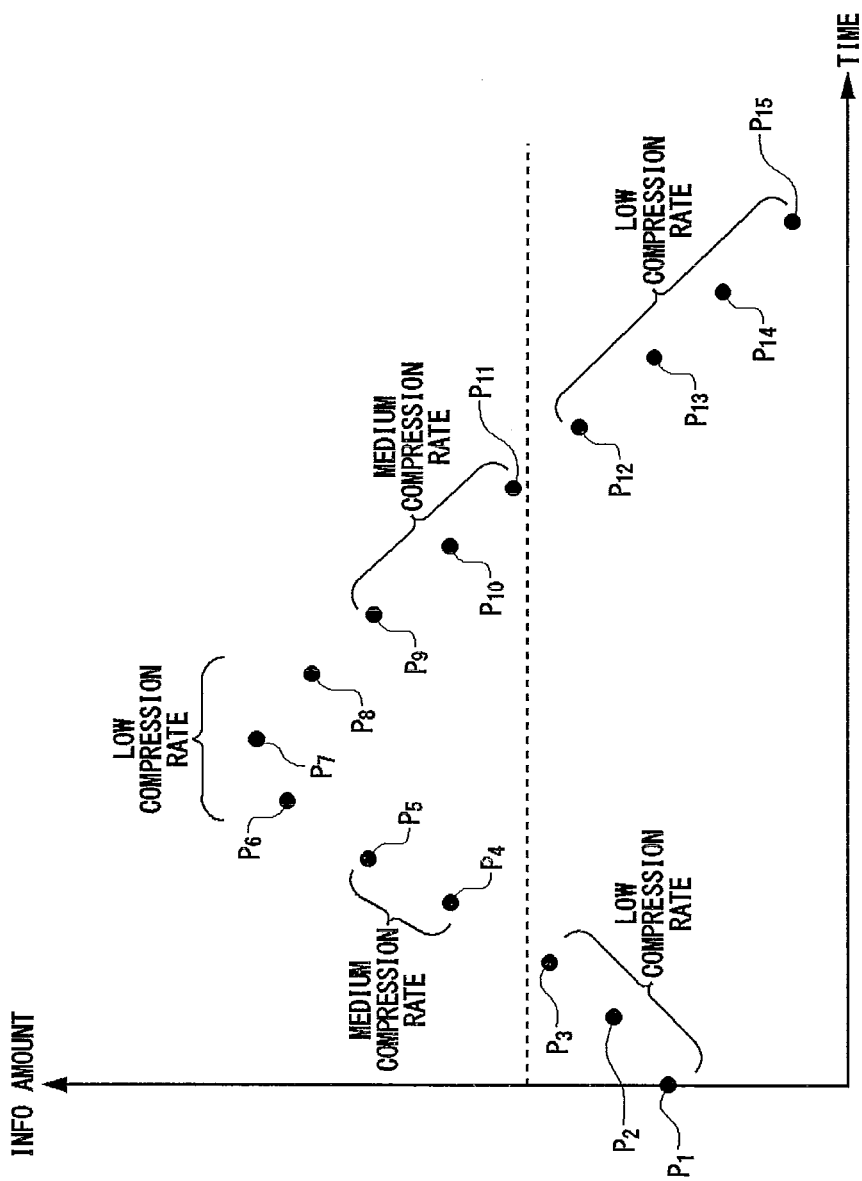
FIG. 12 illustrates the variation, over time, of the information amount calculated by the information amount calculating section 2720, as an example.

FIG. 12 illustrates the variation, over time, of the information amount calculated by the information amount calculating section 2720, as an example. The reference numerals P1 to P15 respectively correspond to a plurality of frame images. Each of the points assigned the reference numerals P1 to P15 indicates the information amount of the same subject contained in a ROI detected from a corresponding one of the frame images P1 to P15. As seen from FIG. 12, the information amount increases as the time elapses, and the information amount reaches a local maximal value at the ROI contained in the frame image P7. After this, the information amount decreases.

When the information amount varies in the above manner, the compression strength determining section 2740 determines the compression rates for the ROIs detected from the frame images P1 to P15, in such a manner that the information amount of the data obtained by compressing each of the ROIs detected from the frame images P6, P7 and P8 exceeds the information amount of the data obtained by compressing each of the ROIs detected from the other frame images P1 to P5 and P9 to P15, where it should be noted that the frame images P6 and P8 are captured at the timings near the timing at which the frame image P7 is captured. Furthermore, the compression strength determining section 2740 determines the compression strengths for the ROIs in such a manner that the information amount is substantially the same in the data obtained by compressing each of the ROIs detected from the frame images P1 to P5 and P9 to P15.

Specifically speaking, the compression strength determining section 2740 determines a predetermined low compression rate for the ROIs detected from the frame images P6 to P8, such that the compression of these ROIs degrades the information amounts in a relatively insignificant manner. Furthermore, the compression strength determining section 2740 determines a low compression rate for the ROIs whose information amounts are equal to or lower than a predetermined value (the ROIs detected from the frame images P1 to P3 and P12 to P15), from among the ROIs detected from the frame images other than the frame images P6 to P8, such that the compression of these ROIs degrades the information amounts in a relatively insignificant manner. Furthermore, the compression strength determining section 2740 determines a medium compression rate that is higher than the low compression rate for the ROIs whose information amounts are higher than the predetermined value (the ROIs detected from the frame images P4, P5, P9, P10 and P11), from among the ROIs detected from the frame images other than the frame images P6 to P8, such that the information amount of the data obtained by compressing each of these ROIs is substantially equal to the information amount of the data obtained by compressing each of the ROIs detected from the frame images P1 to P3 and P12 to P15.

The information amount may vary over time as shown in FIG. 12, for example, when a person moves closer the image capturing apparatus 2100 from a distant position and then moves away from the image capturing apparatus 2100. In this case, the image processing apparatus 2120 may be able to record a high-quality and reliable image of the person by compressing the ROIs detected from the frame images P6, P7 and P8 at a low compression rate, and reasonably reduce the image qualities of the other frame images. With such a configuration, the image processing apparatus 2120 may be able to reduce the data amount of the moving image with it being possible to record a high-quality image of the person.

Figure 13:
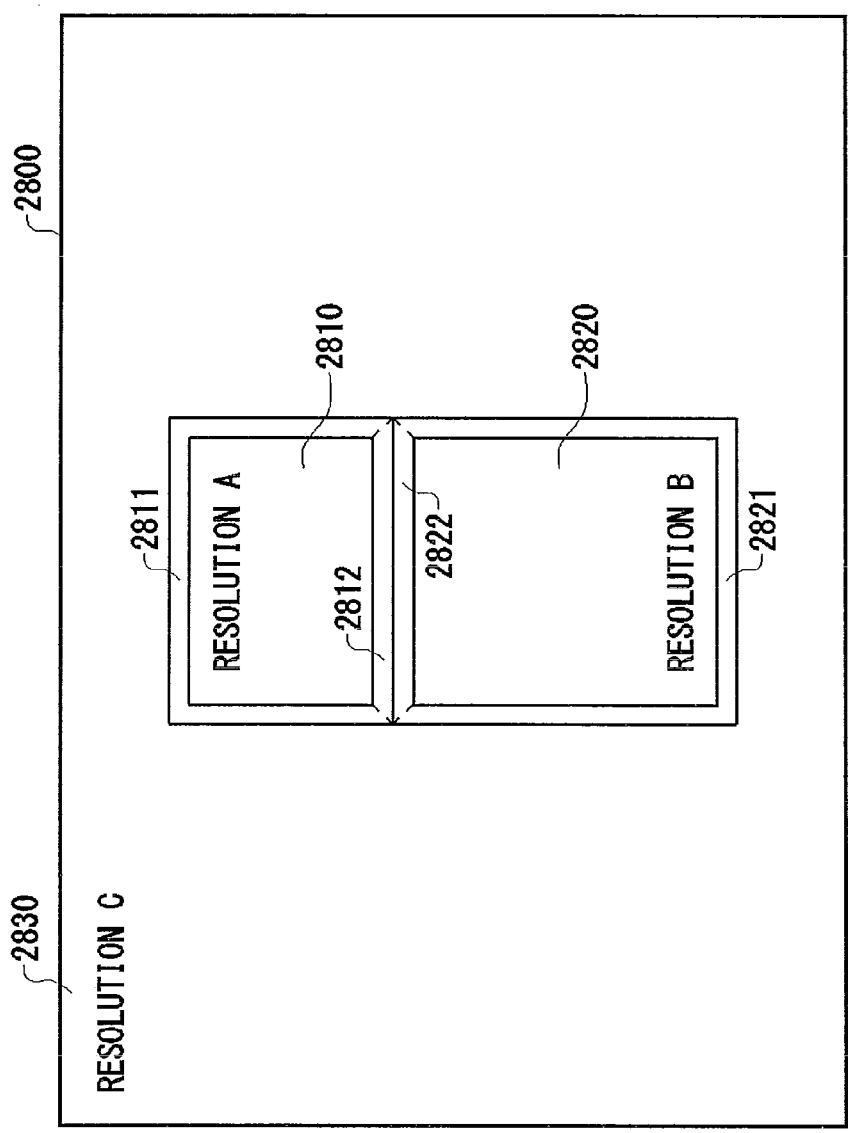
FIG. 13 illustrates, as an example, a boundary region of a ROI.

FIG. 13 illustrates an example of the boundary region for a ROI. As explained earlier, the compression strength determining section 2740 determines the compression strengths for ROIs in accordance with such parameters as the types of the ROIs and the number of the ROIs. For example, the compression strength determining section 2740 determines the resolutions of the ROIs. Furthermore, the compression strength determining section 2740 controls the resolutions of the boundary regions between the ROIs and the background region.

Here, the characteristic region detecting section 2203 detects, as a face-region ROI, a region composed of regions 2810, 2811 and 2812. The characteristic region detecting section 2203 also detects, as a person-region ROI, a region composed of regions 2820, 2821 and 2822, in the vicinity of the face region. In the manner described above with reference to FIGS. 1 to 12, the compression strength determining section 2740 determines a resolution A for the face-region ROI, a resolution B for the person-region ROI, and a resolution C for the background region.

In this case, the boundary region identifying section 2710 identifies, as boundary regions, a region having a predetermined width along the periphery of the face-region ROI and a region having a predetermined width along the periphery of the person-region ROI. The boundary region identifying section 2710 may identify a boundary region inside or outside a ROI. Alternatively, the boundary region identifying section 2710 may identify a boundary region occupying an area both inside and outside a ROI. The compression strength determining section 2740 determines the resolution of the boundary region in accordance with the resolution of the ROI including the boundary region and the resolution of a different ROI or the background region.

Specifically speaking, the compression strength determining section 2740 determines the average resolution between the resolutions A and B as the resolutions of the boundary regions 2812 and 2822 between the face-region ROI and the person-region ROI. Also, the compression strength determining section 2740 determines the average resolution between the resolutions A and C as the resolution of the boundary region 2811 between the face-region ROI and the background region. Furthermore, the compression strength determining section 2740 determines the average resolution between the resolutions B and C as the resolution of the boundary region 2821 between the person-region ROI and the background region. Note that the compression strength determining section 2740 may determine a resolution that gradually varies at a predetermined gradient for the resolutions of the boundary regions.

As stated above, the boundary region identifying section 2710 identifies, as a boundary region, a region within a characteristic region in the vicinity of the boundary between the characteristic region and a non-characteristic region. Here, the boundary region identifying section 2710 may increase the size of the boundary region as the size of the characteristic region increases. The boundary region identifying section 2710 may increase the size of the boundary region as the difference increases between the compression strength for the image of the characteristic region and the compression strength for the image of the background region.

Referring to characteristic regions positioned in the vicinity of each other, the boundary region identifying section 2710 identifies, as a boundary region, the region in the vicinity of the boundary between those characteristic regions. The compression strength determining section 2740 then determines the compression strength for the image of the boundary region in the vicinity of the boundary between those characteristic regions so as to fall within a range between the compression strength for the image of one of the characteristic regions and the compression strength for the image of the other characteristic region. The compressing section 2240 compresses the image of the boundary region in the vicinity of the boundary between the characteristic regions at the compression strength determined by the compression strength determining section 2740.

As stated above, the compression strength determining section 2740 sets the resolution of a boundary region so as to fall within the range between the resolution of a ROI and the resolution of a background region. With such a configuration, the present embodiment may be able to obscure the difference between the resolution of the ROI and the resolution of the background region in the frame images included in the combined moving image generated by the image processing apparatus 2170.

Figure 14:
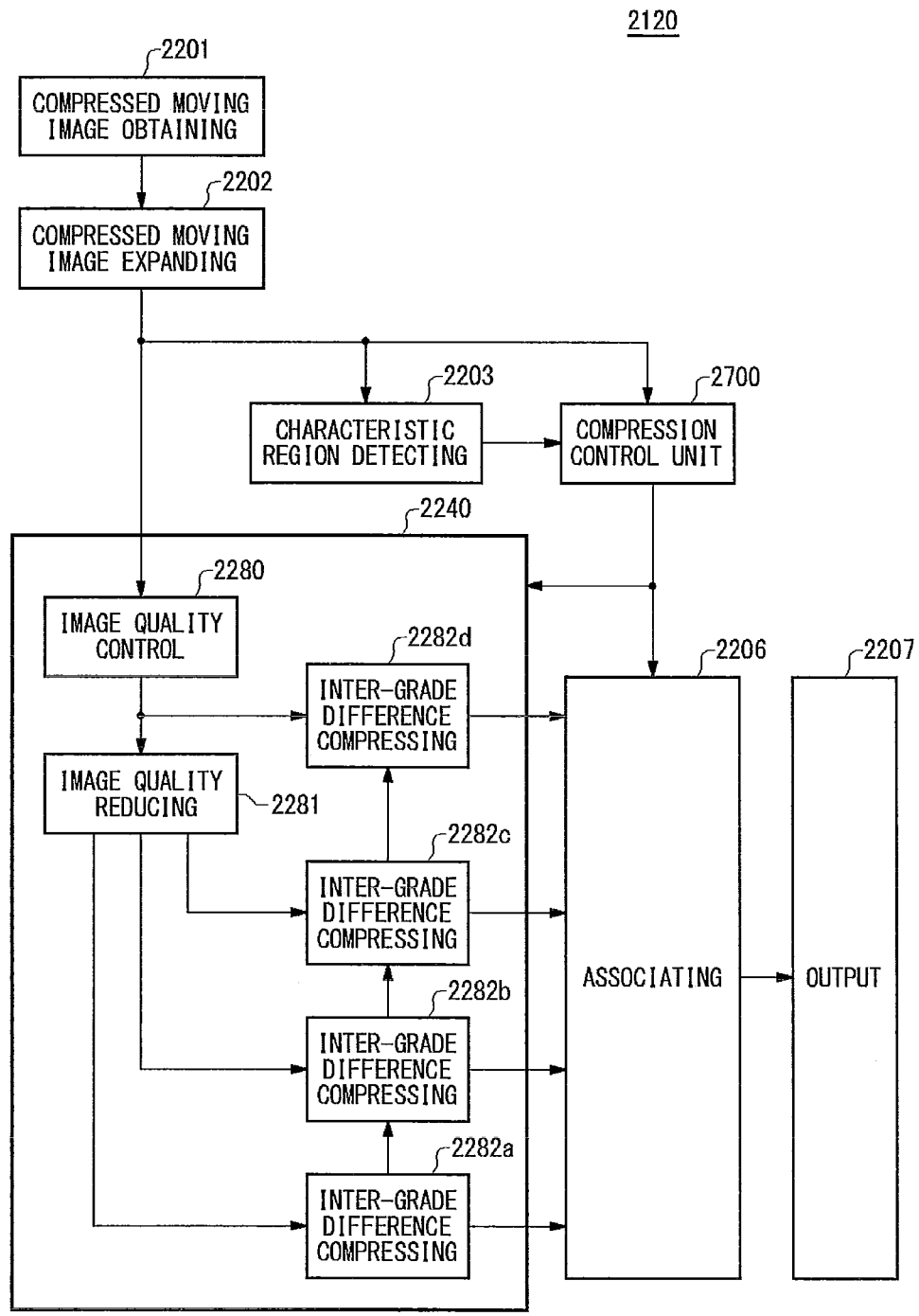
FIG. 14 illustrates another exemplary block configuration of the image processing apparatus 2120.

FIG. 14 illustrates another exemplary block configuration of the image processing apparatus 2120. The image processing apparatus 2120 includes the compressed moving image obtaining section 2201, the compressed moving image expanding section 2202, the characteristic region detecting section 2203, the compressing section 2240, the compression control unit 2700, the associating section 2206, and the output section 207. The compressing section 2240 includes an image quality control section 2280, an image quality reducing section 2281, a plurality of inter-grade difference compressing sections 2282a to 2282d (hereinafter collectively referred to as the inter-grade difference compressing sections 2282).

The compressed moving image obtaining section 2201, the compressed moving image expanding section 2202, the characteristic region detecting section 2203, the compression control unit 2700, the associating section 2206, and the output section 2207 have substantially the same functions and operations as the compressed moving image obtaining section 2201, the compressed moving image expanding section 2202, the characteristic region detecting section 2203, the compression control unit 2700, the associating section 2206, and the output section 2207 described with reference to FIGS. 2 to 13. Therefore, the following does not explain those constituents, unless they are different from their counterparts described with reference to FIGS. 2 to 13.

The image quality control section 2280 controls the image qualities of characteristic regions in each of the moving-image-component images generated by the compressed moving image expanding section 2202 and the image quality of a non-characteristic region, in accordance with the characteristic amounts of the characteristic regions.

The image quality reducing section 2281 reduces the image quality of the moving image, and generates a plurality of moving images with predetermined different image qualities. The image quality reducing section 2281 supplies the generated moving images with different image qualities to the inter-grade difference compressing sections 2282. Specifically speaking, the image quality reducing section 2281 generates the moving images with different image qualities by reducing the frame rate of the moving image, or lowering the resolution of the moving-image-component image included in the moving image. The inter-grade difference compressing sections 2282 respectively obtain from the image quality reducing section 2281 the moving images of the predetermined different image qualities, and compress the obtained moving images. Here, each inter-grade difference compressing section 2282 compresses a moving image having a different image quality. Note that the moving-image-component image included in the moving image supplied to the inter-grade difference compressing section 2282a has a lower image quality than the characteristic region images which are the moving-image-component images included in the moving images supplied to the inter-grade difference compressing sections 2282b to 2282d. Which is to say, the image quality reducing section 2281 generates low-image-quality images having a lower image quality than the characteristic region images supplied to the inter-grade difference compressing section 2282b to 2282d, and supplies the low-image-quality images to the inter-grade difference compressing section 2282a.

As described above, the inter-grade difference compressing section 2282a obtains from the image quality reducing section 2281 the moving-image-component image having a lower resolution than the moving-image-component images received by any of the inter-grade difference compressing sections 2282b to 2282d, and compresses the obtained moving-image-component image. The inter-grade difference compressing sections 2282b to 2282d obtain from the image quality reducing section 2281 the moving-image-component images and compress the obtained moving-image-component images. Here, the resolutions of the moving-image-component images become higher in the order of the inter-grade difference compressing sections 2282b, 2282c, and 2282d.

The inter-grade difference compressing section 2282b expands the moving-image-component image which has been compressed by the inter-grade difference compressing section 2282a, and enlarges the resulting moving-image-component image so as to have the same resolution as the moving-image-component image obtained from the image quality reducing section 2281. The inter-grade difference compressing section 2282b compresses the differential image between the enlarged moving-image-component image and the moving-image-component image obtained from the image quality reducing section 2281. Here, the inter-grade difference compressing section 2282b generates the differential image which has differential values in the characteristic regions but has no differential values in the non-characteristic region and compresses the generated difference image.

The inter-grade difference compressing section 2282c expands the moving-image-component image which has been compressed by the inter-grade difference compressing section 2282b, and enlarges the resulting moving-image-component image so as to have the same resolution as the moving-image-component image obtained from the image quality reducing section 2281. The inter-grade difference compressing section 2282c compresses the differential image between the enlarged moving-image-component image and the moving-image-component image obtained from the image quality reducing section 2281. Here, the inter-grade difference compressing section 2282c generates the differential image which has differential values in at least some of the characteristic regions but has no differential values in the region other than the above-mentioned some of the characteristic regions and compresses the generated differential image. Here, the above-mentioned some of the characteristic regions are selected in accordance with the characteristic amounts of the characteristic regions.

The inter-grade difference compressing section 2282d expands the moving-image-component image which has been compressed by the inter-grade difference compressing section 2282c, and enlarges the resulting moving-image-component image so as to have the same resolution as the moving-image-component image obtained from the image quality control section 2280. The inter-grade difference compressing section 2282d compresses the differential image between the enlarged moving-image-component image and the moving-image-component image obtained from the image quality control section 2280. Here, the inter-grade difference compressing section 2282d generates the differential image which has differential values in at least some of the characteristic regions which are selected in accordance with the characteristic amounts but has no differential values in the region other than the above-mentioned some of the characteristic regions and compresses the generated differential image.

As described above, each of the inter-grade difference compressing sections 2282b to 2282d produces the differential image by calculating the difference between the moving-image-component image received from the image quality control section 2280 or image quality reducing section 2281 and the moving-image-component image obtained by enlarging the moving-image-component image having a lower resolution. The associating section 2206 associates the compressed moving image data including the moving-image-component images obtained by the compressing operations of the inter-grade difference compressing sections 2282a to 2282d, with information identifying the characteristic regions. The output section 2207 transmits to the image processing apparatus 2170 the compressed moving image data which is associated by the associating section 2206 with the information identifying the characteristic regions. As a result, the image processing apparatus 2120 can provide a moving image which has been scalably compressed and coded in accordance with the characteristic amounts of the characteristic regions.

Figure 15A:
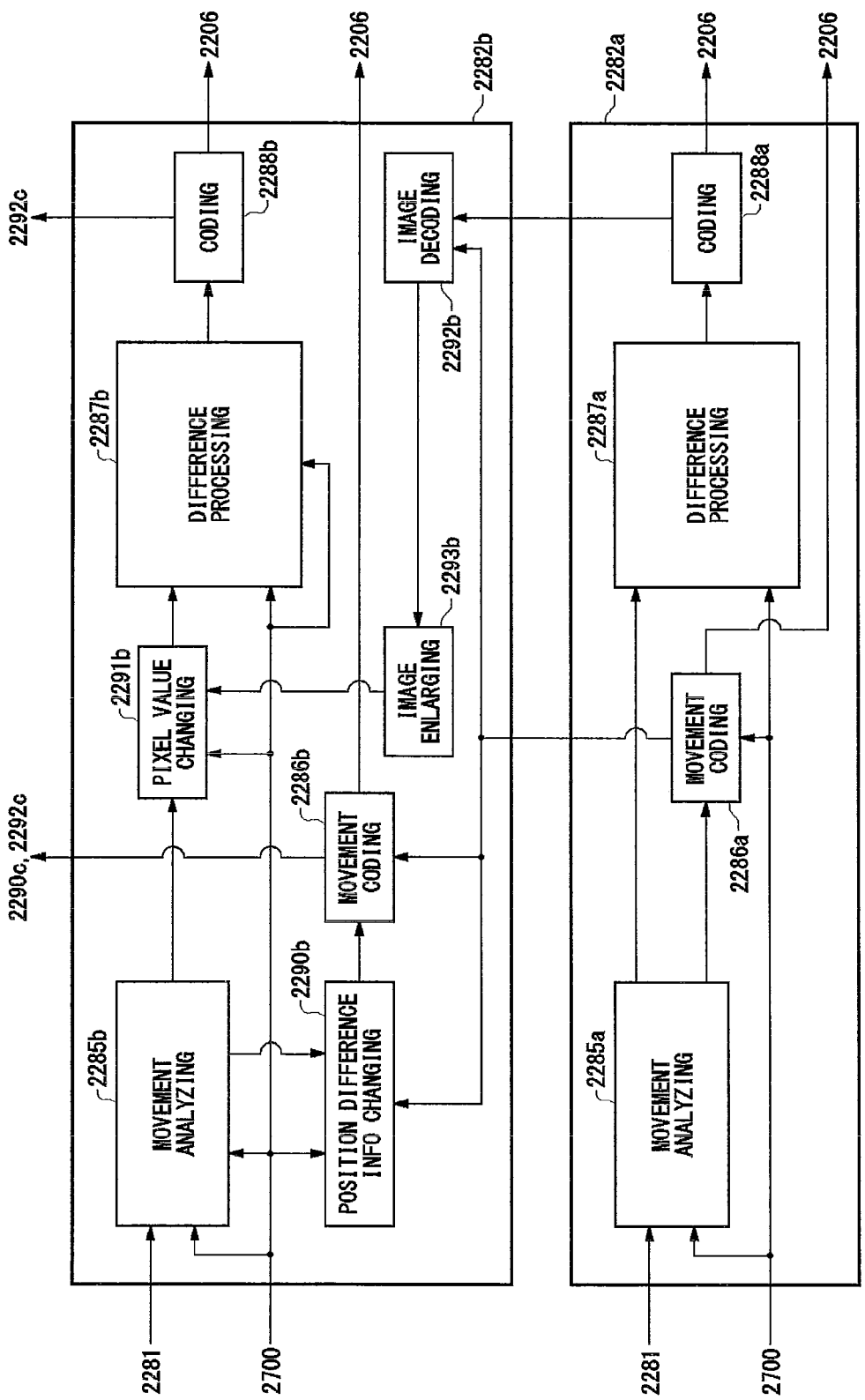
FIG. 15A illustrates exemplary block configurations of inter-grade difference compressing sections 2282a and 2282b.
Figure 15B:
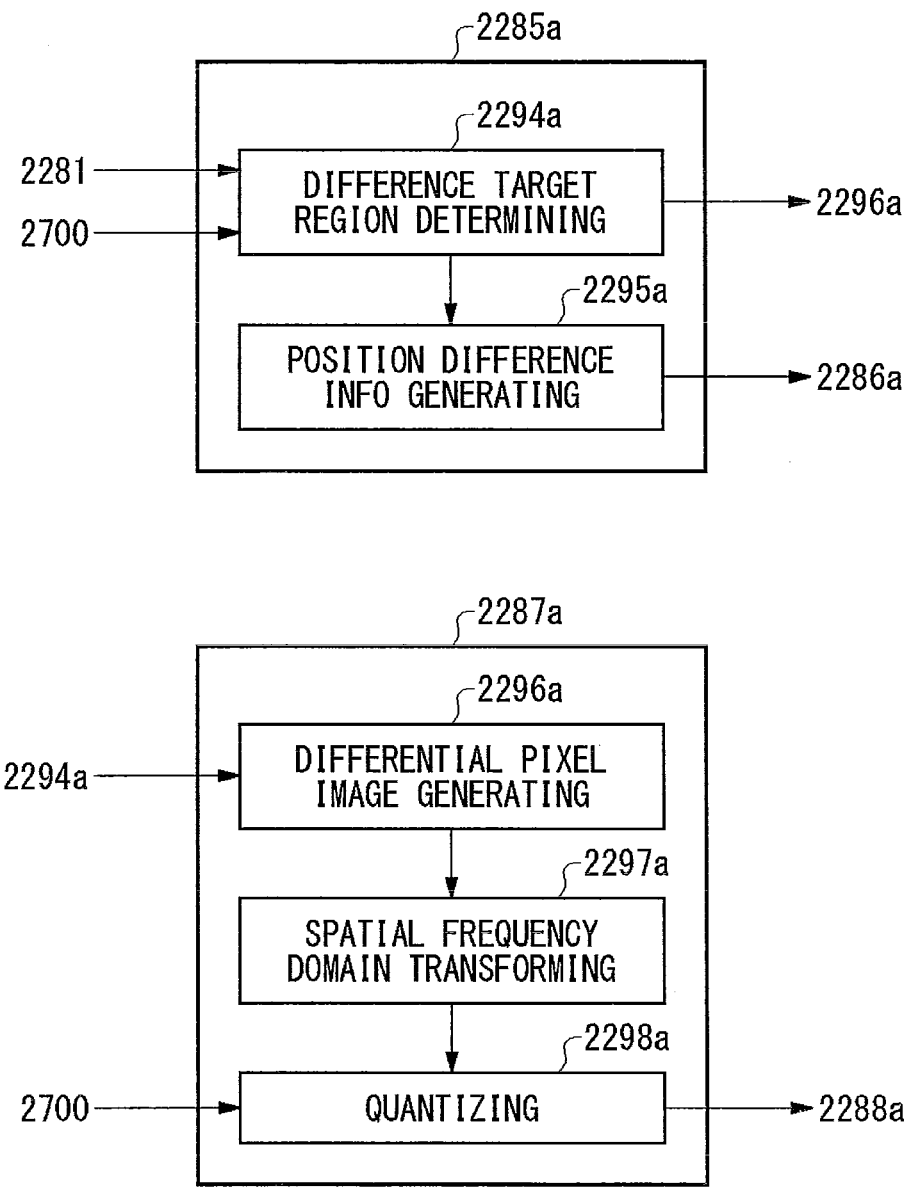
Figure 15C:
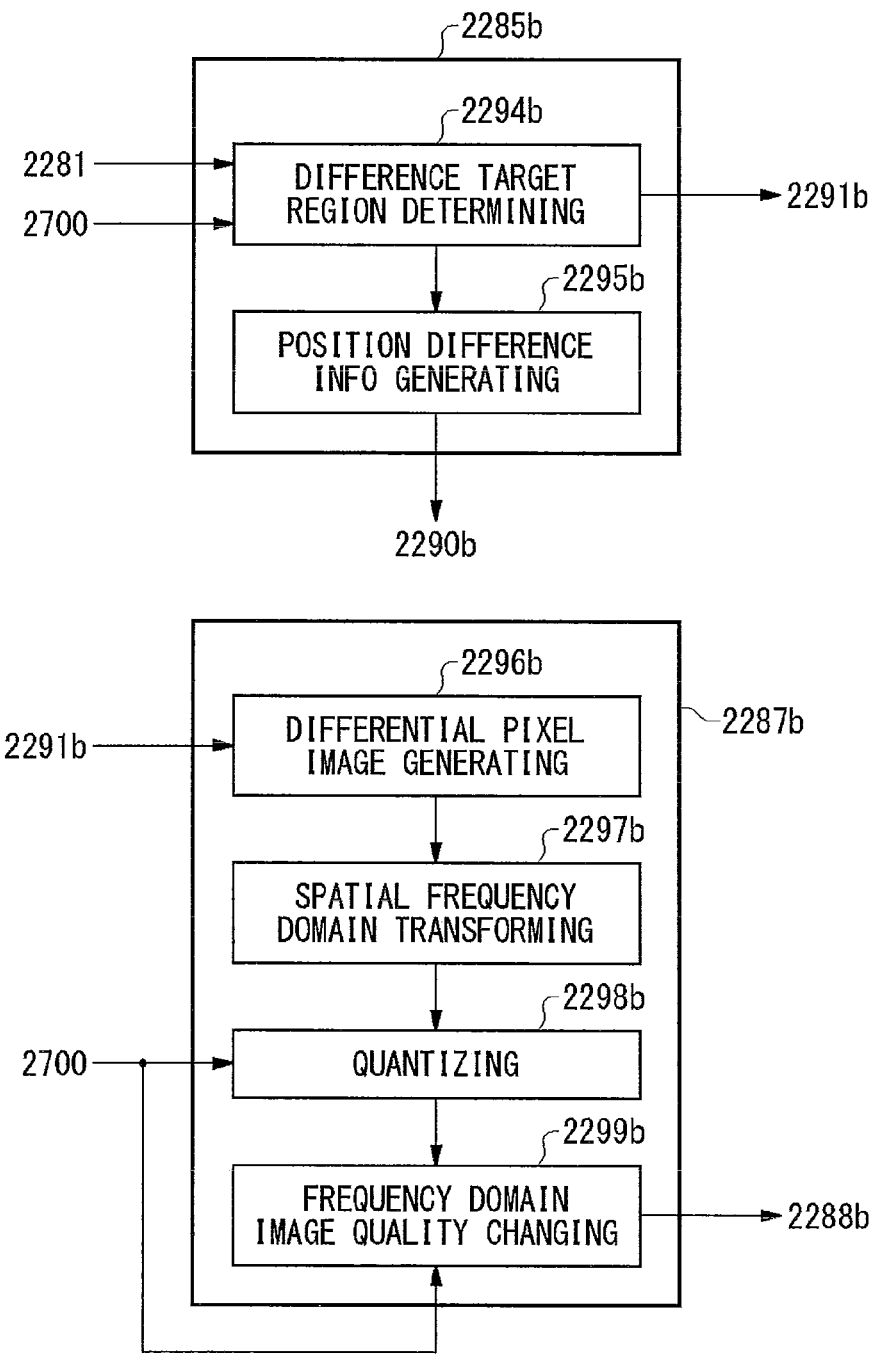
FIG. 15C illustrates exemplary block configurations of a movement analyzing section 2285b and a difference processing section 2287b.

FIG. 15A illustrates exemplary block configurations of the inter-grade difference compressing sections 2282a and 2282b. FIG. 15B illustrates exemplary block configurations of a movement analyzing section 2285a and a difference processing section 2287a. FIG. 15C illustrates exemplary block configurations of a movement analyzing section 2285b and a difference processing section 2287b. The inter-grade difference compressing section 2282a includes a movement analyzing section 2285a, a movement coding section 2286a, a difference processing section 2287a, and a coding section 2288a. The movement analyzing section 2285a includes a difference target region determining section 2294a and a position difference information generating section 2295a. The difference processing section 2287a includes a differential pixel image generating section 2296a, a spatial frequency domain transforming section 2297a and a quantizing section 2298a.

The inter-grade difference compressing section 2282b includes a movement analyzing section 2285b, a movement coding section 2286b, a difference processing section 2287b, an image enlarging section 2293b, an image decoding section 2292b, a pixel value changing section 2291b, and a coding section 2288b. The movement analyzing section 2285b includes a difference target region determining section 2294b and a position difference information generating section 2295b. The difference processing section 2287b includes a differential pixel image generating section 2296b, a spatial frequency domain transforming section 2297b, a quantizing section 2298b, and a frequency domain image quality converting section 2299b. Note that the inter-grade difference compressing sections 2282c and 2282d have substantially the same constituents as the inter-grade difference compressing section 2282b and thus are not explained herein.

The following describes the functions and operations of the constituents of the inter-grade difference compressing section 2282a. The movement analyzing section 2285a receives moving-image-component images from the image quality reducing section 2281, analyzes movement across a plurality of moving-image-component images based on what is shown by the received moving-image-component images, and refers to the analyzed movement to determine a partial region to be compressed in a moving-image-component image.

Specifically speaking, the difference target region determining section 2294a refers to the pixel values of the moving-image-component images in the partial region and, when a moving-image-component image is compressed by calculating its difference from a different moving-image-component image, determines the partial region in the different moving-image-component image that is a difference-target image to be compared to calculate the difference. The difference target region determining section 2294a supplies pixel information of the partial region of the moving-image-component image to be compressed and pixel information of the partial region of the difference-target image, to the difference processing section 2287a.

The position difference information generating section 2295a generates position difference information indicating the difference in position between the partial region to be compressed and the partial region in the difference-target image. Specifically speaking the position difference information generating section 2295a generates a motion vector for use with the motion compensation technique. The position difference information generating section 2295a supplies the generated position difference information to the movement coding section 2286a.

The movement coding section 2286a codes the position difference information supplied from the position difference information generating section 2295a, and supplies the coded position difference information to the associating section 2206. For example, the movement coding section 2286a codes the difference between pieces of position difference information for adjacent partial regions, and supplies the result to the associating section 2206.

The difference processing section 2287a compresses the image of the partial region to be compressed based on the difference between the pixel information of the partial region to be compressed and the pixel information of the partial region in the difference-target image, which are received from the movement analyzing section 2285a. Specifically speaking the differential pixel image generating section 2296a generates a differential pixel image based on the difference between the pixel information of the partial region to be compressed and the pixel information of the partial region in the difference-target image.

The spatial frequency domain transforming section 2297a transforms the differential pixel image of each partial region into a spatial frequency domain. Specifically speaking the spatial frequency domain transforming section 2297a transforms the differential pixel image of each partial region into a spatial frequency domain by the discrete cosine transform (DCT). Here, the spatial frequency domain transforming section 2297a may transform the differential pixel image of each partial region into a spatial frequency domain by using a variety of frequency transforming techniques including Hadamard transformation and wavelet transformation.

When the movement analyzing section 2285a decides that a partial region in a moving-image-component image is not compressed by using its difference from a partial region in a different moving-image-component image, the difference processing section 2287a supplies the pixel information of the partial region to be compressed to the spatial frequency domain transforming section 2297a. The spatial frequency domain transforming section 2297a transforms the pixel information of each partial region into a spatial frequency domain as mentioned above.

The quantizing section 2298a quantizes the transform coefficients obtained as a result of the transformation into the spatial frequency region performed by the spatial frequency domain transforming section 2297a. The coding section 2288a codes the quantized transform coefficients obtained by the quantizing section 2298a, to compress the quantized transform coefficients. For example, the coding section 2288a codes the quantized transform coefficients obtained by the quantizing section 2298a by way of entropy coding such as Huffman coding and arithmetic coding. The coding section 2288a supplies the coded moving image to the associating section 2206.

The following describes the functions and operations of the constituents of the inter-grade difference compressing section 2282b. Here, some of the constituents of the inter-grade difference compressing section 2282b are assigned the same reference numerals as the constituents of the inter-grade difference compressing section 2282a, and have similar functions and operations to their corresponding constituents of the inter-grade difference compressing section 2282a. Therefore, such constituents are not described in the following except for their differences.

For each of the moving-image-component images received from the image quality reducing section 2281, the difference target region determining section 2294b identifies a partial region in a different moving-image-component image that is to be compared to calculate its difference from a partial region in the moving-image-component image to be compressed, similarly to the difference target region determining section 2294a. As described, the difference target region determining section 2294b determines, for a partial region in a characteristic region image, a partial region which is included in a characteristic region image generated from a different moving-image-component image and which is to be compared to calculate its difference from the partial region in the characteristic region image. The difference target region determining section 2294b supplies the pixel information of the partial region to be compressed and the pixel information of the partial region in the difference-target image, to the pixel value changing section 2291b.

The image decoding section 2292b obtains a moving-image-component image from the coding section 2288a, and obtains position difference information from the movement coding section 2286a. The image decoding section 2292b decodes the moving-image-component image obtained from the coding section 2288a by means of the position difference information obtained from the movement coding section 2286a. The image decoding section 2292b may obtain the moving-image-component image which has been quantized by the quantizing section 2298a and decode the obtained moving-image-component image, or may obtain the moving-image-component image which has been coded by the coding section 2288a and decode the obtained moving-image-component images.

The image enlarging section 2293b enlarges the moving-image-component image which has been decoded by the image decoding section 2292b, to generate an enlarged image. The pixel value changing section 2291b replaces the pixel values of a partial region that is not contained in the characteristic region with the pixel values of a partial region in the enlarged image, without changing the pixel values of a partial region containing the characteristic region, where the both partial regions are determined by the difference target region determining section 2294b. In this manner, the pixel value changing section 2291b generates characteristic region images in which the pixel values of a non-characteristic region have been replaced by the pixel values of the enlarged images, based on the received moving-image-component images.

The difference processing section 2287b receives, from the pixel value changing section 2291b, the characteristic region image to be compressed, the image information of the partial region that is a difference target of the partial region contained in the characteristic region image, and the enlarged images. The difference processing section 2287b subsequently selects one of the following three coding techniques for each of the partial regions contained in the characteristic region image to be compressed, where the three coding techniques include intra coding, inter coding and inter-grade coding. The intra coding codes the partial region by using the pixel information of the characteristic region image in which the partial region is contained. The inter coding codes the partial region by means of the difference between the partial region and the difference-target partial region contained in a different moving-image-component image. The inter-grade coding codes the partial region by means of the difference between the partial region and the enlarged images. When making the selection, the difference processing section 2287b gives priority to a coding method which realizes the smallest code amount. Note that the difference processing section 2287b selects the inter-grade coding for the non-characteristic region, since the pixel values in the non-characteristic region are replaced so as to have no differences. Therefore, the following first describes the inter-grade coding and subsequently explains the inter coding and the intra coding.

When the difference processing section 2287b selects the inter-grade coding the differential pixel image generating section 2296b generates a differential pixel image representing a difference in pixel value between the characteristic region image and the enlarged image. Specifically speaking, the differential pixel image generating section 2296b generates the differential pixel image based on the difference between the characteristic region image in which the pixel values in the non-characteristic region are replaced and the enlarged image. Since the pixel values in the non-characteristic region of the characteristic region image are replaced with the pixel values of the enlarged image, the differential pixel image generating section 2296b can generate a differential pixel image which, in the characteristic region, has differential values representing the difference in pixel value between the characteristic region image and the enlarged image and, in the non-characteristic region, has no such differential values.

When the difference processing section 2287b selects the inter coding the differential pixel image generating section 2296b calculates the difference between a characteristic region image generated by the pixel value changing section 2291b based on a moving-image-component image and a characteristic region image generated by the pixel value changing section 2291b based on a different moving-image-component image. Specifically speaking, the differential pixel image generating section 2296b calculates the difference between an image of a partial region contained in the characteristic region and an image of a difference-target partial region which is determined by the difference target region determining section 2294b for the partial region. Since the pixel values in the non-characteristic region in the characteristic region image are replaced with the pixel values of the enlarged image, the differential pixel image generating section 2296b can generate a differential pixel image which, in the partial region contained in the characteristic region, has differential values representing the difference in pixel value between the partial region and the partial region determined by the difference target region determining section 2294b and, in the non-characteristic region, has differential values representing the difference in pixel value between the non-characteristic region and the partial region determined by the difference target region determining section 2294b.

When the difference processing section 2287b selects the intra coding, the differential pixel image generating section 2296b generates a differential pixel image by calculating the difference in pixel value between the image of the partial region contained in each of the characteristic region images and a different region of the characteristic region image, or between the image of the partial region contained in each of the characteristic region images and the same partial region of the characteristic region image.

The spatial frequency domain transforming section 2297b transforms the differential pixel image of each partial region into a spatial frequency domain. Specifically speaking, the spatial frequency domain transforming section 2297b transforms the differential values represented by the differential pixel image of each partial region into a spatial frequency domain, by using DCT, Hadamard transform, or wavelet transform, similarly to the spatial frequency domain transforming section 2297a. The quantizing section 2298b quantizes the transform coefficients obtained as a result of the transformation into the spatial frequency domain performed by the spatial frequency domain transforming section 2297b, similarly to the quantizing section 2298b.

The frequency domain image quality changing section 2299b generates a characteristic region difference image by reducing the data amount of the spatial frequency components of at least some partial regions containing the non-characteristic region, from among the spatial frequency components of the respective partial regions which are obtained by the spatial frequency domain transform performed by the spatial frequency domain transforming section 2297b. Specifically speaking, the frequency domain image quality changing section 2299b reduces the values of the transform coefficients indicating higher frequency components than a predetermined frequency. The frequency domain image quality changing section 2299b may set, at zero, the values of the transform coefficients indicating higher frequency components than a predetermined frequency.

As described above, the difference processing section 2287b generates a characteristic region difference image which, in the characteristic region, has spatial frequency components obtained by transforming the difference between the characteristic region image and the enlarged image into the spatial frequency domain and, in the non-characteristic region, has spatial frequency components with a reduced data amount. The coding section 2288b codes the characteristic region difference image generated by the difference processing section 2287b.

Also as described above, the difference processing section 2287b generates a characteristic region difference image representing a differential image between the image of the characteristic region in the characteristic region image and the image of the characteristic region in the low-image-quality image. Specifically speaking, the difference processing section 2287b generates a characteristic region difference image representing a difference between the image of the characteristic region in the characteristic region image and the image obtained by enlarging the image of the characteristic region in the low-image-quality image.

According to the above description, the pixel value changing section 2291b replaces the pixel values of the non-characteristic region with the pixel values of the enlarged image in order that the differential pixel image has the differential values of zero in at least the non-characteristic region, where the non-characteristic region is different from a characteristic region having a predetermined type of character and different from a characteristic region having a certain type of character that is expected to have higher resolution than the characteristic region. However, the pixel value changing section 2291b can set the differential values in the differential pixel image at zero by using a different method.

For example, the pixel value changing section 2291b may change the pixel values of the non-characteristic region in the moving-image-component image obtained from the image quality reducing section 2281 into a predetermined pixel value, and change the pixel values of the same image region in the enlarged image into the predetermined pixel value. This alternative method also produces such an effect that the differential pixel image has the differential values of zero in the non-characteristic region, thereby substantially reducing the information amount of the non-characteristic region.

As explained above, the pixel value changing section 2291b generates characteristic region images by replacing the pixel values of the non-characteristic region in a moving-image-component image with a predetermined value and replacing the pixel values of the non-characteristic region in the enlarged image with the predetermined value. The differential pixel image generating section 2296b generates a differential pixel image by calculating the difference between the characteristic region image and the enlarged image, in both of which the pixel values have been replaced in the non-characteristic regions.

The pixel value changing section 2291b may replace the pixel values of the non-characteristic region of the moving-image-component image obtained from the image quality reducing section 2281 with the pixel values of the same region in the image obtained by enlarging the moving-image-component image provided to an inter-grade difference compressing section 2282 of a lower grade (for example, the inter-grade difference compressing section 2282a). This alternative method also enables the differential pixel image to have the differential values of substantially zero in the non-characteristic region, thereby substantially reducing the information amount of the non-characteristic region.

The position difference information generating section 2295b generates position difference information indicating the difference in position of a difference-target partial region contained in the non-characteristic region. Specifically speaking, the position difference information generating section 2295b generates position difference information indicating the difference in position between a partial region to be compressed by calculating a difference and a difference-target partial region to be compared to calculate the difference, similarly to the position difference information generating section 2295a. Here, the position difference information includes a motion vector for use with the motion compensation.

The position difference information changing section 2290b changes the position difference information so that the position difference information indicates that the partial region contained in the non-characteristic region is compared with a partial region in the same position to calculate the difference. Specifically speaking, the position difference information changing section 2290b changes the position difference information of the partial region contained in the non-characteristic region into position difference information indicating there is no difference in position. The position difference information changing section 2290b obtains the position difference information from the movement coding section 2286a, and changes the position difference information of the partial region contained in the non-characteristic region into information indicating that there is no difference in position. Specifically speaking, the position difference information changing section 2290b sets the value of the motion vector of the non-characteristic region at zero. For example, the position difference information changing section 2290b sets, at zero, the value of the motion vector of the non-characteristic region received from the position difference information generating section 2295b and sets, at zero, the value of the motion vector of the non-characteristic region received from the movement coding section 2286a.

The movement coding section 2286b codes the position difference information. Specifically speaking, the movement coding section 2286b codes the difference between pieces of position difference information of adjacent partial regions, similarly to the movement coding section 2286a. The movement coding section 2286b supplies the coded position difference information to the associating section 2206.

In the present embodiment, the position difference information changing section 2290 changes the position difference information for the non-characteristic region. The position difference information changing section 2290b may change the position difference information for the non-characteristic region by way of the coding format used by the movement coding section 2286b. Which is to say, the position difference information changing section 2290b may change the position difference information that has been coded by the movement coding section 2286, so that the changed position difference information indicates that the partial region contained in the non-characteristic region is compared with a partial region in the same position to calculate a difference.

The coding section 2288b may generate coded data that has no difference information in the non-characteristic region. Specifically speaking, the coding section 2288b may generate coded data that has no difference information in the partial region contained in the non-characteristic region. The movement coding section 2286b may generate coded data that has no position difference information for the partial region contained in the non-characteristic region. As stated, the coding section 2288b and the movement coding section 2286b generate coded data which indicates that the non-characteristic region shows the same image as the same region in a different moving-image-component image by not having difference information and position difference information. For example, the coding section 2288b and the movement coding section 2286b may generate coded data including a partial region type, which indicates that the partial region contained in the non-characteristic region shows the same image as the same region in a different moving-image-component image.

For example, the coding section 2288b and the movement coding section 2286b may generate coded data including a partial region type, which indicates that the partial region contained in the non-characteristic region is coded by using a coding mode that is based on simple inter-frame prediction coding and has no conversion coefficients. For example, the partial region type may correspond to the Non MC Not Coded mode of the MPEG coding technique. As described above, since the coding section 2288b and the movement coding section 2286b generate coded data without information indicating that the value of the motion vector and the difference information are set at zero, the present embodiment can further reduce the code amount of the coded moving-image-component image. Here, when determining the prediction mode including the above-mentioned coding mode, the inter-grade difference compressing section 2282b may select a prediction mode which can minimize rate distortion cost based on the Lagrange's method of undetermined multipliers.

The inter-grade difference compressing sections 2282c and 2282d each include constituents having the same functions as the constituents of the inter-grade difference compressing section 2282b. In the following description, the constituents of the inter-grade difference compressing sections 2282c and 2282d which have the same names as the corresponding constituents of the inter-grade difference compressing section 2282b are assigned the same reference numerals, where the alphabetical letters b, c and d added to the reference numerals represent the belongingness of the respective constituents from among the inter-grade difference compressing sections 2282b, 2282c and 2282d.

For example, the movement analyzing section 2285c is one of the constituents of the inter-grade difference compressing section 2282c, and the movement analyzing section 2285d is one of the constituents of the inter-grade difference compressing section 2282d. In the following description, a reference number without an alphabetical letter refers to all of the corresponding constituents of the inter-grade difference compressing sections 2282b to 2282d. For example, the pixel value changing section 2291 denotes the pixel value changing sections 2291b to 2291d.

The inter-grade difference compressing sections 2282c and 2282d are different in terms of the operations and functions from the inter-grade difference compressing section 2282*b* in the following aspects. The inter-grade difference compressing sections 2282*c* and 2282*d* obtain moving images of different image qualities from the image quality reducing section 2281 than the inter-grade difference compressing section 2282*b* and process the obtained moving images, and the position difference information changing sections 2290*c* and 2290*d* and the image decoding sections 2292*c* and 2292*d* obtain the position difference information and moving-image-component images for use in the differential processing from different inter-grade difference compressing sections 282, which are designed to process moving images of lower image qualities.

More specifically, the position difference information changing section 2290*c* obtains position difference information from the movement coding section 2286*b*, and changes the obtained position difference information. The image decoding section 2292*c* obtains the position difference information from the movement coding section 2286*b*, obtains moving-image-component images from the coding section 2288*b*, and decodes the obtained moving-image-component images by using the obtained position difference information. The position difference information changing section 2290*d* obtains position difference information from the movement coding section 2286*c*, and changes the obtained position difference information. The image decoding section 2292*d* obtains the position difference information from the movement coding section 2286*c*, obtains moving-image-component images from the coding section 2288*c*, and decodes the obtained moving-image-component images by using the obtained position difference information.

The characteristic region detecting section 2203 detects a plurality of characteristic regions with different types of characters from the input moving-image-component image. In this case, the image quality reducing section 2281 generates a characteristic region image from the input moving-image-component image by reducing the resolution of a characteristic region having a certain type of character, and generates a different characteristic region image having a higher resolution than the above characteristic region image in a characteristic region having a different type of character from the input moving-image-component image. The inter-grade difference compressing sections 2282*b* to 2282*d* are associated with the types of characters in a one-to-one correspondence. Each of the inter-grade difference compressing sections 2282*b* to 2282*d* compresses a characteristic region image in which at least a characteristic region with a predetermined type of character has a different resolution from a non-characteristic region.

Specifically speaking, the inter-grade difference compressing section 2282*b* processes a low-resolution characteristic region image which has the lowest resolution in all of the characteristic regions. The inter-grade difference compressing section 2282*c* processes a medium-resolution characteristic region image which has a higher resolution than the low-resolution characteristic region image in characteristic regions of predetermined character types. The inter-grade difference compressing section 2282*d* processes a high-resolution characteristic region image which has a high resolution in a characteristic region of a different predetermined character type.

As stated, the difference processing section 2287 generates a characteristic region difference image which has, in a characteristic region with a certain type of character and a characteristic region with a different type of character, spatial frequency components obtained by transforming the difference between a characteristic region image and an enlarged image into the spatial frequency domain and, in the remaining region, spatial frequency components with a reduced data amount.

As described above, the difference processing section 2287 generates a characteristic region difference image which has, in a characteristic region with a certain type of character, spatial frequency components obtained by transforming the difference between a characteristic region image and an enlarged image into the spatial frequency domain and, in the remaining region, has spatial frequency components with a reduced data amount, and generates an inter-characteristic-region difference image which, in a characteristic region with a different type of character, has spatial frequency components obtained by transforming the difference between a different characteristic region image and an image obtained by enlarging the characteristic region in the different characteristic region image into the spatial frequency domain and, in the remaining region, has spatial frequency components with a reduced data amount.

The coding section 2288 codes the characteristic region difference image, the inter-characteristic-region difference image, and the low-image-quality image. The associating section 2206 associates, with information identifying the characteristic regions, the position difference information coded by the movement coding sections 2286*a* to 2286*d* and the moving-image-component images (for example, the low-image-quality image, the characteristic region difference image, and the inter-characteristic-region difference image) coded by the coding sections 2288*a* to 2288*d*.

As described above, the inter-grade difference compressing section 2282*a* generates a moving-image-component image whose image quality is reduced in the entire region including a characteristic region, in other words, generates a moving-image-component image containing the low spatial frequency components of the input moving-image-component image. The inter-grade difference compressing section 2282*b* generates a moving-image-component image having frequency components higher than the frequency components of the inter-grade difference compressing section 2282*a* and lower than the frequency components of the inter-grade difference compressing section 2282*c*. The inter-grade difference compressing section 2282*b* generates a moving-image-component image in which the differential values representing the difference between the moving-image-component image and the moving-image-component image generated by the inter-grade difference compressing section 2282*a* are reduced in the non-characteristic region.

Similarly, the inter-grade difference compressing section 2282*c* generates a moving-image-component image having frequency components higher than the frequency components of the inter-grade difference compressing section 2282*b* and lower than the frequency components of the inter-grade difference compressing section 2282*d*. The inter-grade difference compressing section 2282*d* generates a moving-image-component image having higher frequency components than the inter-grade difference compressing section 2282*c*. The inter-grade difference compressing sections 2282*c* and 2282*d* generate moving-image-component images in which the differential values representing the respective differences between the moving-image-component images and the moving-image-component images generated by the inter-grade difference compressing sections 2282*b* and 2282*c* in the non-characteristic region.

As described above, each of the inter-grade difference compressing sections 2282*b*, 2282*c* and 2282*d* processes a moving image in which a characteristic region having a predetermined type of character has a higher image quality than the remaining region. Thus, the inter-grade difference compressing sections 2282*b*, 2282*c* and 2282*d* can provide, to outside, moving images whose image qualities are different in accordance with the types of characters. Here, each of the inter-grade difference compressing sections 2282*b*, 2282*c* and 2282*d* can efficiently compress the moving image by compressing the differences between its moving-image-component images and moving-image-component images with a lower image quality which are processed by a different one of the inter-grade difference compressing sections 2282*b*, 2282*c* and 2282*d*.

When detecting the characteristic amount of each characteristic region, the characteristic region detecting section 2203 may calculate, for each characteristic region, the degree of reliability indicating how reliable the characteristic region is. Each of the inter-grade difference compressing sections 2282*b*, 2282*c* and 2282*d* compresses the image of the characteristic region whose resolution is adjusted in accordance with the characteristic amount and the degree of reliability of the characteristic region. For example, the image quality reducing section 2281 may adjust the resolution of the image of each characteristic region in accordance with the characteristic amount and the degree of reliability of the characteristic region, and supply the adjusted image to the corresponding one of the inter-grade difference compressing sections 2282. For example, the image quality reducing section 2281 may increase the resolution of the image of each characteristic region image as the degree of reliability decreases, where the adjusted resolution is higher than a predetermined resolution in accordance with the characteristic amount.

As described above, the image processing apparatus 2120 performs hierarchical coding by coding the differences between the images of different grades which have different resolutions. As is apparent from this configuration, the compressing method used by the image processing apparatus 2120 partly includes the compressing method of H.264/SVC. When expanding such hierarchically-arranged compressed moving images, the image processing apparatus 2170 decodes the pieces of moving-image data of the respective grades one by one, to obtain a plurality of moving-image-component images associated with each grade. The image processing apparatus 2170 then adds together the region of the obtained moving-image-component images which was coded by using the inter-grade difference and the region of the moving-image-component images associated with a different grade which was compared to calculate the inter-grade difference. In this manner, the image processing apparatus 2170 can generate a plurality of moving-image-component images contained in a moving image for each grade.

Figure 16:
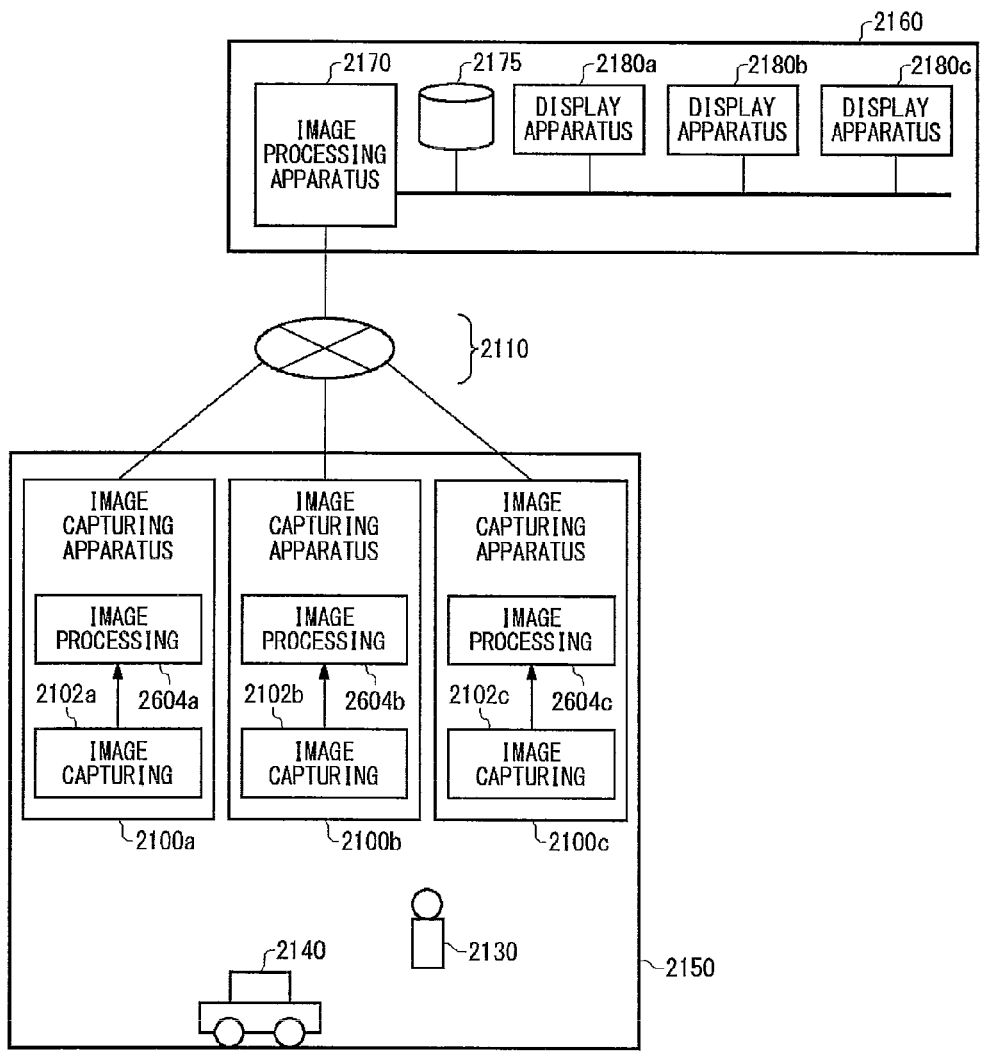
FIG. 16 illustrates an exemplary configuration of an image processing system 2020 relating to a different embodiment.

FIG. 16 illustrates an exemplary configuration of an image processing system 2020 relating to a different embodiment. The image processing system 2020 relating to the present embodiment is configured in the same manner as the image processing system 2010 illustrated in FIG. 1, except that the image processing apparatuses 2120*a* to 2120*c* are replaced by image processing sections 2604*a* to 2604*c* (hereinafter, collectively referred to as the image processing section 2604) included in the image capturing apparatuses 2100*a* to 2100*c*.

The image processing section 2604 includes the constituents of the image processing apparatus 2120 except for the compressed moving image obtaining section 2201 and the compressed moving image expanding section 2202. The constituents of the image processing section 2604 may have substantially the same functions and operations as the corresponding constituents of the image processing apparatus 2120 except that the constituents of the image processing section 2604 process the captured moving image captured by the image capturing section 2102, where the constituents of the image processing apparatus 2120 process the captured moving image which is obtained by the expanding operation of the compressed moving image expanding section 2202. The image processing system 2020 having the above-described configuration can produce the same effects as the image processing system 2010 as described with reference to FIGS. 1 to 15.

The condition obtaining section 2752 included in the image capturing apparatus 2100 may obtain the above-mentioned assignment conditions from a user of the image capturing apparatus 2100, in place of the image processing apparatus 2170. For example, the image capturing apparatus 2100 may have a display device for displaying a setting screen, and the display device may display a setting screen to set assignment conditions such that different image qualities are assigned depending on the respective objects. The condition obtaining section 2752 may obtain the assignment conditions from the user through the setting screen. For example, the condition obtaining section 2752 may obtain the assignment conditions by acquiring the information generated by the user's operation while the setting screen remains displayed on the display device.

The image processing section 2604 may obtain a captured moving image including a plurality of moving-image-component images in the RAW format from the image capturing section 2102. The image processing section 2604 may detect one or more characteristic regions in each of the moving-image-component images in the RAW format. The image processing section 2604 may compress the moving-image-component images in the RAW format included in the obtained captured moving image, without changing the RAW format. Here, the image processing section 2604 can compress the captured moving image by using the compressing methods described in relation to the operations of the image processing apparatus 2120 with reference to FIGS. 1 to 15.

The image processing apparatus 2170 can obtain the moving-image-component images in the RAW format by expanding the compressed moving image obtained from the image processing section 2604. The image processing apparatus 2170 may perform color estimation (coinciding) processing on the moving-image-component images in the RAW format which are obtained by the expansion, for example, on a region to region basis where the regions include the non-characteristic region and the regions containing the characteristic regions. Here, the image processing apparatus 2170 may perform more accurate synchronizing operation on the characteristic regions than on the non-characteristic region.

The image processing apparatus 2170 may perform super-resolution processing on the images of the characteristic regions which are obtained by synchronizing the moving-image-component images. The super-resolution processing performed by the image processing apparatus 2170 can be exemplified by super-resolution processing based on principal component analysis as disclosed in Japanese Patent Application Publication No. 2006-350498, or super-resolution processing based on movement of a subject as disclosed in Japanese Patent Application Publication No. 2004-88615.

Here, the image processing apparatus 2170 may perform the super-resolution processing on each of the objects contained in a characteristic region. For example, when a characteristic region contains the image of a person's face, the image processing apparatus 2170 may perform the super-resolution processing on each of the face elements (for example, the eyes, the nose, the mouth and the like), which are shown as examples of the objects. In this case, the image processing apparatus 2170 stores the learning data of each of the face elements (for example, the eyes, the nose, the mouth and the like), where the learning data is, for example, the model based on the principal component analysis disclosed in Japanese Patent Application Publication No. 2006-350498. The image processing apparatus 2170 may perform the super-resolution processing on the image of each of the face elements included in the characteristic region, by using the learning data selected in association with the face element.

As described above, the image processing apparatus 2170 can reconstruct the images of the characteristic regions by using the principal component analysis. The image reconstruction by the image processing apparatus 2170 and the learning for the image reconstruction may be realized by, other than the principal component analysis (PCA), locality preserving projection (LPP), linear discriminant analysis (LDA), independent component analysis (ICA), multidimensional scaling (MDS), support vector machine (support vector regression), neural network, hidden Markov model, Bayes estimation, maximum a posteriori (MAP) estimation, iterative back projection (IBP), wavelet transform, locally linear embedding (LLE), Markov random field (MRF), and the like.

The learning data may include low frequency components and high frequency components of the image of an object, which are extracted from a large number of sample images of the object, other than the model disclosed in Japanese Patent Application Publication No. 2006-350498. Here, the low frequency components of the image of each of a plurality of objects of different types may be clustered into a plurality of clusters by using the K-means method or other methods. Each cluster may be associated with a representative low frequency component (for example, the value of a barycenter).

The image processing apparatus 2170 extracts a low frequency component from an image of an object contained in a characteristic region in a moving-image-component image. The image processing apparatus 2170 then identifies a cluster whose representative low frequency component matches the extracted low frequency component, from among the clusters of low frequency components extracted from sample images of an object, the type of which is the same as the type of the extracted object. The image processing apparatus 2170 then identifies a cluster of high frequency components associated with the low frequency components included in the identified cluster. In the above manner, the image processing apparatus 2170 can identify the cluster of the high frequency components interrelated to the low frequency component extracted from the object contained in the moving-image-component image.

The image processing apparatus 2170 may convert the image of the object into a high-image-quality image having a higher image quality, by using a high frequency component representative of the identified cluster of high frequency components. For example, the image processing apparatus 2170 may add, to the image of each object, the high frequency component selected in association with the object, with the weight being determined in accordance with the distance from the center of the object to the processing position on the face. Here, the representative high frequency component of each cluster may be generated by using the closed loop training. As described above, the image processing apparatus 2170 may select, for each object, desirable learning data from among pieces of learning data generated by learning the object, and use the selected learning data. Therefore, the image processing apparatus 2170 may be able to enhance the image quality of the image of the object more accurately. Note that the image processing apparatus 2170 can perform the above-described super-resolution processing on the images of the characteristic regions when included in the image processing system 2010 described with reference to FIGS. 1 to 15.

According to the super-resolution processing based on the principal component analysis described in Japanese Patent Application Publication No. 2006-350498, an image of an article is expressed by using a principal component vector and a weighting factor. The data amount of the weighting factor and the principal component vector is significantly smaller than the data amount of the pixel data of the image of the article. Hence, when compressing the images of the characteristic regions of the moving-image-component images obtained from the image capturing section 2102, the image processing section 2604 may calculate the above-mentioned weighting factors from the images of the articles contained in the characteristic regions. In other words, the image processing section 2604 can compress the images of the articles contained in the characteristic regions, by representing the images with the use of the principal component vectors and the weighting factors. The image processing section 2604 may transmit the principal component vectors and the weighting factors to the image processing apparatus 2170.

In this case, the image processing apparatus 2170 can reconstruct the images of the articles contained in the characteristic regions by using the principal component vectors and the weighting factors obtained from the image processing section 2604. Here, the image processing section 2604 can also compress the images of the articles contained in the characteristic regions by using models in which articles are expressed with the use of a variety of other character parameters, other than the model based on the principal component analysis disclosed in Japanese Patent Application Publication No. 2006-350498.

Figure 17:
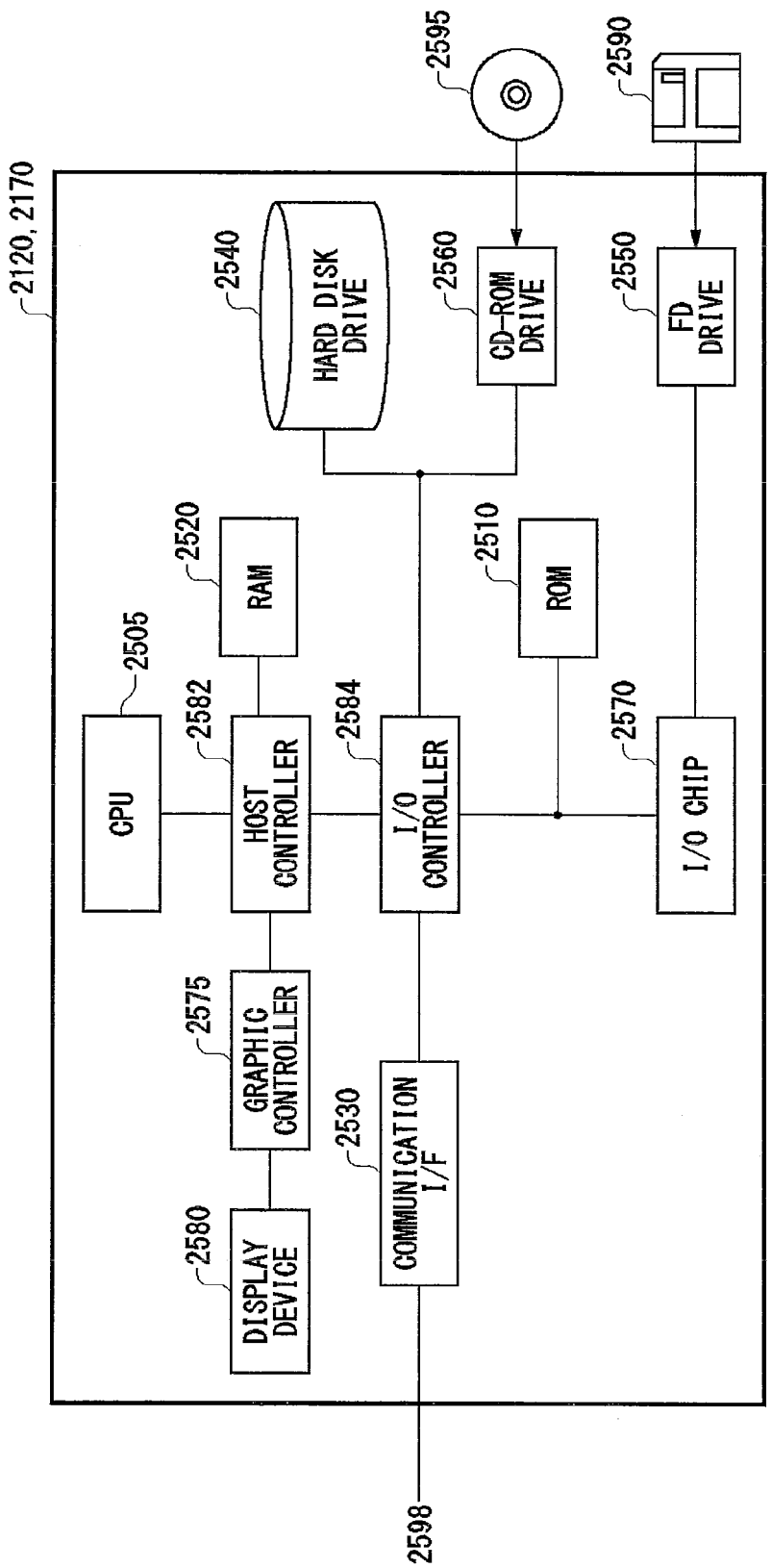
FIG. 17 illustrates an exemplary hardware configuration of image processing apparatuses 2120 and 2170.

FIG. 17 illustrates an exemplary hardware configuration of the image processing apparatuses 2120 and 2170. The image processing apparatuses 2120 and 2170 are each constituted by a CPU surrounding section, an input/output (I/O) section and a legacy I/O section. The CPU surrounding section includes a CPU 2505, a RAM 2520, a graphic controller 2575, and a display device 2580 which are connected to each other by means of a host controller 2582. The I/O section includes a communication interface 2530, a hard disk drive 2540, and a CD-ROM drive 2560 which are connected to the host controller 2582 by means of an I/O controller 2584. The legacy I/O section includes a ROM 2510, a flexible disk drive 2550, and an I/O chip 2570 which are connected to the I/O controller 2584.

The host controller 2582 connects the RAM 2520 with the CPU 2505 and graphic controller 2575 which access the RAM 2520 at a high transfer rate. The CPU 2505 operates in accordance with programs stored on the ROM 2510 and RAM 2520, to control the constituents. The graphic controller 2575 obtains image data which is generated by the CPU 2505 or the like on a frame buffer provided within the RAM 2520, and causes the display device 2580 to display the obtained image data. Alternatively, the graphic controller 2575 may include therein a frame buffer for storing thereon image data generated by the CPU 2505 or the like.

The I/O controller 2584 connects, to the host controller 2582, the hard disk drive 2540, communication interface 2530 and CD-ROM drive 2560 which are I/O devices operating at a relatively high rate. The hard disk drive 2540 stores thereon programs and data to be used by the CPU 2505. The communication interface 2530 couples to the network communication apparatus 2598, to transmit/receive programs or data. The CD-ROM drive 2560 reads programs or data from a CD-ROM 2595, and supplies the read programs or data to the hard disk drive 2540 and communication interface 2530 via the RAM 2520.

The I/O controller 2584 is also connected to the ROM 2510, flexible disk drive 2550 and I/O chip 2570 which are I/O devices operating at a relatively low rate. The ROM 2510 stores thereon a boot program executed by the image processing apparatuses 2120 and 2170 at the start up, programs dependent on the hardware of the image processing apparatuses 2120 and 2170, and the like. The flexible disk drive 2550 reads programs or data from a flexible disk 2590, and supplies the read programs or data to the hard disk drive 2540 and communication interface 2530 via the RAM 2520. The I/O chip 2570 is used to connect a variety of I/O devices such as the flexible disk drive 2550 via, for example, a parallel port, a serial port, a keyboard port, a mouse port or the like.

The program to be executed by the CPU 2505 is provided by a user in the state of being stored on a recording medium such as the flexible disk 2590, the CD-ROM 2595, and an IC card. The program may be stored on the recording medium in the state of being compressed or not being compressed. The program is installed from the recording medium onto the hard disk drive 2540, read by the RAM 2520, and executed by the CPU 2505. The program executed by the CPU 2505 causes the image processing apparatus 2120 to function as the compressed moving image obtaining section 2201, the compressed moving image expanding section 2202, the characteristic region detecting section 2203, the image dividing section 2204, the image generating section 2205, the value fixing section 2211, the image quality reducing section 2221, the coding section 2231, the associating section 2206, the output section 2207, the boundary region identifying section 2710, the information amount calculating section 2720, the same subject region identifying section 2730, the compression strength determining section 2740, the condition storing section 2750, the condition obtaining section 2752, and the compression control section 2760 described with reference to FIGS. 1 to 16. The program executed by the CPU 2505 also causes the image processing apparatus 2170 to function as the compressed moving image obtaining section 2301, the association analyzing section 2302, the compressed moving image expanding section 2311, the combining section 2303, and the output section 2304 described with reference to FIGS. 1 to 16.

The program mentioned above may be stored on an external recording medium. The recording medium is, for example, an optical recording medium such as DVD and PD, a magnet-optical recording medium such as MD, a tape medium, a semiconductor memory such as an IC card and the like, in addition to the flexible disk 2590 and CD-ROM 2595. The recording medium may be a storage device such as a hard disk or RAM which is provided in a server system connected to a dedicated communication network or the Internet, and the program may be provided to the image processing apparatuses 2120 and 2170 via the network.

Figure 18:
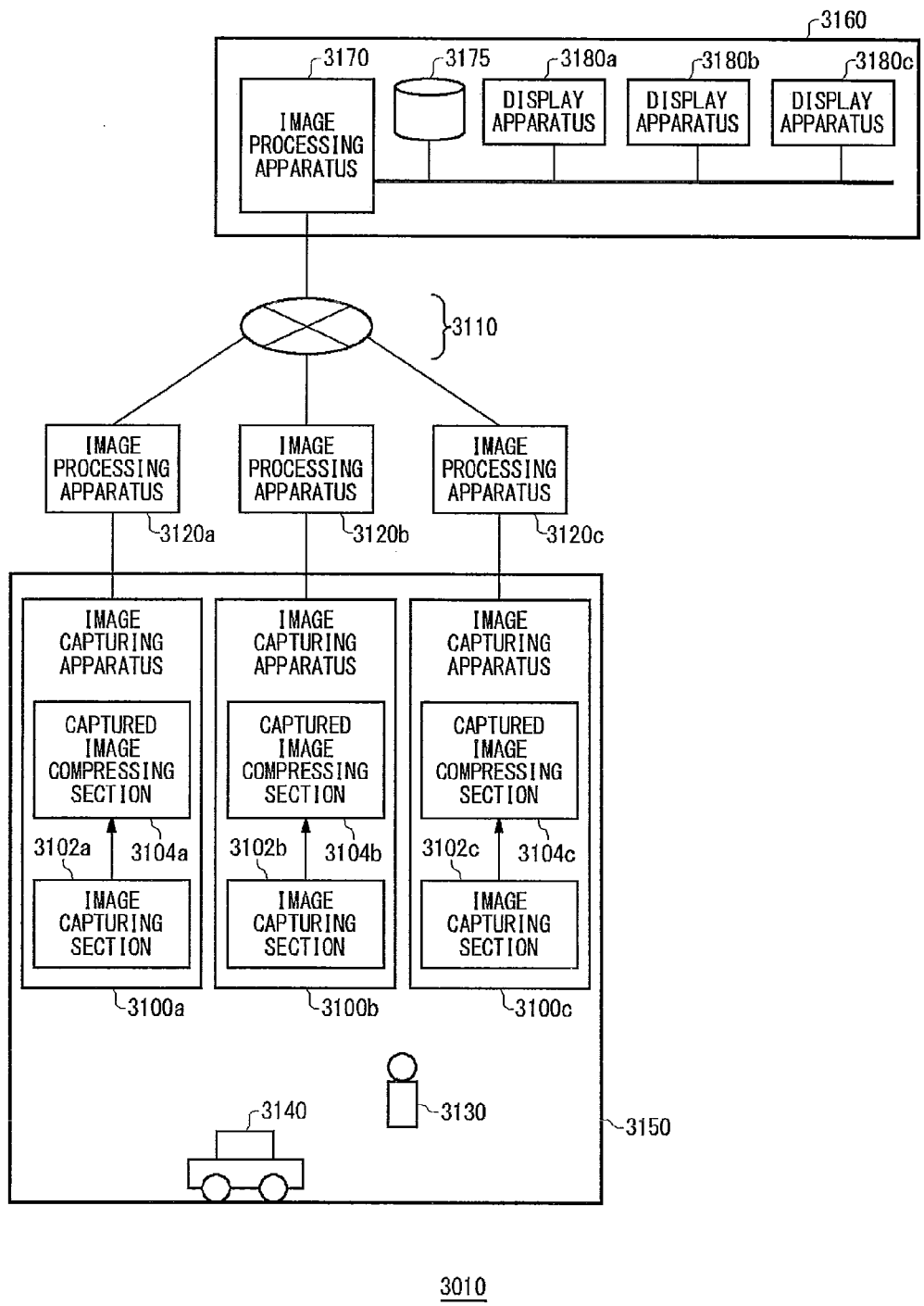
FIG. 18 shows one example of an image processing system 3010 according to an embodiment.

FIG. 18 shows one example of an image processing system 3010 according to an embodiment. The image processing system 3010 aims for reducing the data amount of an image while keeping the image quality of a characteristic object high.

The image processing system 3010 includes a plurality of image capturing apparatuses 3100a to 3100c (hereinafter collectively referred to as image capturing apparatuses 3100) that capture images of a monitored area 3150, a plurality of image processing apparatuses 3120a to 3120c (hereinafter collectively referred to as image processing apparatuses 3120) that process images, an image processing apparatus 3170, a communication network 3110, an image DB 3175, and a plurality of display apparatuses 3180a to 3180c (hereinafter collectively referred to as display apparatuses 3180).

The image processing apparatus 3120a is connected to the image capturing apparatus 3100a. The image processing apparatus 3120b is connected to the image capturing apparatus 3100b. The image processing apparatus 3120c is connected to the image processing apparatus 3100c. The image processing apparatus 3170 and the display apparatuses 3180 are provided in an area 3160 different from the monitored area 3150.

The operations of the image capturing apparatus 3100a, the image processing apparatus 3120a, the image processing apparatus 3170, and the display apparatus 3180a will be explained below. The image capturing apparatus 3100a captures an image of the monitored area 3150, encodes the acquired captured image according to MPEG scheme to generate captured moving image data, and outputs the data to the image processing apparatus 3120a, to which the image capturing apparatus 3100a is connected.

Specifically, the image capturing apparatus 3100a includes an image capturing section 3102a and a captured moving image compressing section 3104a. The image capturing section 3102a captures an image of the monitored area 3150, and generates a plurality of moving image constituent images included in the captured moving image. The image capturing section 3102a may generate moving image constituent images in RAW format. The captured moving image compressing section 3104a performs color estimation (a coinciding process) on the RAW-format moving image constituent images generated by the image capturing section 3102a and compresses the captured moving image including a plurality of moving image constituent images resulting from the color estimation (coinciding process) according to MPEG encoding or the like, thereby generating captured moving image data.

The image processing apparatus 3120a acquires the captured moving image data generated by the image capturing apparatus 3100a. The image processing apparatus 3120 generates the captured moving image by decoding the captured moving image data acquired from the image capturing apparatus 3100, and detects, from the generated captured moving image, a plurality of characteristic regions including characteristics of different categories from each other, including, for example, a person 3130, a moving object 3140 such as a car, etc. The image processing apparatus 3120a generates a plurality of characteristic region moving images from the captured moving image, by generating a plurality of moving images, in each of which the characteristic region of a corresponding category of characteristic is superior in image quality to the rest of the region in the moving image. The image processing apparatus 3120a generates a background region moving image, which shows the background region of the characteristic regions in a lower image quality than that of the characteristic region moving images.

The image processing apparatus 3120a encodes the plurality of generated characteristic region moving images and the generated background region moving image, to generate a plurality of characteristic region moving image data, and background region moving image data. At the same time, the image processing apparatus 3120a associates the plurality of characteristic region moving image data obtained by encoding with the background region moving data likewise obtained by encoding, and sends each associated data to the image processing apparatus 3170 via the communication network 3110.

The image processing apparatus 3170 decodes each of the plurality of characteristic region moving image data and the background region moving image data sent from the image processing apparatus 3120a to obtain the plurality of characteristic region moving images and the background region moving image. The image processing apparatus 3170 combines the plurality of characteristic region moving images and the background region moving image to generate a composite moving image, and supplies the generated composite moving image to the display apparatus 3180a. The display apparatus 3180a displays the moving image supplied from the image processing apparatus 3170.

The image processing apparatus 3170 may record the generated composite moving image or the captured moving image data acquired from the image processing apparatus 3120a in the image DB 3175. The image processing apparatus 3170 may supply the composite moving image recorded in the image DB 3175 to the display apparatus 3180a at a request from the display apparatus 3180a. The image processing apparatus 3170 may decode the captured moving image data recorded in the image DB 3175 in the above-described decoding manner, and supply it to the display apparatus 3180a at a request from the display apparatus 3180a. The image DB 3175 may include, for example, a non-volatile recording medium such as a hard disk, and record the composite moving image supplied from the image processing apparatus 3170 in the recording medium.

The image capturing apparatus 3100b and the image capturing apparatus 3100c include a component that has the same function as the component included in the image capturing section 3102a. The function and operation of the image capturing apparatus 3100b and image capturing apparatus 3100c will not be explained, because they are identical with those of the image capturing apparatus 3100a, except that the image capturing apparatus 3100b and image capturing apparatus 3100c supply captured moving image data to the image processing apparatus 3120b and image processing apparatus 3120c respectively. Note that in the following explanation, the image capturing sections 3102a to 3102c may sometimes be referred to collectively as image capturing sections 3102, and that the captured moving image compressing sections 3104a to 3104c may sometimes be referred to collectively as captured moving image compressing sections 3104.

The image processing apparatus 3120b and image processing apparatus 3120c may have the same function and operation as those of the image processing apparatus 3120a except that they acquire captured moving image data from the image capturing apparatus 3100b and the image capturing apparatus 3100c respectively. Thus, their function and operation will not be explained. The image processing apparatus 3170 generates one moving image from a plurality of characteristic region moving image data and background region moving image data that are associated with each other and acquired from the image capturing apparatus 3100b or the image capturing apparatus 3100c, and supplies the generated moving image to the display apparatus 3180b or the display apparatus 3180c. The display apparatus 3180b and the display apparatus 3180c display the moving image supplied from the image processing apparatus 3170.

When used as, for example, a surveillance system, the image processing system 3010 according to the present embodiment may be able to acquire a high-quality image of any suitable surveillance target object that is outstanding, such as a person, a moving object, etc. Besides, the image processing system 3010 may be able to reduce the data amount of a moving image.

Figure 19:
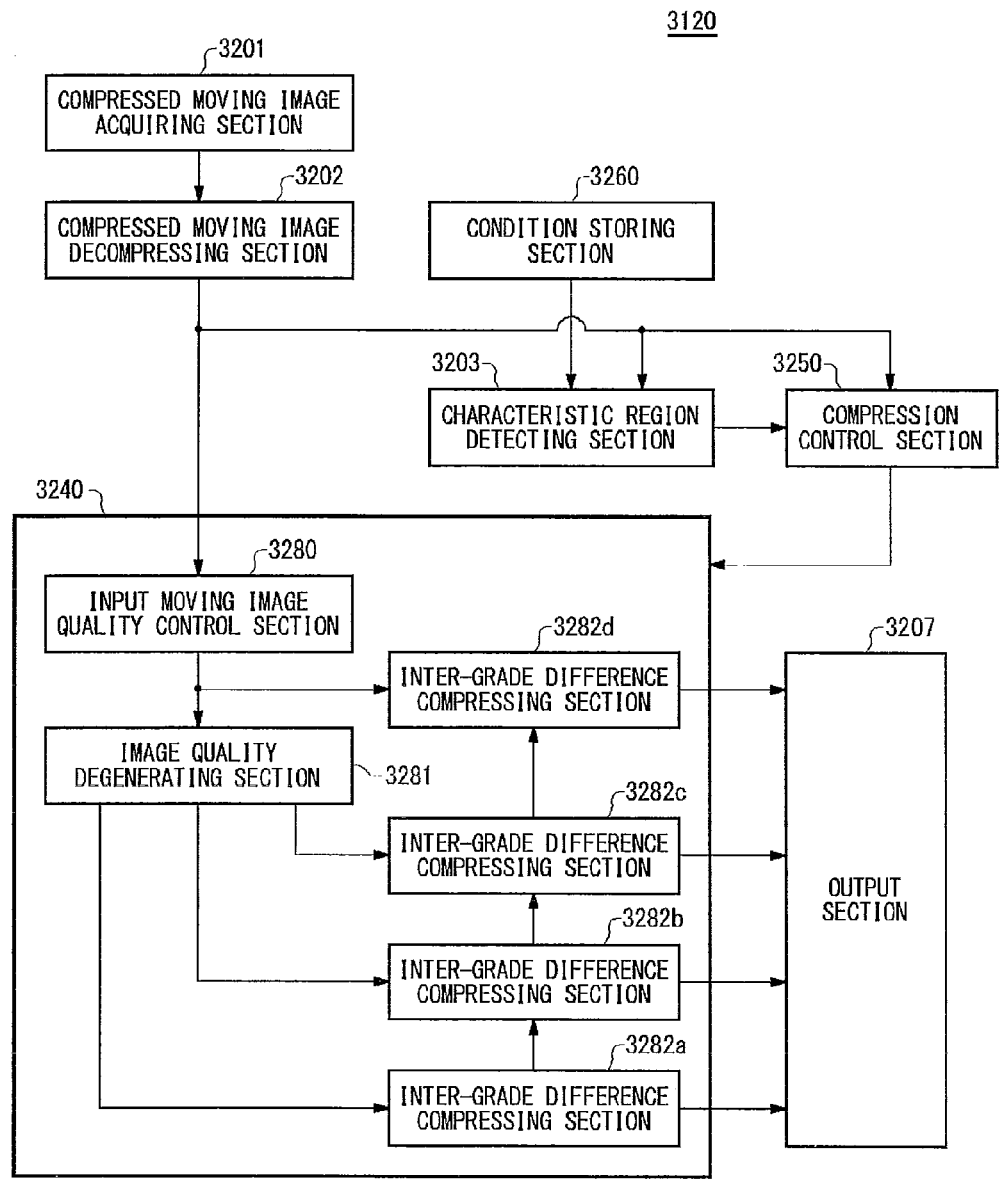
FIG. 19 shows one example block configuration of an image processing apparatus 3120.

FIG. 19 shows one example block configuration of the image processing apparatus 3120. The image processing apparatus 3120 includes a compressed moving image acquiring section 3201, a compressed moving image decompressing section 3202, a condition storing section 3260, a compression control section 3250, a compressing section 3240, and an output section 3207. The compressing section 3240 includes an input moving image quality control section 3280, an image quality degenerating section 3281, and inter-grade difference compressing sections 3282a to 3282d which will be hereinafter collectively referred to as inter-grade difference compressing sections 3282.

The compressed moving image acquiring section 3201 acquires a compressed moving image. Specifically, the compressed moving image acquiring section 3201 acquires encoded captured moving image data generated by the image capturing apparatus 3100. The compressed moving image decompressing section 3202 restores the moving image from the data acquired by the compressed moving image acquiring section 3201 to generate a plurality of moving image constituent images included in the moving image.

Specifically, the compressed moving image decompressing section 3202 decodes the captured moving image data acquired by the compressed moving image acquiring section 3201 to generate a plurality of moving image constituent images included in the moving image. The moving image constituent images include frame images and field images. The moving image constituent images are one example of input image according to the present invention.

A characteristic region detecting section 3203 detects characteristic regions from the plurality of moving image constituent images included in the moving image. The compressing section 3240 compresses the plurality of moving image constituent images generated by the compressed moving image decompressing section 3202. For example, the compressing section 3240 compresses the moving image constituent images according to the quantities of characteristics of the characteristic regions detected by the characteristic region detecting section 3203.

For example, the compressing section 3240 compresses images of the plurality of characteristic regions by different encoding manners respectively, according to the quantities of characteristics of the objects included in the plurality of characteristic regions respectively. Specifically, the compression control section 3250 supplies the compressing section 3240 with information indicating the characteristic regions detected by the characteristic region detecting section 3203, and controls the encoding manners of the compressing section 3240 for compressing the plurality of moving image constituent images. The function and operation of each component of the compressing section 3240 will be explained below. The function and operation of the compression control section 3250 will be explained with reference to FIG. 21.

The input moving image quality control section 3280 controls the image quality of the characteristic regions and the image quality of the region other than the characteristic regions, according to the quantities of characteristics of the characteristic regions included in the plurality of moving image constituent images generated by the compressed moving image decompressing section 3202. The function and operation of the input moving image quality control section 3280 will be explained in detail with reference to FIG. 22.

The image quality degenerating section 3281 generates a plurality of moving images having predetermined image qualities different from each other, by degenerating the image quality of a moving image. The image quality degenerating section 3281 supplies the generated moving images with different image qualities to the inter-grade difference compressing sections 3282. Specifically, the image quality degenerating section 3281 generates moving images with different image qualities, by reducing the frame rate of a moving image, or by reducing the resolution or gradation of the moving image constituent images included in a moving image. The inter-grade difference compressing sections 3282 acquire a moving image with a predetermined image quality from the image quality degenerating section 3281, and compress the acquired moving image. The inter-grade difference compressing sections 3282 each compress a different one of the moving images having different image qualities.

The moving image constituent images included in the moving image that is supplied by the image quality degenerating section 3281 to the inter-grade difference compressing section 3282a may be one example of low-quality images obtained by lowering the image quality of the received moving image constituent images. The moving image constituent images included in the moving image that is supplied by the image quality degenerating section 3281 or the input moving image quality control section 3280 to the inter-grade difference compressing sections 3282b to 3282d may be one example of characteristic region images, in which the characteristic regions have a higher image quality than that of the low-quality images. In this case, the image quality degenerating section 3281 and the input moving image quality control section 3280 function as an image generating section that generates low-quality images.

The inter-grade difference compressing section 3282a acquires, from the image quality degenerating section 3281, moving image constituent images having a resolution lower than that of the moving image constituent images to be received by any of the inter-grade difference compressing sections 3282b to 3282d, and compresses the acquired images. The inter-grade difference compressing section 3282b, the inter-grade difference compressing section 3282c, and the inter-grade difference compressing section 3282d acquire moving image constituent images with resolutions ascending in this order, from the image quality degenerating section 3281 or the input moving image quality control section 3280 and compress the acquired images respectively.

The inter-grade difference compressing section 3282b decompresses the moving image constituent images compressed by the inter-grade difference compressing section 3282a, and enlarges the decompressed moving image constituent images to the resolution identical with the resolution of the moving image constituent images which it acquired from the image quality degenerating section 3281. The inter-grade difference compressing section 3282b compresses a differential image including any difference between the enlarged moving image constituent images and the moving image constituent images acquired from the image quality degenerating section 3281. Note that the inter-grade difference compressing section 3282b generates and compresses a differential image that has difference values in the characteristic regions but not in any other regions.

The inter-grade difference compressing section 3282c decompresses the moving image constituent images compressed by the inter-grade difference compressing section 3282b, and enlarges the decompressed moving image constituent images to the resolution identical with the resolution of the moving image constituent images which it acquired from the image quality degenerating section 3281. The inter-grade difference compressing section 3282c compresses a differential image including any difference between the enlarged moving image constituent images and the moving image constituent images acquired from the image quality degenerating section 3281. Note that the inter-grade difference compressing section 3282c generates and compresses a differential image that has a difference value in at least one of the plurality of characteristic regions according to the quantities of characteristics of the characteristic regions, but not in any other regions including the others of the plurality of characteristic regions.

The inter-grade difference compressing section 3282d decompresses the moving image constituent images compressed by the inter-grade difference compressing section 3282c. The inter-grade difference compressing section 3282d enlarges the decompressed moving image constituent images to the resolution identical with the resolution of the moving image constituent images which it acquired from the input moving image quality control section 3280. The inter-grade difference compressing section 3282d compresses a differential image including any difference between the enlarged moving image constituent images and the moving image constituent images acquired from the input moving image quality control section 3280. Note that the inter-grade difference compressing section 3282d generates and compresses a differential image that has a difference value in at least one of the plurality of characteristic regions according to the quantities of characteristics of the characteristic regions, but not in any other regions including the others of the plurality of characteristic regions.

In this manner, the inter-grade difference compressing sections 3282b to 3282d compress a differential image obtained by deriving the difference between the moving image constituent images acquired from the input moving image quality control section 3280 or the image quality degenerating section 3281 and the enlarged versions of moving image constituent images with a lower resolution. The output section 3207 multiplexes and outputs the moving images resulting from the compression by the respective inter-grade difference compressing sections 3282. Specifically, the output section 3207 sends the moving images resulting from the compression by the inter-grade difference compressing sections 3282 to the image processing apparatus 3170. In this way, the image processing apparatus 3120 can provide moving images compressed and encoded scalably according to the quantities of characteristics of the characteristic regions.

Figure 20A:
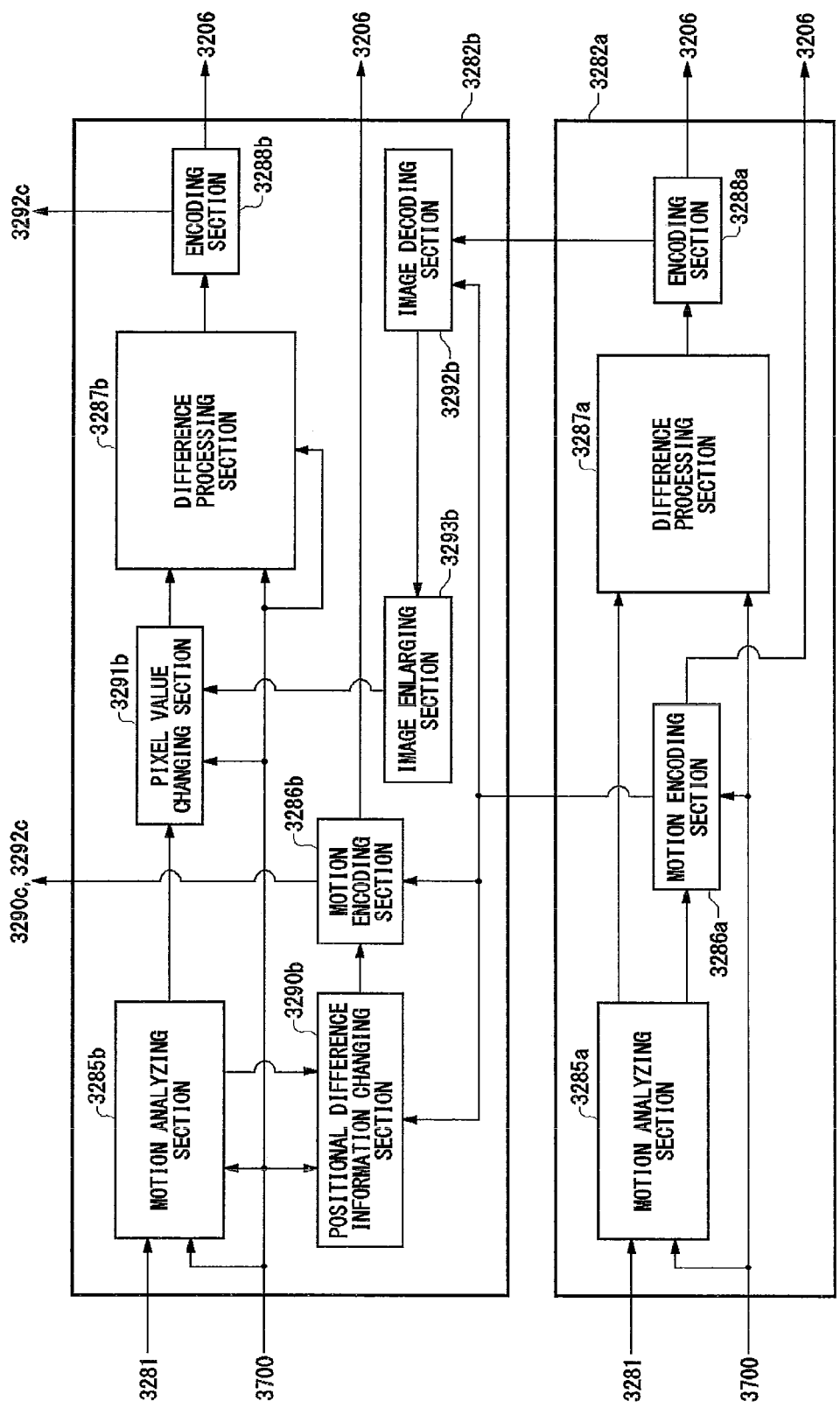
FIG. 20A shows one example block configuration of inter-grade difference compressing sections 3282a and 3282b.
Figure 20B:
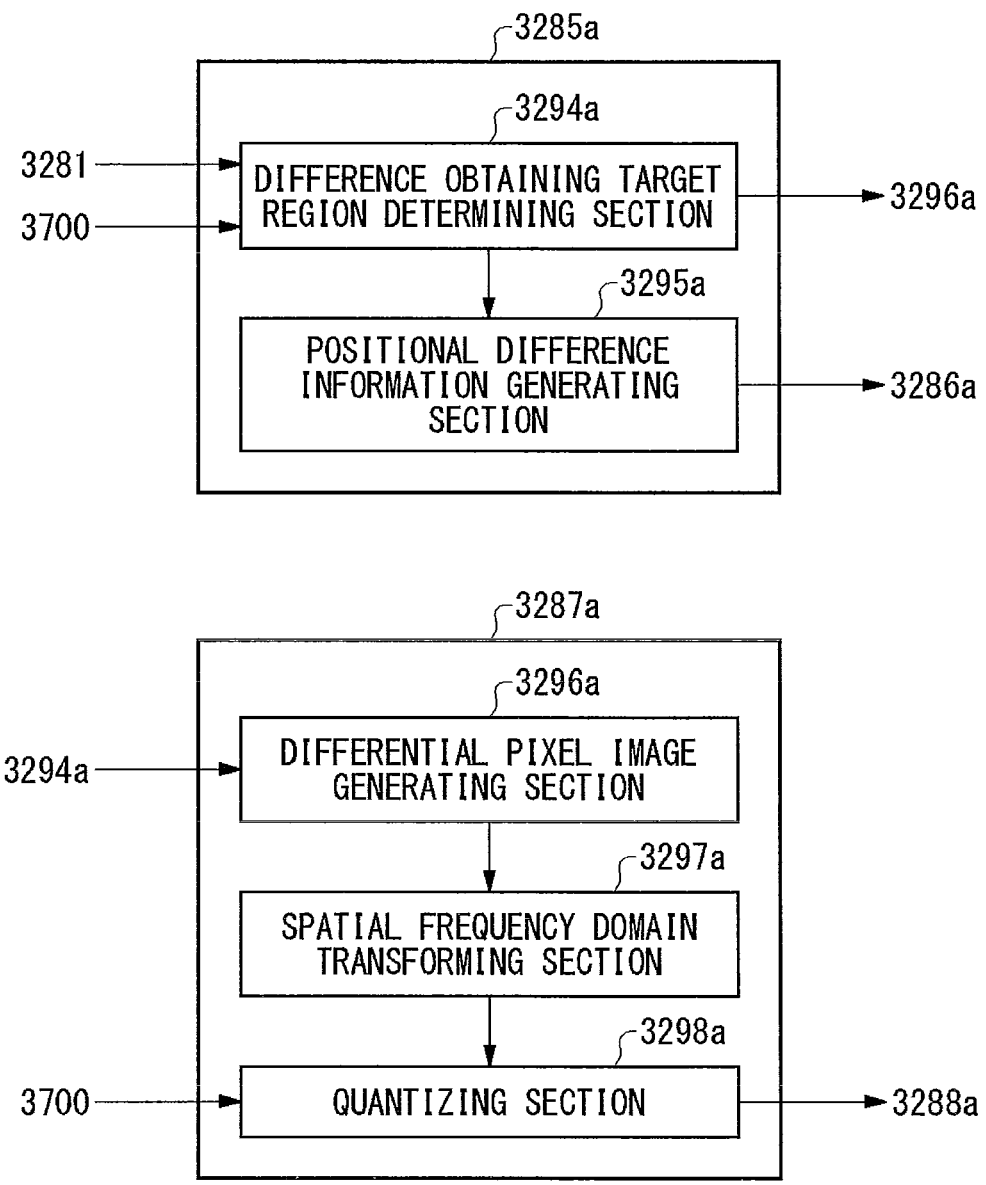
Figure 20C:
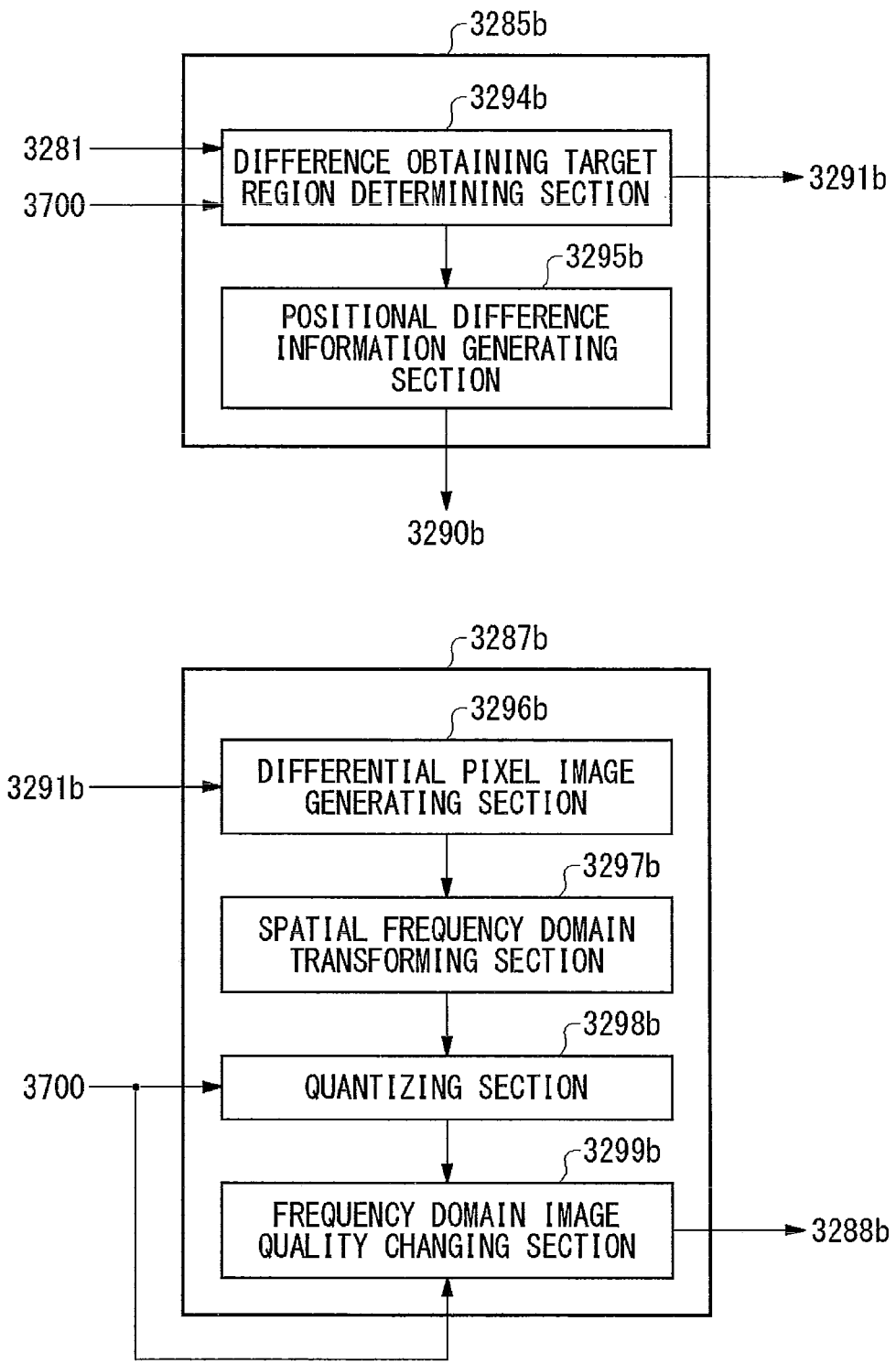
FIG. 20C shows one example block configuration of a motion analyzing section 3285b and a difference processing section 3287b, which are included in the inter-grade difference compressing section 3282b.

FIG. 20A to FIG. 20C shows one example block configuration of the inter-grade difference compressing sections 3282a and 3282b. The inter-grade difference compressing section 3282a includes a motion analyzing section 3285a, a motion encoding section 3286a, a difference processing section 3287a, and an encoding section 3288a. The motion analyzing section 3285a includes a difference obtaining target region determining section 3294a and a positional difference information generating section 3295a. The difference processing section 3287a includes a differential pixel image generating section 3296a, a spatial frequency domain transforming section 3297a, and a quantizing section 3298a.

The inter-grade difference compressing section 3282b includes a motion analyzing section 3285b, a motion encoding section 3286b, a difference processing section 3287b, an image enlarging section 3293b, an image decoding section 3292b, and an encoding section 3288b. The motion analyzing section 3285b includes a difference obtaining target region determining section 3294b and a positional difference information generating section 3295b. The difference processing section 3287b includes a differential pixel image generating section 3296b, a spatial frequency domain transforming section 3297b, a quantizing section 3298b, and a frequency domain image quality changing section 3299b. The inter-grade difference compressing section 3282c and the inter-grade difference compressing section 3282d have substantially the same components as those of the inter-grade difference compressing section 3282b, so will not be explained repetitively.

The function and operation of each component of the inter-grade difference compressing section 3282a will now be explained below. The motion analyzing section 3285a analyzes any motion that occurs throughout the plurality of moving image constituent images received from the image quality degenerating section 3281 based on the image contents of the constituent images, and thereby determines partial regions based on which motion-based compression is performed on the moving image constituent images.

Specifically, the difference obtaining target region determining section 3294a determines, based on pixel values taken by any partial region throughout the plurality of moving image constituent images, a partial region in a given moving image constituent image that is referred to as difference obtaining target when a moving image constituent image is to be encoded based on its difference from that reference moving image constituent image. The difference obtaining target region determining section 3294a supplies the difference processing section 3287a with pixel information of partial regions, which are the compressing target, and pixel information of such determined partial regions, which are the difference obtaining target.

The positional difference information generating section 3295a generates positional difference information that indicates positional difference between the partial regions to be compressed differentially and the partial regions referred to as difference obtaining target. Specifically, the positional difference information generating section 3295a generates motion vectors used for motion compensation. The positional difference information generating section 3295a supplies the generated positional difference information to the motion encoding section 3286a.

The motion encoding section 3286a encodes the positional difference information supplied from the positional difference information generating section 3295a, and supplies the encoded information to the output section 3207. For example, the motion encoding section 3286 encodes a difference between the positional difference information of one partial region and the positional difference information of an adjacent partial region, and supplies the encoded difference to the output section 3207.

The difference processing section 3287a compresses the images of the compressing target partial regions based on a difference between the pixel information of the compressing target partial regions and the pixel information of the difference obtaining target partial regions, both of which information are acquired from the motion analyzing section 3285a. Specifically, the differential pixel image generating section 3296a generates a differential pixel image based on the difference between the pixel information of the compressing target partial regions and the pixel information of the difference obtaining target partial regions.

The spatial frequency domain transforming section 3297a transforms the differential pixel image, on the basis of partial region by partial region, into spatial frequency domain. Specifically, the spatial frequency domain transforming section 3297a transforms each partial region in the differential pixel image into spatial frequency domain by discrete cosine transform (DCT). The spatial frequency domain transforming section 3297a may transform each partial region in the differential pixel image into spatial frequency domain by various manners of frequency transform such as Hadamard transform, wavelet transform, etc.

When the motion analyzing section 3285a determines that the compression will not be based on difference calculated from partial regions of another moving image constituent image, the difference processing section 3287a supplies the pixel information of the compressing target partial regions to the spatial frequency domain transforming section 3297a. The spatial frequency domain transforming section 3297a transforms the pixel information on the basis of partial region by partial region into spatial frequency domain, in the way described above.

The quantizing section 3298a quantizes transform coefficients obtained from the transform into the spatial frequency domain by the spatial frequency domain transforming section 3297a. The encoding section 3288a performs compression by encoding the transform coefficients quantized by the quantizing section 3298a. For example, the encoding section 3288 encodes the transform coefficients quantized by the quantizing section 3298a by entropy encoding such as Huffman coding, arithmetic coding, etc. The encoding section 3288a supplies the output section 3207 with a moving image resulting from the encoding.

The function and operation of each component included in the inter-grade difference compressing section 3282b will now be explained below. Among the components included in the inter-grade difference compressing section 3282b, those components that are labeled with the same reference numeral with that of the components included in the inter-grade difference compressing section 3282a have the same function and operation as those of the components included in the inter-grade difference compressing section 3282a, so only any difference between them will be explained.

Likewise the difference obtaining target region determining section 3294a, the difference obtaining target region determining section 3294b specifies, for each of the plurality of moving image constituent images acquired from the image quality degenerating section 3281, partial regions in another moving image constituent image, the difference between which and compressing target partial regions included in the moving image constituent image concerned should be obtained. In this manner, the difference obtaining target region determining section 3294b determines difference obtaining target partial regions, which are partial regions in a characteristic region image generated from a moving image constituent image, the difference between which and another characteristic region image should be obtained. The difference obtaining target region determining section 3294b supplies a pixel value changing section 3291b with the pixel information of the compressing target partial regions and the pixel information of the difference obtaining target partial regions.

The image decoding section 3292b acquires the moving image constituent images from the encoding section 3288a and the positional difference information from the motion encoding section 3286a. The image decoding section 3292b decodes the moving image constituent images acquired from the encoding section 3288a based on the positional difference information acquired from the motion encoding section 3286a. The image decoding section 3292b may acquire and decode the moving image constituent images quantized by the quantizing section 3298a, or may acquire and decode the moving image constituent images encoded by the encoding section 3288a. The moving image constituent images resulting from the decoding by the image decoding section 3292b may be one example of low-quality images according to the present invention. In this case, the inter-grade difference compressing section 3282a functions as an image generating section that generates the low-quality images according to the present invention.

The image enlarging section 3293b generates enlarged images by enlarging the moving image constituent images decoded by the image decoding section 3292b. Of the partial regions determined by the difference obtaining target region determining section 3294b, the pixel value changing section 3291b keeps a partial region that is included in a characteristic region with an unchanged pixel value, while changing a partial region that is not included in a characteristic region to have its pixel value replaced with that of the partial region included in the enlarged image.

In this manner, the pixel value changing section 3291b generates, from the input moving image constituent images, characteristic region images, in which the pixel values of the regions other than the characteristic regions have been replaced with the pixel values in the enlarged images. Note that the pixel value changing section 3291b can function as an image generating section that generates characteristic region images, in which the pixel values of the regions other than the characteristic regions have been replaced with the pixel values in the enlarged images.

The difference processing section 3287b receives, from the pixel value changing section 3291b, a characteristic region image, which is the compressing target, image information of the partial regions, difference between which and the partial regions included in the compressing target characteristic region image should be obtained, and the enlarged image. The difference processing section 3287b determines which of intra-encoding, inter-encoding and inter-grade encoding should be adopted for each of the plurality of partial regions included in the compressing target characteristic region image. Here, intra-encoding is to encode the image by using pixel information within the same characteristic region image. Inter-encoding is to encode the image based on the difference from the difference obtaining target partial regions included in another moving image constituent image. Inter-grade encoding is to encode the image based on difference from the enlarged image. At this time, the difference processing section 3287b preferentially selects an encoding manner that will result in a smaller amount of codes in the encoded image. The following description will first explain a case where inter-grade encoding is selected because inter-grade encoding should be selected as the pixel values have been replaced so that the regions other than the characteristic regions will have no difference. After this, cases where inter-encoding and the intra-encoding are selected respectively will be explained.

When inter-grade encoding is selected, the differential pixel image generating section 3296b generates a differential pixel image that indicates the difference in pixel value between the characteristic region image and the enlarged image. Specifically, the differential pixel image generating section 3296b generates a differential pixel image based on the difference between the characteristic region image, in which the pixel values of the regions other than the characteristic regions have been replaced, and the enlarged image. Since the pixel values of the regions other than the characteristic regions in the characteristic region image have been replaced with the pixel values in the enlarged image, the differential pixel image generating section 3296b can generate a differential pixel image, in which each characteristic region has a difference between the pixel value of the characteristic region image and the pixel value of the enlarged image and the regions other than the characteristic regions have no pixel value difference.

When inter-encoding is selected, the differential pixel image generating section 3296b obtains a difference between the characteristic region image generated by the pixel value changing section 3291b and a characteristic region image generated by the pixel value changing section 3291b from another moving image constituent image. Specifically, the differential pixel image generating section 3296b obtains a difference between the image of any partial region that is included in the characteristic region and the image of the difference obtaining target partial region that is determined for that partial region by the difference obtaining target region determining section 3294b. Since the pixel values of the regions other than the characteristic regions of the characteristic region image have been replaced with the pixel values in the enlarged image, the differential pixel image generating section 3296b generates a differential pixel image, in which a partial region that is included in a characteristic region has a difference in pixel value from the partial region determined by the difference obtaining target region determining section 3294b, and the regions other than the characteristic regions have a difference in pixel value from the partial regions determined by the difference obtaining target region determining section 3294b.

When intra-encoding is selected, the differential pixel image generating section 3296b generates a differential pixel image by obtaining a difference in pixel value between each partial region included in each characteristic region image and another region in the same characteristic region image, or by obtaining a difference between a pixel value in a given partial region and a pixel value in the same partial region.

The spatial frequency domain transforming section 3297b transforms the differential pixel image on the basis of partial region by partial region into spatial frequency domain. Specifically, likewise the spatial frequency domain transforming section 3297a, the spatial frequency domain transforming section 3297b transforms each partial region into spatial frequency domain by discrete cosine transform (DCT), Hadamard transform, wavelet transform, or the like. The quantizing section 3298b, likewise the quantizing section 3298a, quantizes transform coefficients obtained from the transform into spatial frequency domain by the spatial frequency domain transforming section 3297b.

The frequency domain image quality changing section 3299b generates a characteristic region difference image or an inter-characteristic region difference image by reducing the data amount of the spatial frequency component of at least one of the partial regions including the regions other than the characteristic regions, among the spatial frequency components of the respective partial regions obtained by the transform into spatial frequency domain by the spatial frequency domain transforming section 3297b. Specifically, the frequency domain image quality changing section 3299b reduces the magnitude of any transform coefficient that indicates a frequency component higher than a predetermined frequency. The frequency domain image quality changing section 3299b may change the transform coefficient that indicates a frequency component higher than the predetermined frequency to 0.

In this manner, the difference processing section 3287b generates a characteristic region difference image, in which each characteristic region has a spatial frequency component, which is the difference, transformed into spatial frequency domain, between the characteristic region image and the enlarged image, and the regions other than the characteristic regions have had their spatial frequency component reduced in data amount. The encoding section 3288b encodes the characteristic region difference image generated by the difference processing section 3287b.

As described above, the characteristic region difference image generated by the difference processing section 3287b represents a differential image between the image of each characteristic region in the characteristic region image and the image of each characteristic region in the low-quality image. Specifically, the characteristic region difference image generated by the difference processing section 3287 indicates the difference between the image of each characteristic region in the characteristic region image and the enlarged image of each characteristic region in the low-quality image.

In the above explanation, the pixel value changing section 3291b replaces the pixel values in the regions other than the characteristic regions with the pixel values in the enlarged image so that the difference will be 0 in the regions other than the characteristic regions in the differential pixel image, i.e., so that the difference will be 0 in the regions that are not a characteristic region having a characteristic of a predetermined category and that are not either a characteristic region having a characteristic of a predetermined category that should be given a higher resolution than the former characteristic region. However, any other manner may be taken to make the difference in the differential pixel image zero.

For example, the pixel value changing section 3291b may change the pixel values of the regions other than the characteristic regions in the moving image constituent images acquired from the image quality degenerating section 3281 to a predetermined pixel value, and also change the pixel values of the counterpart regions in the enlarged images other than the characteristic regions to the same predetermined pixel value. In this manner too, it is possible to make the difference in the regions other than the characteristic regions zero in the differential pixel image, thereby to substantially reduce the information amount of the regions other than the characteristic regions.

In this manner, the pixel value changing section 3291b generates, from the moving image constituent images, characteristic region images, in which the pixel values of the regions other than the characteristic regions are replaced with the predetermined value, and the enlarge images, in which the pixel values of the regions other than the characteristic regions are replaced with the predetermined value. Then, the differential pixel image generating section 3296 generates a differential pixel image based on the difference between the characteristic region images and the enlarged images, in both of which the pixel values of the regions other than the characteristic regions have been replaced.

The pixel value changing section 3291b may replace the pixel values of the regions other than the characteristic regions in the moving image constituent images acquired from the image quality degenerating section 3281, with the pixel values of the counterpart regions in the enlarged version of the moving image constituent images that are supplied to a subordinate inter-grade difference compressing section 3282, e.g., the inter-grade difference compressing section 3282a. In this manner too, it is possible to make the difference in the differential pixel image substantially zero, thereby to substantially reduce the information amount of the regions other than the characteristic regions.

The positional difference information generating section 3295b generates positional difference information that indicates positional difference between partial regions included in regions other than the characteristic regions and partial regions, the difference from which should be obtained. Specifically, likewise the positional difference information generating section 3295a, the positional difference information generating section 3295b generates positional difference information that indicates positional difference between partial regions, which are to be differentially compressed, and difference obtaining target partial regions, the difference from which should be obtained. Note that the positional difference information includes motion vectors used for motion compensation.

A positional difference information changing section 3290b changes the positional difference information so that the positional difference information will indicate that the difference of partial regions included in regions other than the characteristic regions should be obtained from the partial regions at the very identical position. Specifically, the positional difference information changing section 3290b changes the positional difference information of the partial regions included in the regions other than the characteristic regions to information indicating that there is no positional difference. Further, the positional difference information changing section 3290b acquires the positional difference information from the motion encoding section 3286a, and changes the positional difference information of partial regions included in regions other than the characteristic regions to information indicating that there is no positional difference. Specifically, the positional difference information changing section 3290b changes the length of the motion vectors of the regions other than the characteristic regions to 0. Specifically, the positional difference information changing section 3290b changes the length of the motion vectors acquired from the positional difference information generating section 3295b to 0, and also changes the length of the motion vectors acquired from the motion encoding section 3286a to 0.

Then, the motion encoding section 3286b encodes the positional difference information. Specifically, the motion encoding section 3286b, likewise the motion encoding section 3286a, encodes a difference between the positional difference information of one partial region and the positional difference information of an adjacent partial region. The positional difference information encoded by the motion encoding section 3286b is supplied to the output section 3207.

In the present embodiment, the positional difference information changing section 3290 changes the positional difference information of the regions other than the characteristic regions, but the positional difference information changing section 3290b may change the positional difference information of the regions other than the characteristic regions in the encoded images resulting from the encoding by the motion encoding section 3286b. That is, the positional difference information changing section 3290b may change the positional difference information encoded by the motion encoding section 3286, so that the information will indicate that the difference of the partial regions other than the characteristic regions should be obtained from the partial regions at the very identical position.

The encoding section 3288b may generate encoded data that includes no difference information in the regions other than the characteristic regions. Specifically, the encoding section 3288b may generate encoded data that has no difference information in the partial regions included in the regions other than the characteristic regions. The motion encoding section 3286b may generate encoded data that has no positional difference information in the partial regions included in the regions other than the characteristic regions. In this way, the encoding section 3288b and the motion encoding section 3286b generate encoded data that indicates, by including neither difference information nor positional difference information, that the image content in the regions other than the characteristic regions is identical with the image content in the counterpart regions in another moving image constituent image. For example, the encoding section 3288b and the motion encoding section 3286b may generate encoded data that includes partial regions of a category indicating that the image content of the partial regions concerned included in the regions other than the characteristic regions is identical with the image content of the counterpart regions in another moving image constituent image.

For example, the encoding section 3288b and the motion encoding section 3286b may generate encoded data that includes partial regions of a category indicating that the partial regions concerned included in the regions other than the characteristic regions are encoded by a simple inter-frame prediction encoding mode so has no transform coefficients. For example, the category of these partial regions may be the equivalent of NonMC NotCoded in MPEG encoding. By generating encoded data that includes information indicating that the length of motion vectors and the difference information are both zero, the encoding section 3288b and the motion encoding section 3286b can further reduce the amount of codes in the moving image constituent images after encoded. When determining prediction modes including the above-described encoding modes, the inter-grade difference compressing section 3282b may select, based on Lagrange's method of undetermined multipliers, a prediction mode that can minimize rate-distortion cost The inter-grade difference compressing section 3282c and the inter-grade difference compressing section 3282d include components that have the same functions as those of the inter-grade difference compressing section 3282b. In the following explanation, the components of the inter-grade difference compressing section 3282c and inter-grade difference compressing section 3282d that have the same name as that of the components of the inter-grade difference compressing section 3282 will be denoted by the same reference numerals. To which of the inter-grade difference compressing sections 3282b to 3282d these components are included will be indicated by the last letter (b, c, d) of their reference numerals.

For example, a motion analyzing section 3285c is a component of the inter-grade difference compressing section 3282c, and a motion analyzing section 3285d is a component of the inter-grade difference compressing section 3282d. In the following explanation, any reference numeral that has no alphabetical letter at the tail can indicate all components labeled with this reference numeral included in the inter-grade difference compressing sections 3282b to 3282d. For example, "pixel value changing section 3291" can indicate each of the pixel value changing sections 3291b to 3291d.

The function and operation of the inter-grade difference compressing section 3282c and inter-grade difference compressing section 3282d are different from those of the inter-grade difference compressing section 3282b in that the inter-grade difference compressing sections 3282c and 3282d process moving images of different image qualities acquired from the image quality degenerating section 3281 and the input moving image quality control section 3280 respectively, and in that the positional difference information changing sections 3290c and 3290d and the image decoding section 3292c and 3292d acquire positional difference information for difference obtaining purpose and moving image constituent images for difference obtaining purpose, from another inter-grade difference compressing section 3282 that processes a moving image of a lower image quality.

Specifically, the positional difference information changing section 3290c acquires the positional difference information from the motion encoding section 3286b, and changes the acquired positional difference information. The image decoding section 3292c acquires the positional difference information from the motion encoding section 3286b and the moving image constituent images from the encoding section 3288b, and decodes the acquired moving image constituent images based on the acquired positional difference information. The positional difference information changing section 3290d acquires the positional difference information from the motion encoding section 3286c and changes the acquired positional difference information. The image decoding section 3292d acquires the positional difference information from the motion encoding section 3286c and the moving image constituent images from the encoding section 3288c, and decodes the acquired moving image constituent images based on the acquired positional difference information.

The characteristic region detecting section 203 detects a plurality of characteristic regions of different categories from each other, from the input moving image constituent images. Specifically, the condition storing section 3260 stores, in association of each category of characteristic regions, a condition that should be satisfied by the motion vectors or the transform coefficients of a characteristic region of that category. For example, the condition storing section 3260 may store a condition that the spatial directional unevenness of the motion vectors should be smaller than a predetermined value. The condition storing section 3260 may store a condition that the frequency-wise distribution, in a putative characteristic region, of transform coefficients such as DCT coefficients that indicate spatial frequency components of the region should coincide with a frequency-wise distribution of such components predetermined for any category of characteristic regions with a degree of coincidence higher than a predetermined degree of coincidence.

The characteristic region detecting section 203 detects, as characteristic regions, regions that have motion vectors and transform coefficients that satisfy the conditions stored in the condition storing section 3260. In this way, the characteristic region detecting section 3203 detects, as characteristic regions, regions that have transform coefficients satisfying the predetermined condition. Machine learning as described in Japanese Patent Application Publication No. 2007-188419, such as adaboost, may be used to detect characteristic regions. This method is to learn characteristics of transform coefficients of an image of a predetermined object, by using the transform coefficients of the image of the predetermined object and transform coefficients of an image of anywhere other than the predetermined object. The condition storing section 260 stores a condition that is satisfied by the transform coefficients of the image of the predetermined object, which condition is generated based on the learning.

The characteristic region detecting section 3203 may detect characteristic regions based on the pixel values of the images, instead of detecting characteristic regions by using transform coefficients or in addition to detecting characteristic regions by using transform coefficients. Even the method of detecting characteristic regions based on pixel values can use the detection by the aforementioned machine learning. The characteristic region detecting section 3203 may detect characteristic regions by using template matching, which involves comparison with a template image representing a predetermined object.

Note that a predetermined object is at least one part of a human face, a part of a human body such as head, hand, etc., a whole person, a coin, a card such as cash card, etc., a car, and a part of a car such as a car registration plate. A predetermined object may be a living body other than a human body. A predetermined object may be a certain tissue existing in a living body including a human body, such as a tumor tissue, a blood vessel, etc. in a living body including a human body. The characteristic region detecting section 3203 can detect, as characteristic regions, regions in which a captured image of a predetermined object is included, by using various detecting methods such as template matching, machine learning, etc. The characteristic region detecting section 3203 may detect characteristic regions that have any shape such as rectangular shape.

The characteristic region detecting section 3203 may detect characteristic regions by a method described in Japanese Patent Application Publication No. 2008-078641. For example, the characteristic region detecting section 3203 thins a captured image from which to detect an object, with a predetermined thinning ratio, or further thins the thusly thinned image stepwise with this thinning ratio, thereby generating an image set that includes the captured image and one or more thinned image(s). Then, the characteristic region detecting section 3203 applies a first filter to a first image that is relatively small in the generated image set, thereby calculating an evaluation value. Here, the first filter acts on a two-dimensional region in an image, and generates an evaluation value that represents the percentage of a probability that an object of a specific category may exist in that region. Among at least two filters that respectively act on regions of different sizes, among which regions the number of pixels included, which corresponds to the size of each region, is different at a predetermined ratio or different stepwise at the predetermined ratio, the first filter may be one that acts on a relatively narrow region. The characteristic region detecting section 3203 extracts, from the first image, a region, from which an evaluation value larger than a predetermined first threshold is obtained, as a primary candidate region.

Then, the characteristic region detecting section 3203 applies a second filter among the filters to a region in a second image that corresponds to the primary candidate region and calculates an evaluation value. The second image includes a number of pixels that is larger by one step than the number of pixels in the first image. The second filter acts on a region that is wider by one step than the region to which the first filter should be applied. The characteristic region detecting section 3203 extracts a region, from which an evaluation value larger than a predetermined second threshold is obtained, as a secondary candidate region.

The characteristic region detecting section 3203 repeats the extraction process of applying any of the plurality of filters, prepared for regions of different sizes respectively, to a region having a corresponding size in the image set to extract a candidate region. At this time, the characteristic region detecting section 3203 performs the extraction process of applying a filter for a narrower region and the extraction process of applying a filter for a wider region in this order. Specifically, the characteristic region detecting section 3203 performs the extraction process of applying a filter prepared for a narrower region to a smaller image and the extraction process of applying a filter prepared for a wider region to a larger image in this order. The characteristic region detecting section 3203 repeats the extraction process twice or more and extracts a final candidate region, thereby detecting an object of a predetermined category. The characteristic region detecting section 3203 detects the region in which the object of the predetermined category exists, as a characteristic region. Here, in a given extraction process, the characteristic region detecting section 3203 applies a filter to only the region that has been extracted in the extraction process immediately prior. Accordingly, through the repetitive extraction processes, whether an object present in a former image is present or absent in a succeeding image is discriminated repetitively, enabling a more accurate detection of a characteristic region. Further, since rough filtering for a characteristic region is firstly done with a smaller image, a characteristic region can be detected more quickly.

The characteristic region detecting section 3203 may detect characteristic regions by a method described in Japanese Patent Application Publication No. 2008-078636. For example, the characteristic region detecting section 3203 detects a characteristic region by using a plurality of filters that act on the same two-dimensional region of a predetermined size in a captured image to calculate a quantity of an arbitrary characteristic of the contour and the inner region of an object of a predetermined category, which characteristic is different from that calculated by any other of the plurality of filters. Specifically, the characteristic region detecting section 3203 calculates quantities of a plurality of characteristics, by applying the plurality of filters to a region of a predetermined size in a captured image from which to detect an object. The plurality of filters are each associated with primary evaluation values with which the quantity of characteristic calculated by the filter is compared in order to obtain the percentage of a probability that the characteristic concerned may be of an object of a predetermined category. Based on this association, the characteristic region detecting section 3203 discriminates a primary evaluation value that corresponds to the quantity of each calculated characteristic. The characteristic region detecting section 3203 sums up the plurality of primary evaluation values discriminated for the plurality of filters respectively, thereby obtaining a secondary evaluation value that represents the percentage of probability that the object of the predetermined category may exist in the filtered region. The characteristic region detecting section 3203 compares the secondary evaluation value with a threshold, and extracts the region as a characteristic region in which the object of the predetermined category exists, if the percentage of probability that the object of the predetermined category may exist in this region is higher than the threshold. By combining a plurality of filters that extract quantities of various characteristics of the contour and inner region of an object, the characteristic region detecting section 3203 can extract a characteristic region more accurately than when extracting a characteristic region based only on, for example, the shape of the contour.

The characteristic region detecting section 3203 may detect characteristic regions by combining the method described in Japanese Patent Application Publication No. 2008-078636 and the method described in Japanese Patent Application Publication No. 2008-078641. Specifically, the plurality of filters explained in connection with the method described in Japanese Patent Application Publication No. 2008-078636 may include plural groups of filters, each group of filters prepared for a region of a specific size, i.e., plural groups of filters that act on regions of different sizes respectively, among which regions the number of pixels included in each region is different from that in the other regions at a predetermined ratio or different stepwise at the predetermined ratio. As above, each filter may be associated with suitable evaluation values. By thinning a captured image from which to detect an object with a predetermined thinning ratio, or further thinning the thusly thinned image stepwise with this thinning ratio, the characteristic region detecting section 3203 generates an image set that includes the captured image and one or more thinned image(s). The characteristic region detecting section 3203 calculates quantities of a plurality of characteristics by applying a plurality of first filters for a narrower region to a first image that is relatively small in the generated image set. The characteristic region detecting section 3203 discriminates a primary evaluation value for the quantity of each of the plurality of characteristics calculated, based on the association given for each of the plurality of first filters. The characteristic region detecting section 3203 sums up the plurality of primary evaluation values, thereby obtaining a secondary evaluation value representing the percentage of probability that the object of the predetermined category may exist in the filtered region. The characteristic region detecting section 3203 compares the obtained secondary evaluation value with a first threshold, and extracts the region as a primary candidate region, if the percentage of probability that the object of the predetermined category may exist in this region is higher than the first threshold.

The characteristic region detecting section 3203 calculates quantities of a plurality of characteristics, by applying a plurality of second filters for a region wider by one step than the region acted on by the plurality of first filters, to a region corresponding to the primary candidate region in a second image in the image set that includes a number of pixels larger by one step than that in the first image. The characteristic region detecting section 3203 discriminates a primary evaluation value for the quantity of each of the plurality of characteristics calculated, based on the association given for each of the plurality of second filters. The characteristic region detecting section 3203 sums up the plurality of primary evaluation values corresponding to the plurality of second filters respectively, thereby obtaining a secondary evaluation value that represents the percentage of probability that the object of the predetermined category may exist in the region corresponding to the primary candidate region. The characteristic region detecting section 3203 compares the obtained secondary evaluation value with a second threshold, and extracts the region as a secondary candidate region, if the percentage of probability that the object of the predetermined category may exist in this region is higher than the second threshold.

The characteristic region detecting section 3203 repeats the extraction process of applying each of the plural groups of filters, prepared for regions of different sizes respectively, to a region having a corresponding size in the image set to extract a candidate region. At this time, the characteristic region detecting section 3203 performs the extraction process of applying a group of filters for a narrower region and the extraction process of applying another group of filters for a wider region in this order. Specifically, the characteristic region detecting section 3203 performs the extraction process of applying a group of filters prepared for a narrower region to a smaller image and the extraction process of applying another group of filters prepared for a wider region to a larger image in this order. The characteristic region detecting section 3203 repeats the extraction process twice or more and extracts a final candidate region, thereby detecting an object of a predetermined category. The characteristic region detecting section 3203 detects the region in which the object of the predetermined category exists, as a characteristic region.

The characteristic region detecting section 3203 may detect characteristic regions by a method described in Japanese Patent Application Publication No. 2008-098600. For example, the characteristic region detecting section 3203 detects a characteristic region from a plurality of captured images included in moving images captured by a plurality of image capturing apparatuses 3100. For example, assume that the image capturing apparatus 3100a and the image capturing apparatus 3100b are capturing the same scene as that captured by the other. The image capturing apparatus 3100a and the image capturing apparatus 3100b can function as, for example, stereo cameras. In the following explanation, a first captured image obtained by the image capturing apparatus 3100a and a second captured image obtained by the image capturing apparatus 3100b may be called paired images. The characteristic region detecting section 3203 detects, from the paired images, an object of a predetermined category captured in the paired images, and detects the region in which the detected object of the predetermined category exists, as a characteristic region.

The characteristic region detecting section 3203 extracts, from each of the first and second captured images paired, a region in which the object of the predetermined category is captured. The characteristic region detecting section 3203 may detect the region in which the object of the predetermined category is captured, with a rough detection accuracy. The characteristic region detecting section 3203 detects the object of the predetermined category, by detecting, from the extracted region in the first captured image and from the extracted region in the second captured image, a pair of counterpart regions. For example, the characteristic region detecting section 3203 calculates a distance from each of the paired counterpart regions to the object captured in the extracted region. The characteristic region detecting section 3203 can detect the object of the predetermined category, based on the three-dimensional shape of the object obtained from the calculated distances to the object.

When detecting a pair of counterpart regions, the characteristic region detecting section 3203 divides the region extracted from each of the paired first and second captured images, in which region the object of the predetermined category is captured, into a plurality of sub-regions. The characteristic region detecting section 3203 calculates a vector, across some sub-regions, of a characteristic quantity that characterizes a partial image in each sub-region. The characteristic quantity may be, for example, a pixel value. The vector across some sub-regions may be, for example, a gradient vector, e.g., a pixel value gradient vector. The characteristic region detecting section 3203 calculates a logical distance between the calculated vector in the first image and the calculated vector in the second image. The characteristic region detecting section 3203 detects, as a pair of counterpart regions, a region in the first image made up of the sub-regions across which the vector runs and a region in the second image made up of the sub-regions across which the vector runs, if the logical distance between the vectors is smaller than a predetermined value. The logical distance may be, for example, the square root of the square sum of the differences between the respective components of one vector and the counterpart components of the other vector. The characteristic region detecting section 3203 can extract a pair of counterpart regions from the paired images with high accuracy, and thus can calculate the distances to the object with high accuracy. Hence, the characteristic region detecting section 3203 can identify the three-dimensional shape of the object with high accuracy, and as a result can detect the object of the predetermined category with high accuracy.

The characteristic region detecting section 3203 may detect characteristic regions by the method described in Japanese Patent Application Publication No. 2008-091562. For example, the characteristic region detecting section 3203 extracts, from a plurality of captured images included in a moving image, putative object shapes that are similar to an object of a predetermined category, together with the dimension of the putative object shapes and positional information indicating the position of the putative object shapes in terms of the field angle of the image capturing apparatus 3100. The positional information in terms of the field angle may be, for example, a position in an image region in each captured image. The characteristic region detecting section 3203 determines whether or not an article represented by the extracted putative object shapes is an object of a predetermine category, thereby extracting the object of the predetermined category. For example, the characteristic region detecting section 3203 may count the number of times an article represented by putative object shapes that have the same dimension is searched out from a predetermined search region surrounding the article represented by putative object shapes, and may extract the article represented by the putative object shapes as the object of the predetermined category if the counted number is equal to or larger than a threshold. The characteristic region detecting section 3203 may detect the region, in which the object of the predetermined category is included, as a characteristic region. Hence, the characteristic region detecting section 3203 can detect, as the object of the predetermined category, an article represented by putative object shapes that exist in an image region, from which an article having a dimension close to a predetermined dimension is searched out intensively. The characteristic region detecting section 3203 needs not to detect an article having a putative object shape that exists in anywhere other than the image region concerned, as the object of the predetermined category. Hence, the characteristic region detecting section 3203 can reduce the possibility of mistakenly detecting an article having a putative object shape that exists in anywhere other than the image region concerned, as the object of the predetermined category.

If the image capturing apparatus 3100 can capture images with variable field angles, the aforementioned positional information in terms of field angle may be, for example, the direction in which the image capturing apparatus 3100 captures images, and a position in a captured image. If it is possible, by using a plurality of image capturing apparatuses 3100, to capture fields of a continuous depth that is larger than the depth of a field captured by one image capturing apparatus 3100, the positional information in terms of field angle may be, for example, the direction in which each image capturing apparatus 3100 captures images, and a position in a captured image captured by each image capturing apparatus 3100.

When the characteristic region detecting section 3203 detects a plurality of characteristic regions of different categories from the input moving image constituent images, the image quality degenerating section 3281 generates one characteristic region image from the input images by reducing the resolution of a characteristic region of one category, and generates another characteristic region image, in which a characteristic region of another category has a higher resolution than that in the former characteristic region image. The inter-grade difference compressing section 3286b and 3286c process characteristic region images which correspond to characteristic regions of certain categories respectively, and in which a characteristic region of at least a predetermined category has a resolution different from that of the rest of the region in the image.

Specifically, the inter-grade difference compressing section 3282b processes a low-resolution characteristic region image that has the lowest resolution in the region, in which all the characteristic regions are included. The inter-grade difference compressing section 3282c processes a middle-resolution characteristic region image, in which a characteristic region of a predetermined category has a resolution higher than that in the low-resolution characteristic region image. The inter-grade difference compressing section 3282d processes a high-resolution characteristic region image, in which a characteristic region of another predetermined category has a high resolution.

The difference processing section 3287 generates a characteristic region difference image, in which (1) a characteristic region of one category and a characteristic region of another category both have a spatial frequency component, which is a difference, transformed into spatial frequency domain, between one characteristic region image and its corresponding enlarged image, and (2) the regions other than the characteristic region of the one category and characteristic region of the another category have their spatial frequency component reduced in data amount.

The difference processing sections 3287 generate a characteristic region difference image, in which (a) a characteristic region of one category has a spatial frequency component, which is a difference, transformed into spatial frequency domain, between one characteristic region image and its corresponding enlarged image, and (b) the regions other than the characteristic region of the one category have their spatial frequency component reduced in data amount, or generate an inter-characteristic region difference image, in which (i) a characteristic region of another category has a spatial frequency component, which is a difference, transformed into spatial frequency domain, between another characteristic region image and the enlarged image in which the characteristic region in the another characteristic region image is enlarged, and (ii) the regions other than the characteristic region of the another category have their spatial frequency component reduced in data amount.

The encoding sections 3288 encode the characteristic region difference images, the inter-characteristic region difference image, and the low-quality image, respectively. The output sections 3207 multiplex the positional difference information encoded by the motion encoding sections 3286a to 3286d and the moving image constituent images, e.g., the low-quality image, the characteristic region difference images, and the inter-characteristic region difference image, which are encoded by the encoding sections 3288a to 3288d, and output the multiplexed data.

As obvious from the above-explanation, the inter-grade difference compressing section 3282a generates moving image constituent images, of which the whole image region including the characteristic regions has low image quality, i.e., moving image constituent images that have the low spatial frequency components of the input moving image constituent images. The inter-grade difference compressing section 3282b generates moving image constituent images that have frequency components higher than those of the images generated by the inter-grade difference compressing section 3282a and lower than those of the images generated by the inter-grade difference compressing section 3282c. In the moving image compressing images generated by the inter-grade difference compressing section 3282b, the difference, of the regions other than the characteristic regions, from the moving image constituent images generated by the inter-grade difference compressing section 3282a, is reduced.

Likewise, the inter-grade difference compressing section 3282c generates moving image constituent images that have frequency components higher than those of the images generated by the inter-grade difference compressing section 3282b and lower than those of the images generated by the inter-grade difference compressing section 3282d. The inter-grade difference compressing section 3282d generates moving image constituent images that have frequency components higher than those of the images generated by the inter-grade difference compressing section 3282c. In the moving image compressing images generated by the inter-grade difference compressing section 3282c and inter-grade difference compressing section 3282d, the difference, of the regions other than the characteristic regions, from the moving image constituent images generated by the inter-grade difference compressing section 3282*b* and inter-grade difference compressing section 3282*c*, is reduced.

Each of the inter-grade difference compressing sections 3282*b* to 3282*d* can provide to the outside, a moving image, the image quality of which varies according to the categories of the characteristic regions, by processing a moving image, in which characteristic regions of predetermined categories have an image quality higher than that of the other regions. At this time, the inter-grade difference compressing sections 3282*b* to 3282*d* perform compression based on the difference from the lower-quality moving image constituent images processed by another inter-grade difference compressing section 3282, so the compression becomes efficient.

When the characteristic region detecting section 3202 detects the quantity of a characteristic of each of a plurality of characteristic regions, it may calculate a reliability degree indicating the degree of how sure the detected characteristic is of a characteristic region, for each of the plurality of characteristic regions. The inter-grade difference compressing sections 3282*b* to 3282*d* compress the images of the characteristic regions, the resolution of which has been adjusted according to the quantity of characteristic and its reliability degree, both obtained for each of the plurality of characteristic regions. For example, the image quality degenerating section 3281 may adjust the resolution of the images of the plurality of characteristic regions according to the quantity of characteristic and reliability degree obtained for each characteristic region, and may supply the adjusted images to the inter-grade difference compressing sections 3282. For example, the image quality degenerating section 3281 may change the images of the plurality of characteristic regions to a resolution higher, by a larger amount when the reliability degree is lower, than a resolution predetermined according to the quantity of characteristic.

The image processing apparatus 3120 performs hierarchical encoding by encoding a difference between a plurality of images of different grades having different resolutions. As obvious from this, the compression methods adopted by the image processing apparatus 3120 includes a method according to H.264/SVC.

The compressed moving image decompressing section 3202 may decode some regions of encoded moving image constituent images. For example, the compressed moving image decompressing section 3202 may decode such regions in the encoded images that are intra-encoded, into pixel values. The characteristic region detecting section 3203 may detect characteristic regions in the encoded images, based on the pixel values obtained by the decoding by the compressed moving image decompressing section 3202. The encoded moving image constituent images are one example of encoded images.

Specifically, the compressed moving image decompressing section 3202 decodes I pictures in the encoded moving image constituent images into pixel values. The compressed moving image decompressing section 3202 may decode regions referred to by motion vectors and regions that are intra-encoded, into pixel values. The characteristic region detecting section 3202 may detect characteristic regions in the encoded images, based on the pixel values obtained by the decoding by the compressed moving image decompressing section 3202.

The compressing section 3240 may compress the moving image constituent images by using the encoded data resulting from the decoding by the compressed moving image decompressing section 3202. Specifically, the inter-grade difference compressing sections 3282 impart different image qualities to the images of the characteristic regions and to the images of the regions other than the characteristic regions, by using the encoded data included in the encoded images. Specifically, the inter-grade difference compressing sections 3282 imparts a higher image quality to the images of the characteristic regions than that to the images of the regions other than the characteristic regions, by using the encoded data included in the encoded images.

The compressed moving image acquiring section 3201 acquires a plurality of encoded images, which are a plurality of moving image constituent images included in a moving image, that are encoded. Here, the encoded images may be moving image constituent images included in a moving image encoded by MPEG H.264, or Motion JPEG The inter-grade difference compressing sections 3282 impart a higher image quality to the images of the characteristic regions than that to the images of the regions other than the characteristic regions, by using the encoded data included in the plurality of encoded images.

The compressed moving image decompressing section 3202 decodes some portions of the encoded images to acquire pixel information of at least some regions in the encoded images and encoding information about the encoding of the pixel information. The characteristic region detecting section 3203 detects characteristic regions based on at least one of the pixel information and the encoding information. The input moving image quality control section 3280 and the image quality degenerating section 3281 process at least one of the pixel information and the encoding information, and impart a higher image quality to the images of the characteristic regions than that to the images of the regions other than the characteristic regions. The inter-grade difference compressing section 3282 encodes the pixel information based on the encoding information.

The compressed moving image acquiring section 3201 acquires a plurality of encoded images, which are a plurality of moving image constituent images encoded by motion vectors. The compressed moving image decompressing section 3202 decodes some portions of the encoded images to acquire pixel information and the motion vectors. The characteristic region detecting section 3203 detects characteristic regions in the encoded images, based on at least one of the pixel information and the motion vectors. The input moving image quality control section 3280 and the image quality degenerating section 3281 process at least one of the pixel information and the motion vectors, and impart a higher image quality to the images of the characteristic regions than that to the images of the regions other than the characteristic regions. The inter-grade difference compressing sections 3282 encode the pixel information based on the motion vectors.

The compressed moving image acquiring section 3201 acquires encoded images, which are encoded based on transform coefficients obtained by transforming pixel data into spatial frequency domain, and based on motion vectors. The compressed moving image decompressing section 3202 decodes some portions of the encoded images to acquire the transform coefficients and the motion vectors. The inter-grade difference compressing sections 3282 impart a higher image quality to the images of the characteristic regions than that to the images of the regions other than the characteristic regions, by reducing the amount of information of the transform coefficients indicating frequency components, the spatial frequency of which is larger than a predetermined frequency.

The compressed moving image acquiring section 3201 acquires encoded images, which are encoded based on the differences in image between regions from which motion vectors start and partial regions referred to by the motion vectors. The characteristic region detecting section 3203 detects, as characteristic regions, regions in the moving image, in which moving objects are included. The inter-grade difference compressing sections 3282 change the differences between the motion vectors and the images of the regions other than the characteristic regions, into values indicating that the regions other than the characteristic regions have the same image contents as partial regions in another moving image constituent image. Specifically, the inter-grade difference compressing sections 3282b to 3282d changes the motion vectors of the regions other than the characteristic regions to 0, and changes the difference information of the images of the regions other than the characteristic regions to 0, as explained above.

Figure 21:
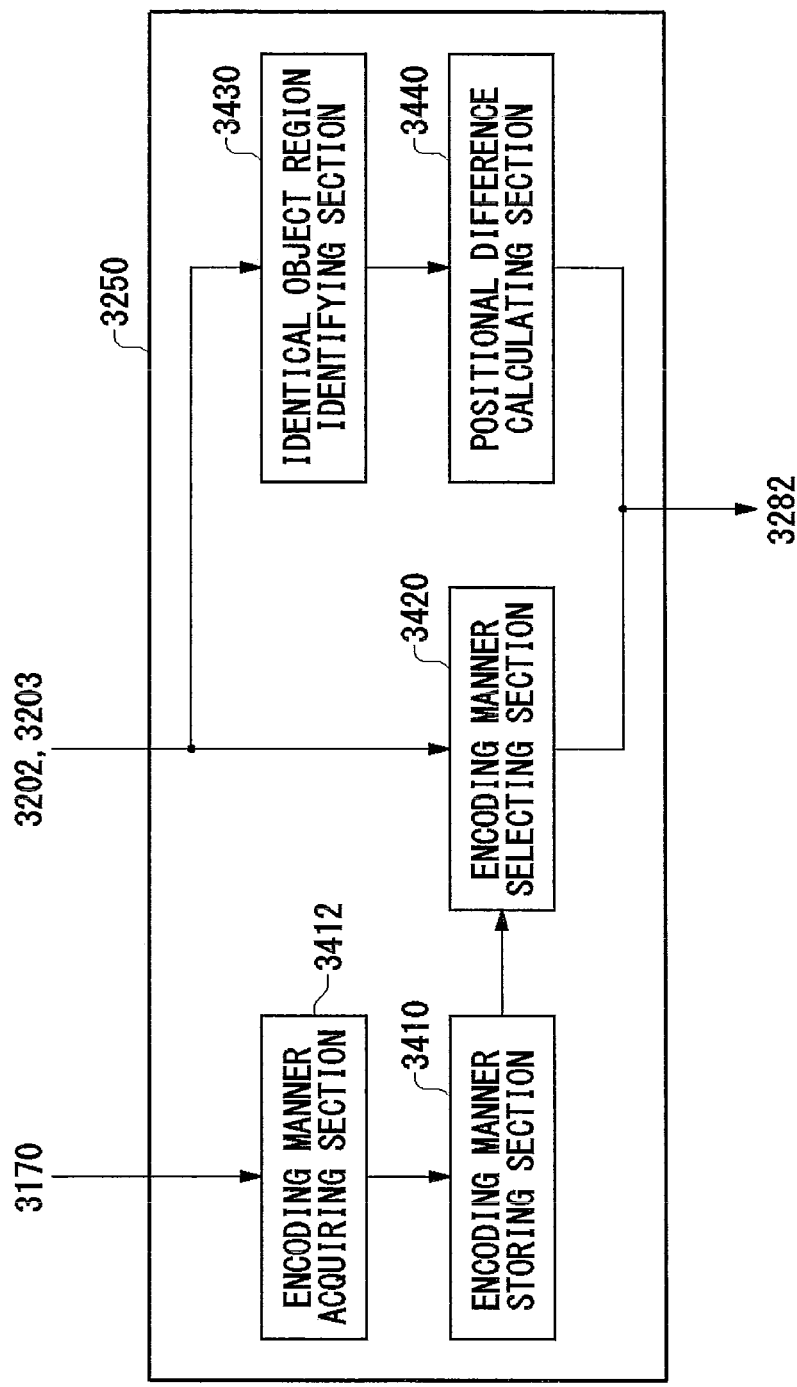
FIG. 21 shows one example block configuration of a compression control section 3250.

FIG. 21 shows one example block configuration of the compression control section 3250. The compression control section 3250 includes an encoding manner storing section 3410, an encoding manner acquiring section 3412, an encoding manner selecting section 3420, a positional difference calculating section 3440, and an identical object region identifying section 3430.

The encoding manner storing section 3410 stores encoding manners in association with quantities of characteristics of objects. Specifically, the encoding manner storing section 3410 stores encoding manners in association with categories of objects. The encoding manner selecting section 3420 selects an encoding manner stored in the encoding manner storing section 3410 in association with a category of an object included in a characteristic region detected by the characteristic region detecting section 3203.

The compressing section 3240 compresses the images of a plurality of characteristic regions by encoding manners stored in the encoding manner storing section 3410 in association with the categories of objects included in the plurality of characteristic regions. Specifically, the compressing section 3240 compresses the images of a plurality of characteristic regions in each of a plurality of moving image constituent images, by encoding manners stored in the encoding manner storing section 3410 in association with the categories of objects included in the plurality of characteristic regions.

To be more specific, the encoding manner storing section 3410 stores encoding manners of either intra-encoding or inter-encoding in association with the categories of objects. The compressing section 3240 compresses the images of a plurality of characteristic regions in each of a plurality of moving image constituent images by an intra-encoding manner or an inter-encoding manner stored in the encoding manner storing section 3410 in association with the categories of objects included in the plurality of characteristic regions.

The encoding manner storing section 3410 stores encoding manners that indicate the directions of intra-prediction for intra-encoding, in association with the categories of objects. The compressing section 3240 compresses the images of a plurality of characteristic regions in each of a plurality of moving image constituent images, by performing intra-prediction in the directions stored in the encoding manner storing section 3410 in association with the categories of objects included in the plurality of characteristic regions.

The encoding manner storing section 3410 stores encoding manners that indicate the units of motion prediction for inter-encoding, in association with the categories of objects. The compressing section 3240 compresses the images of a plurality of characteristic regions in each of a plurality of moving image constituent images, by performing motion prediction by the units of motion prediction stored in the encoding manner storing section 3410 in association with the categories of objects included in the plurality of characteristic regions.

The encoding manner storing section 3410 stores the sizes of partial regions to be used as encoding units of encoding moving image constituent images, in association with the categories of objects. The compressing section 3240 compresses the images of a plurality of characteristic regions in each of a plurality of moving image constituent images, by dividing the image of each object included in the characteristic region into partial regions having a size stored in the encoding manner storing section 3410 in association with the category of the object.

The encoding manner storing section 3410 stores the sizes of partial regions to be used as encoding units of encoding moving image constituent images, in association with the sizes of objects. The compressing section 3240 compresses the images of a plurality of characteristic regions in each of a plurality of moving image constituent images, by dividing the image of each object included in the characteristic region into partial regions having a size stored in the encoding manner storing section 3410 in association with the size of the object.

As explained above, the compressing section 3240 compresses the images of a plurality of characteristic regions by encoding manners stored in the encoding manner storing section 3410 in association with the quantities of characteristics of objects included in the plurality of characteristic regions respectively. The encoding manner storing section 3410 may store, in association with the categories of objects, encoding manners that set target amounts of codes. In this case, the compressing section 3240 compresses the images of a plurality of characteristic regions in the images by the encoding manners stored in the encoding manner storing section 3410 in association with the categories of objects included in the plurality of characteristic regions respectively.

Specifically, the encoding manner storing section 3410 stores, in association with the categories of objects, encoding manners that indicate quantizing steps. The compressing section 3240 compresses the images of a plurality of characteristic regions in the images by quantizing them by the quantizing steps stored in the encoding manner storing section 3410 in association with the categories of objects included in the plurality of characteristic regions respectively.

The identical object region identifying section 3430 identifies a characteristic region that includes the same object as that included in a characteristic region of one of a plurality of moving image constituent images, from another moving image constituent image. The positional difference calculating section 3440 calculates a positional difference, which is the difference between the position of the characteristic region in the another moving image constituent image identified by the identical object region identifying section 3430 and the position of the characteristic region in the one moving image constituent image.

The compressing section 3240 compresses the image of at least a partial region of the characteristic region in the another moving image constituent image identified by the identical object region identifying section 3430, by comparing the image of at least the partial region with the image of a region surrounding a position, in the one moving image constituent image, that is distanced by the calculated positional difference from the position of that partial region. Specifically, the motion analyzing section 3285 calculates an amount of change in image content between the one moving image constituent image and the another moving image constituent image, by comparing the image of at least the partial region of the characteristic region in the another moving image constituent image identified by the identical object region identifying section 3430 with the image of the region surrounding the position, in the one moving image constituent image, distanced by the calculated positional difference from the position of that partial region. The motion analyzing section 3285 compares the image of each of a plurality of partial regions included in the characteristic region in the another moving image constituent image with the image of a partial region surrounding a position, in the one moving image constituent image, that is distanced by the calculated positional difference from the position of that partial region, thereby calculating an amount of change in image content between the constituent images in each of the plurality of partial regions.

In this case, the difference obtaining target region determining section 3294 determines, for each of one partial region and another partial region included in the characteristic region in the another moving image constituent image, a comparison target partial region, which is a partial region surrounding a position, in the one moving image constituent image, distanced by the calculated positional difference from the position of the one partial region or the another partial region in the another moving image constituent image, based on the amount of change in image content. The difference processing section 3287 compresses the images of the one partial region and the another partial region, by comparing the images with the images of the comparison target partial regions determined by the difference obtaining target region determining section 3294 for the partial regions respectively. The motion encoding section 3286 compresses a partial region positional difference that indicates the difference between the position of the one partial region and the position of the comparison target partial region determined for the one partial region, and a partial region positional difference that indicates the difference between the position of the another partial region and the position of the comparison target partial region determined for the another partial region.

Note that the difference obtaining target region determining section 3294 determines a comparison target partial region for at least one of the one partial region and the another partial region, in such a manner that a difference between the partial region positional difference about the one partial region and the partial region positional difference about the another partial region becomes smaller than a predetermined value. The motion encoding section 3286 compresses the partial region positional difference about the one partial region, by comparing it with the partial region positional difference about the another partial region. As explained above, the motion encoding section 3286 compresses the partial region positional differences based on the difference between them, so can compress the data more by reducing the partial region positional differences more.

The difference processing section 3287 compresses the images of the one partial region and the another partial region, by obtaining a difference between each partial region and the comparison target partial region determined by the difference obtaining target region determining section 3294 for that partial region. The motion encoding section 3286 compresses the partial region positional difference about the one partial region, by obtaining a difference between it and the partial region positional difference about the another partial region.

The identical object region identifying section 3430 identifies, from a plurality of moving image constituent images, characteristic regions that include an identical object. The positional difference calculating section 3440 calculates a positional difference for characteristic regions of every category in the plurality of moving image constituent images identified by the identical object region identifying section 3430. The motion analyzing section 3285 calculates, for each of the plurality of moving image constituent images from which the characteristic regions are identified by the identical object region identifying section 3430, an amount of change in image content between the moving image constituent image and another moving image constituent image, by comparing the image of at least a partial region of the characteristic region that includes the identical object with the image of a region surrounding a position, in the another moving image constituent image, that is distanced by the calculated positional difference from the position of at least the partial region. The compressing section 3240 compresses the image of at least the partial region based on the amount of change in image content. Specifically, the compressing section 3240 compresses the image of each of a plurality of partial regions based on the amount of change in image content.

The identical object region identifying section 3430 identifies, from a plurality of moving image constituent images that should be inter-encoded, characteristic regions that include an identical object. Specifically, the identical object region identifying section 3430 identifies characteristic regions that include an identical object, from a plurality of moving image constituent images that should be encoded to P pictures or B pictures.

The difference obtaining target region determining section 3294 and motion encoding section 3286 according to the present invention function as a comparison target region determining section that determines the aforementioned comparison target partial region and a motion compressing section that compresses the aforementioned partial region positional difference, respectively. The motion analyzing section 3285 functions as a change calculating section that calculates the aforementioned amount of change in image content. The positional difference information changing section 3290, the motion encoding section 3286, the image decoding section 3292, the image enlarging section 3293, the pixel value changing section 3291, the difference processing section 3287, and the encoding section 3288 function as an image compressing section that compresses images based on the amount of change in image content.

In the above explanation, the motion analyzing section 3285 calculates motion vectors as one example of amount of change in image content. The amount of change in image content may not only be an amount of parallel displacement of partial regions represented by, for example, motion vectors, but also be at least one of an amount of image enlargement/reduction, an amount of image rotation, and an amount of image distortion. The compressing section 3240 may compress moving image constituent images based on an amount of image enlargement/reduction, an amount of image rotation, and an amount of image distortion. For example, the compressing section 3240 may generate a comparison target image, the difference from which is to be obtained, based on at least one of an amount of image enlargement/reduction, an amount of image rotation, and an amount of image distortion, the same way as identifying a comparison target image, the difference from which is to be obtained, based on motion compensation as described above.

The encoding manner acquiring section 3412 acquires the information to store in the encoding manner storing section 3410, from the outside of the image processing apparatus 3120. Specifically, the encoding manner acquiring section 3412 acquires encoding manners in association with quantities of characteristics of objects. The encoding manner acquiring section 3412 may acquire a plurality of encoding manners and the order in which these encoding manners are selected, in association with quantities of characteristics of objects. The encoding manner storing section 3410 stores, in association with the quantities of characteristics of objects, the encoding manners acquired by the encoding manner acquiring section 3412 in association with the quantities of characteristics of objects.

The quantities of characteristics of objects may be, for example, the categories of objects, the sizes of objects, etc. as mentioned before. The encoding manners may be, for example, intra-encoding or inter-encoding, the directions of intra-prediction, the units of motion prediction, the sizes of partial regions to be used as encoding units, a target amount of codes, and quantizing steps, etc. The encoding manner acquiring section 3412 may acquire information including these encoding manners from the image processing apparatus 3170 or the display apparatus 3180 via the communication network 3110. For example, the image processing apparatus 3170 may send, to the image processing apparatus 3120 via the communication network 3110, an encoding manner suitable for the memory capacity unused and available in a recording medium included in the image DB 3175. For example, the image processing apparatus 3170 may send, to the image processing apparatus 3120, information that designates an encoding manner that can encode data to a smaller amount of codes when the memory capacity unused is scarcer.

Figure 22:
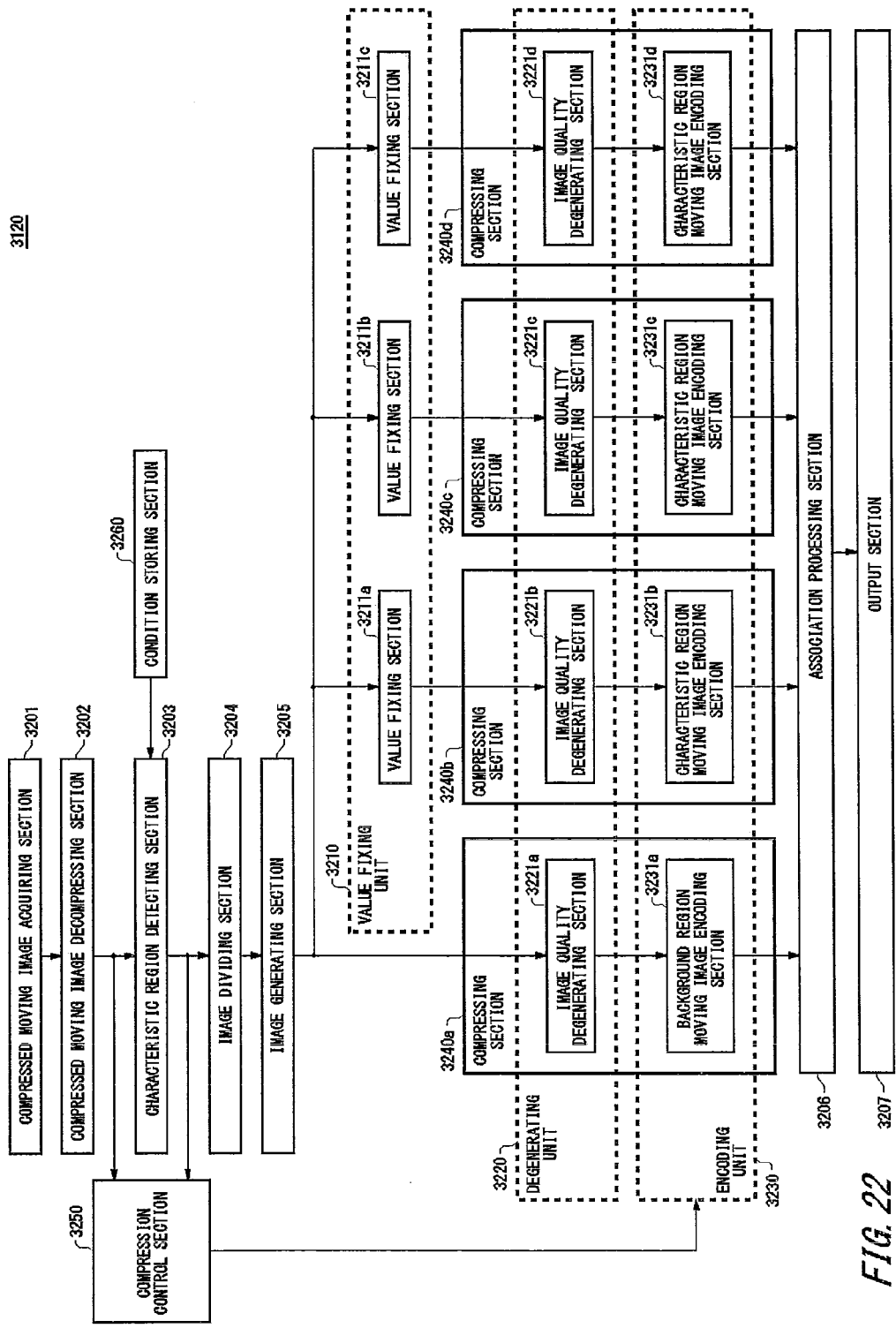
FIG. 22 shows one example block configuration of the image processing apparatus 3120 according to another embodiment.

FIG. 22 shows one example block configuration of the image processing apparatus 3120 according to another embodiment. The image processing apparatus 3120 includes a compressed moving image acquiring section 3201, a compressed moving image decompressing section 3202, a characteristic region detecting section 3203, an image dividing section 3204, an image generating section 3205, a value fixing unit 3210, a degenerating unit 3220, an encoding unit 3230, a compression control section 3250, an association processing section 3206, a condition storing section 3260, and an output section 3207.

The functions and operations of each component of the compressed moving image acquiring section 3201, the compressed moving image decompressing section 3202, the characteristic region detecting section 3203, the image dividing section 3204, the image generating section 3205, and the condition storing section 3260 are generally the same as those of the component denoted by the same reference numeral explained with reference to FIG. 19 to FIG. 21. Therefore, these components will not be explained again.

The value fixing unit 3210 includes a plurality of value fixing sections 3211a to 3211c, which may be hereinafter collectively referred to as value fixing sections 3211. The degenerating unit 3220 includes a plurality of image quality degenerating sections 3221a to 3221d, which may be hereinafter collectively referred to as image quality degenerating sections 3221.

The encoding unit 3230 includes a background region moving image encoding section 3231a and a plurality of characteristic region moving image encoding sections 3231b to 3231d, which may be hereinafter collectively referred to as characteristic region moving image encoding sections 3231. Note that the background region moving image encoding section 3231a and the characteristic region moving image encoding sections 3231b to 3231d may sometimes be collectively referred to as encoding sections 3231.

The image quality degenerating section 3221a and the background region moving image encoding section 3231a function as a compressing section 3240a. The image quality degenerating section 3221b and the characteristic region moving image encoding section 3231b function as a compressing section 3240b. Likewise, the image quality degenerating section 3221c and the characteristic region moving image encoding section 3231c function as a compressing section 3240c. The image quality degenerating section 3221d and the characteristic region moving image encoding section 3231d function as a compressing section 3240d. The plurality of compressing sections 3240a to 3240d may be collectively referred to as compressing sections 3240.

The compressed moving image acquiring section 3201 acquires a compressed moving image. Specifically, the compressed moving image acquiring section 3201 acquires encoded data of a captured moving image generated by the image capturing apparatus 3100. The compressed moving image decompressing section 3202 restores the moving image acquired by the compressed moving image acquiring section 3201, to generate a plurality of moving image constituent images included in the moving image. Specifically, the compressed moving image decompressing section 3202 decodes the captured moving image data acquired by the compressed moving image acquiring section 3201 to generate a plurality of moving image constituent images included in the moving image. The moving image constituent images include frame images and field images.

The characteristic region detecting section 3203 detects characteristic regions from the plurality of moving image constituent images included in the moving image. The image dividing section 3204 divides each of the plurality of moving image constituent images into characteristic regions and a background region.

The image generating section 3205 extracts characteristic region images from the plurality of moving image constituent images, thereby generating a plurality of characteristic region compressing purpose moving images each including a different one of the plurality of extracted characteristic region images. Specifically, the image generating section 3205 makes copies of the acquired moving image to generate a plurality of characteristic region compressing purpose moving images, each of which is the basis for a corresponding characteristic region moving image to be compressed, and a background region compressing purpose moving image, which is the basis for a background region moving image to be compressed.

The value fixing sections 3211 each give a fixed value to the pixel values in regions other than the characteristic region image in the plurality of moving image constituent images included in a corresponding characteristic region compressing purpose moving image. For example, the value fixing section 3211 sets the pixel values in the regions other than the characteristic region image to a predetermined value, e.g., a luminance value of 0. The compressing sections 3240 each compress the corresponding characteristic region compressing purpose moving image including the plurality of moving image constituent images, in which the pixel values in the regions other than the characteristic region image are set to the fixed value, with an intensity corresponding to a quantity of a characteristic of the corresponding characteristic region compressing purpose moving image. In this way, the compressing sections 3240 compress the plurality of characteristic region compressing purpose moving images and the background region compressing purpose moving image, with the intensities corresponding to the quantities of characteristics of the respective moving images.

As explained above, the characteristic region detecting section 3203 detects characteristic regions from the images. The image dividing section 3204 divides the images into characteristic regions, and a background region other than the characteristic regions. The compressing sections 3240 compress the characteristic region images, which are the images representing the characteristic regions, and the background region image, which is the image representing the background region, with different intensities respectively. Each of the compressing sections 3240 compresses a corresponding characteristic region moving image that includes a plurality of moving image constituent images in which a corresponding characteristic region image is included, or a background region moving image that includes a plurality of moving image constituent images in which the background region image is included, with a corresponding intensity.

The compressing section 3240*b*, the compressing section 3240*c*, and the compressing section 3240*d* are pre-assigned the categories of the characteristic region moving images to compress, so the compressing section 3240*b*, the compressing section 3240*c*, and the compressing section 3240*d* compress the characteristic region moving images of the categories pre-assigned to them, respectively. The compression intensities with which the characteristic region moving images are compressed are predetermined for the respective categories of characteristics, and the compressing section 3240*b*, the compressing section 3240*c*, and the compressing section 3240*d* compress the characteristic region moving images of the categories pre-assigned to them with the compression intensities predetermined for the categories. In this way, the compressing sections 3240 compress the plurality of regions concurrently, with compressors prepared for the image regions divided by the image dividing section 3204 respectively.

The compressing sections 3240 may be implemented by one compressor, so that a plurality of characteristic region moving images and a background region moving image may be compressed one at a time sequentially. In another example, the compressing sections 3240 may generate one moving image data, by compressing the captured moving image decoded by the compressed moving image decompressing section 3202 by using, for each of the regions divided by the image dividing section 3204, a compression rate predetermined for the category of the characteristics region or predetermined for the background.

The characteristic region detecting section 3203 detects a plurality of characteristic regions of different categories, from a plurality of moving image constituent images included in a moving image. The image dividing section 3204 divides the plurality of moving image constituent images into a plurality of characteristic regions and a background region other than the plurality of characteristic regions. The compressing sections 3240 compress a plurality of characteristic region moving images and a background region moving image with intensities corresponding to the quantities of characteristics of the images. The quantities of characteristics include categories of objects, sizes of objects, velocities at which moving objects move, and sizes of characteristic regions.

Specifically, the image quality degenerating sections 3221 compress the plurality of characteristic region moving images and the background region moving image by degenerating the image qualities of the moving images according to the quantities of their characteristics. More specifically, the image quality degenerating sections 3221 compress the plurality of characteristic region moving images and the background region moving image by reducing the resolution or frame rate according to the quantities of their characteristics. The encoding sections 3231 compresses the plurality of characteristic region moving images and the background region moving image by encoding them with set values corresponding to the quantities of their characteristics. For example, the encoding sections 3231 compress the plurality of characteristic region moving images and the background region moving image by encoding them, by using amounts of codes assigned for the quantities of their characteristics respectively.

The characteristic region detecting section 3203 calculates, for each of the plurality of characteristic regions, a reliability degree obtained when detecting the quantity of the characteristic of the characteristic region. The compressing sections 3240 compress the plurality of characteristic region moving images with intensities corresponding to the quantities of their characteristics and reliability degrees. For example, the image quality degenerating sections 3221 compress the plurality of characteristic region moving images by reducing the resolution or frame rate according to the quantities of their characteristics and reliability degrees. The encoding sections 3231 compress the plurality of characteristic region moving images by encoding them using set values corresponding to the quantities of their characteristics and reliability degrees. For example, the compressing sections 3240 may compress the plurality of characteristic region moving images, with intensities lower, by a larger amount when the reliability degree is lower, than the intensities corresponding to the quantities of their characteristics.

The association processing section 3206 associates a plurality of characteristic region moving image data and background region moving image data generated by compressing the plurality of characteristic region moving images and the background region moving image, with one another, by, for example, affixing tag information or the like. The output section 3207 sends the plurality of characteristic region moving image data and the background region moving image data associated by the association processing section 3206 to the communication network 3110.

In the configuration of FIG. 22, the plurality of compressing sections 3240 included in the image processing apparatus 3120 compress the images of the plurality of characteristic regions and the image of the background region respectively, while in another configuration, the image processing apparatus 3120 may include one compressing section 3240 so that the one compressing section 3240 may compress images of a plurality of characteristic regions and an image of a background region by different encoding manners respectively. For example, the one compressing section 3240 may be supplied with images of a plurality of characteristic regions and an image of a background region sequentially in a time division manner, and may sequentially compress the images of the plurality of characteristic regions and the image of the background region by different encoding manners respectively.

For example, the one compressing section 3240 may quantize image information of a plurality of characteristic regions and image information of a background region with different quantizing coefficients respectively. Alternatively, the one compressing section 3240 may be supplied with images of a plurality of characteristic regions and of a background region which have been changed to have different image qualities from one another, and may compress the supplied images of the plurality of characteristic regions and of the background region by different encoding manners respectively.

In such embodiments as described above where the one compressing section 3240 quantizes the respective regions with different quantizing coefficients, or compresses the images of the respective regions changed to have different image qualities, the one compressing section 3240 may compress a unity image or may compress images which are divided by the image dividing section 3204 as explained with reference to FIG. 22. When the one compressing section 3240 compresses a unity image, the image dividing section 3204 and the value fixing sections 3211 need not perform their image dividing and value fixing operations. The image processing apparatus 3120 therefore does not have to include the image dividing section 3204 and the value fixing unit 3210.

Figure 23:
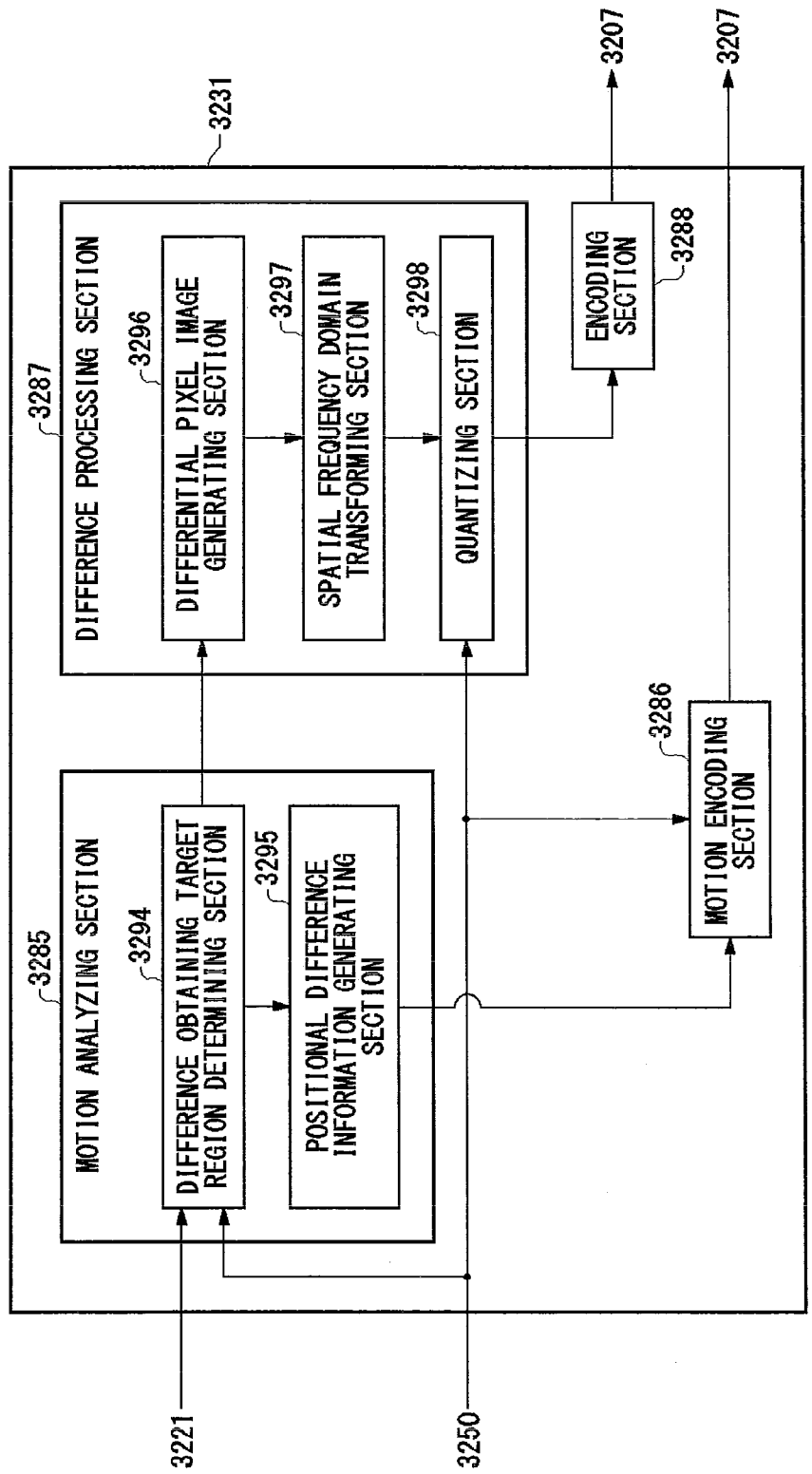
FIG. 23 shows one example block configuration of an encoding section 3231.

FIG. 23 shows one example block configuration of the encoding sections 3231. Each encoding section 3231 includes a motion analyzing section 3285, a difference processing section 3287, a motion encoding section 3286, and an encoding section 3288. The motion analyzing section 3285 includes a difference obtaining target region determining section 3294 and a positional difference information generating section 3295. The difference processing section 3287 includes a differential pixel image generating section 3296, a spatial frequency domain transforming section 3297, and a quantizing section 3298. The function and operation of the components shown in FIG. 23 are generally the same as those of the components denoted by the same reference numeral explained with reference to FIG. 20A to FIG. 20C. These components will not therefore be explained again, except any difference.

The differential pixel image generating section 3296 generates a differential pixel image, based on a difference between pixel information of a partial region, which is a compressing target, and pixel information of a partial region, which is a difference obtaining target determined by the difference obtaining target region determining section 3294. The encoding section 3288 compresses the image by encoding transform coefficients quantized by the quantizing section 3298. The motion encoding section 3286 encodes positional difference information supplied by the positional difference information generating section 3295, and supplies the encoded positional difference information to the output section 3207. The difference obtaining target region determining section 3294 determines, based on characteristic region information supplied by the compression control section 3250, difference obtaining target regions for moving image constituent images, the image quality of which is degenerated by the image quality degenerating section 3221.

Figure 24:
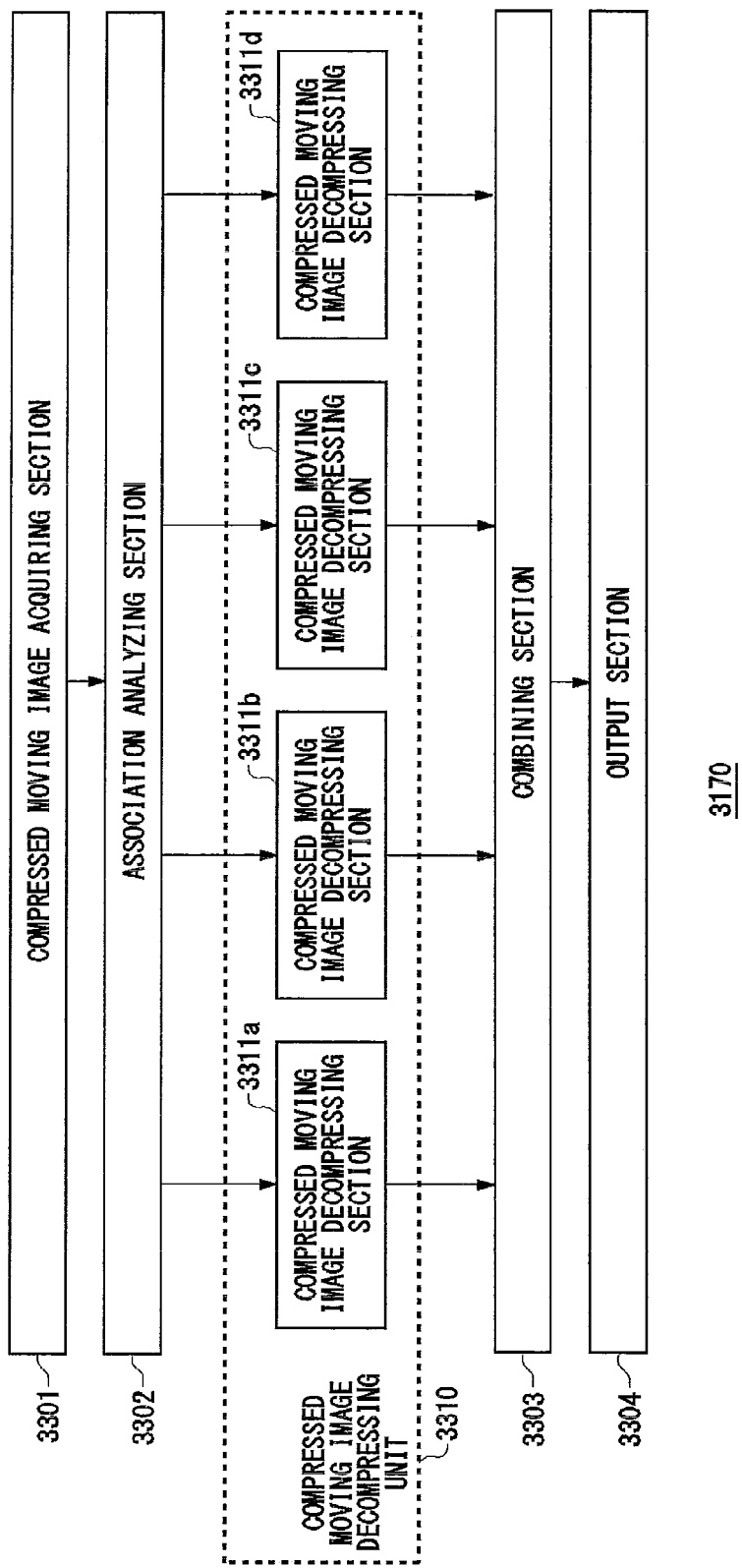
FIG. 24 shows one example block configuration of an image processing apparatus 3170.

FIG. 24 shows one example block configuration of the image processing apparatus 3170. The image processing apparatus 3170 includes a compressed moving image acquiring section 3301, an association analyzing section 3302, a compressed moving image decompressing unit 3310, a combining section 3303, and an output section 3304. The compressed moving image decompressing unit 3310 includes a plurality of compressed moving image decompressing sections 3311a to 3311d, which may be hereinafter collectively referred to as compressed moving image decompressing sections 3311. To be explained hereafter are the function and operation of each component of the image processing apparatus 3170 for processing moving image data acquired from the image processing apparatus 3120 explained with reference to FIG. 21 to FIG. 23.

The compressed moving image acquiring section 3301 acquires a plurality of characteristic region moving image data and background region moving image data which are associated with one another and output by the output section 3207. The association analyzing section 3302 analyzes, for example, the affixed tag information to retrieve the plurality of characteristic region moving image data and the background region moving image data which are associated with one another and acquired by the compressed moving image acquiring section 3301.

The compressed moving image decompressing sections 3311 decode the plurality of characteristic region moving image data and the background region moving image data respectively. Specifically, the compressed moving image decompressing section 3311a decodes the background region moving image data. The compressed moving image decompressing sections 3311b to 3311d each decode one characteristic region moving image of the plurality of characteristic region moving image data. Thereby, a plurality of characteristic region moving images and a background region moving image are obtained. The compressed moving image decompressing sections 3311b to 3311d are provided for the categories of characteristics respectively, and each decode characteristic region moving image data of one category.

The combining section 3303 combines moving image constituent images obtained by the decoding by the compressed moving image decompressing sections 3311. Specifically, the combining section 3303 generates moving image constituent images, in which the images of the characteristic regions in the moving image constituent images included in the plurality of characteristic region moving images resulting from the decoding by the compressed moving image decompressing sections 3311b to 3311d are overlaid on the moving image constituent images included in the background region moving image. The output section 3304 supplies the display apparatus 3180 with a moving image generated by the combining section 3303 that includes the plurality of moving image constituent images. The output section 3304 may record the moving image generated by the combining section 3303 including the plurality of moving image constituent images, in the image DB 3175. The image processing apparatus 3170 may record the plurality of characteristic region moving image data and the background region moving image data output by the output section 3207 in association, in the image DB 3175. In this case, the compressed moving image acquiring section 3301 may acquire the plurality of characteristic region moving image data and the background region moving image data which are associated with one another and recorded in the image DB 3175.

The compressed moving image decompressing unit 3310 according to the present embodiment includes a plurality of compressed moving image decompressing sections 3311, while in another embodiment, one compressed moving image decompressing section 3311 included in the compressed moving image decompressing unit 3310 may decode the background region moving image data and the plurality of characteristic region moving image data sequentially. When a plurality of characteristic region moving image data and background region moving image data are supplied as unity moving image data by the image processing apparatus 3120, the one compressed moving image decompressing section 3311 may decode the unity moving image data and the output section 3304 may output the moving image obtained from the decoding.

When the image processing apparatus 3170 processes moving image data generated by the image processing apparatus 3120 explained with reference to FIG. 19 to FIG. 21, the image processing apparatus 3170 acquires plural sets of moving image constituent images compressed by the inter-grade difference compressing sections 3282a to 3282d respectively. The image processing apparatus 3170 decodes each of the acquired plural sets of moving image constituent images. The image processing apparatus 3170 overlays together corresponding images from the plural sets of moving image constituent images obtained by the decoding to generate combined images. The image processing apparatus 3170 supplies the display apparatus 3180 with a moving image that includes, as its constituent images, the generated combined images.

FIG. 25 is a table showing example data stored in the encoding manner storing section 3140. The encoding manner storing section 3410 stores categories of objects, encoding modes, directions of intra-prediction, units of motion compensation, macro-block sizes, and quantizing steps.

Categories of objects may be information for identifying the categories of objects captured in moving image constituent images. Encoding modes may be information for identifying whether partial regions should be intra-encoded or inter-encoded.

Directions of intra-prediction indicate the directions of prediction for when blocks are to be intra-encoded. For example, directions of intra-prediction may be information for identifying prediction modes, which are the methods, according to, for example, an H.264 scheme, for predicting a pixel value in an intra-block For example, directions of intra-prediction may be information indicating whether to predict a pixel value based on an average in the block, or may be information indicating a pixel, the pixel value and position of which are referred to for predicting a pixel value of a pixel in the same block.

Units of motion compensation may be information that indicates the accuracy of a motion vector in a block Macro-block sizes may be information that indicates the sizes of macro-blocks. A macro-block size may be the size of a macro-block per unit area of a characteristic region. In this case, the compressing section 3240 may use a larger macro-block size when the area of a characteristic region is larger. Quantizing steps may be information that indicates correction values for quantizing steps. Quantizing steps will be explained with reference to FIG. 26 and FIG. 27.

It is preferred that the encoding manner storing section 3410 store directions of intra-prediction that are suitable for characteristic spatial frequency components possessed by objects identified by the categories of objects. For example, the encoding manner storing section 3410 may store, as a direction of intra-prediction, a prediction mode 0 for predicting a pixel value of a pixel based on a pixel value of an upper pixel, in association with a category of an object that is expected to include more vertical edges.

The encoding manner storing section 3410 may store, as a direction of intra-prediction, a prediction mode 1 for predicting a pixel value of a pixel based on the pixel value of a left pixel, in association with a category of an object that is expected to include more horizontal edges. The encoding manner storing section 3410 may store, as a direction of intra-prediction, a prediction mode 2 for predicting a pixel value of a pixel based on an average, in association with a category of an object that is expected to include more lower-frequency components, or in association with a category of an object that is expected to include many colors.

The encoding manner selecting section 3420 may determine, according to a reliability degree obtained when a characteristic region is detected, whether or not to select any encoding manner based on the categories of objects. For example, the encoding manner selecting section 3420 may select any encoding manner based on the categories of objects, on a condition that the reliability degree in detection is higher than a predetermined value.

Figures 26, 27:
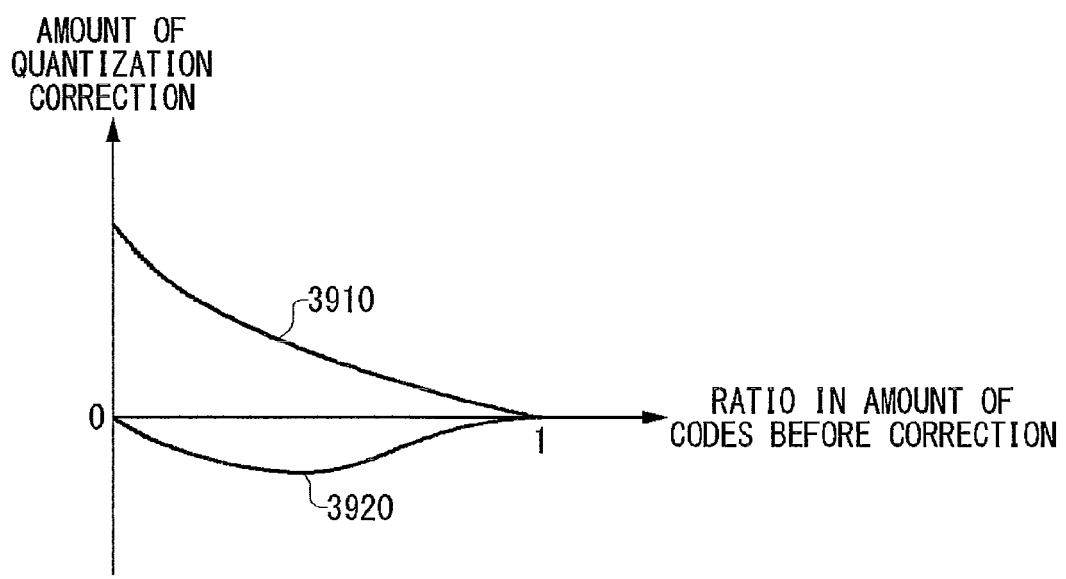
FIG. 26 shows example quantizing step correction values stored in the encoding manner storing section 3410.
FIG. 27 shows a relationship between a ratio in the amount of codes before correction and an amount Q of quantization correction.

FIG. 26 shows example correction values for quantizing steps, which are stored in the encoding manner storing section 3410. The encoding manner storing section 3410 stores a correction value for correcting a quantizing step value at each field of a quantization table used by the quantizing section 3298. In the example of FIG. 26, the table shows correction values $\Delta q_{uv}$ for quantizing steps to be applied to a 4×4 macro-block Here, u and v=0, 1, 2, and 3.

The value $\Delta q_{00}$ in the uppermost and leftmost field of this table indicates a correction value for correcting a quantizing step to be applied to a spatial frequency domain value that indicates a DC component. The values $\Delta q_{uv}$ on more rightward and more downward fields indicate correction values for quantizing steps to be applied to values of higher spatial frequency components.

The encoding manner storing section 3410 may store quantizing step correction values $\Delta q_{uv}$ for various frequency components, adapted to the categories of objects, image complexity, and encoding difference. An image complexity index may be the sum of the absolute value of the difference, calculated for every pixel included in a macro-block, between the pixel value of the pixel concerned and the average of the pixel values of the pixels included in the macro-block. An image complexity index may alternatively be the size of a high-frequency component of the image in a macro-block, obtained by processing the image in the macro-block by a high-pass filter such as a Laplacian filter.

The encoding manner storing section 3410 may store larger quantizing step correction values $\Delta q_{uv}$ for higher image complexity. As a result, a larger quantizing step is used for a more complex image content. It is expected that a spatial frequency domain value indicating a high-frequency component will be larger when the image is more complex. Because the encoding manner storing section 3410 stores larger quantizing step correction values $\Delta q_{uv}$ for more complex images, more complex images will be processed with larger quantizing steps, which will work toward reducing the amount of information of the images after quantized.

The encoding manner storing section 3410 may store smaller quantizing step correction values $\Delta q_{uv}$ for larger encoding differences. An encoding difference may be a value indicating an amount of difference between an image before subjected to lossy-encoding and the image after subjected to lossy-encoding. For example, an encoding difference may be at least either an encoding difference between before and after encoding, or a quantizing difference between before and after quantizing. It is expected that the image quality is lower as the encoding difference is larger, whereas the encoding manner storing section 3410 stores smaller quantizing step correction values $\Delta q_{uv}$ in association with larger encoding differences. Therefore, a smaller quantizing step can be selected for a larger encoding difference, which will work toward increasing the amount of information of the images after encoded. In this way, a quantizing step is determined according to the categories of objects, image complexity, and encoding difference.

The quantizing difference may be a difference between an image signal before quantized by the quantizing section 3298 and the image signal after quantized. For example, the quantizing difference may be the sum of the absolute value of the difference, calculated for every pixel value in an image signal, between the pixel value before quantized and the pixel value after quantized. The quantizing difference may be the sum of the square of the difference, calculated for every pixel value in an image signal, between the pixel value before quantized and the pixel value after quantized. The encoding difference may be the difference between an image signal before encoded and the image signal after encoded. For example, the encoding difference may be the sum of the absolute value of the difference, calculated for every pixel value in an image signal, between the pixel value before encoded and the pixel value after encoded. The encoding difference may be the sum of the square of the difference, calculated for every pixel value in an image signal, between the pixel value before encoded and the pixel value after encoded. The encoding here include transform into a spatial frequency component by the spatial frequency domain transforming section 3297, and quantization by the quantizing section 3298.

With the quantizing step correction values $\Delta q_{uv}$ according to image complexity and encoding difference stored in the encoding manner storing section 3410, it is possible to reduce increase in the amount of information due to complex images, or to reduce reduction in the image quality due to encoding that involves spatial frequency transform or quantization. FIG. 26 has explained reducing increase in the amount of information by macro-block units, while FIG. 27 will explain reducing fluctuation of the amount of information in the entire image. The encoding manner storing section 3410 may store quantizing step correction values $\Delta q_{uv}$ for various macro-blocks including 8×8, 16×16, etc., in addition to the quantizing step correction values $\Delta q_{uv}$ for 4×4 macro-blocks shown in FIG. 26.

FIG. 27 shows a relationship between a ratio in the amount of codes before correction, and the amount Q of quantization correction. The line 3910 indicates the amount of correction on the amount of quantization on a characteristic region. The line 3920 indicates the amount of correction on the amount of quantization on a background region.

The ratio in the amount of codes before correction is a ratio of the amount of codes in a characteristic region to the amount of codes in the entire image region, when the image quality of the characteristic region and that of the background region are not adjusted by the quantizing section 3298. The amount of codes in a characteristic region may be the sum of the product, calculated for every macro-block included in a characteristic region, between the image complexity of the macro-block and the amount of quantization on the macro-block. The amount of codes in the entire image region may be the sum of the product, calculated for every macro-block included in the entire image region, between the image complexity of the macro-block and the amount of quantization on the macro-block.

The amount of quantization indicates the level of quantization. That is, the amount of quantization is larger as the quantizing step is smaller. The amount Q of quantization correction indicates an amount of increase in the amount of quantization when a quantizing step is corrected with a quantizing step correction value $\Delta q_{uv}$. The amount of quantization before corrected is determined according to the amount of occupied memory in a buffer, image complexity, and a target amount of codes.

The index of the amount of codes may be the amount of quantization. If the amount of quantization is adjusted based on the image complexity, the ratio in the amount of codes before correction calculated based on the amount of codes indexed by the amount of quantization is expected to be substantially equal to the ratio in the amount of codes before correction weighted based on such image complexity and amount of quantization as described above. Alternatively, the amount of codes may be indexed simply by area. With this index too, as long as the image complexity of a characteristic region is par with that of a background region, the ratio in the amount of codes before correction calculated based on the amount of codes indexed by area is expected to be substantially equal to the ratio in the amount of code before correction weighted based on such image complexity and amount of quantization as described above. According to the explanation above, to make the explanation simple, the amount of correction of quantization on a characteristic region and regions other than the characteristic region is determined based on the ratio in the amount of codes before correction that is weighted based on image complexity. Likewise, the amount of correction of quantization on a characteristic region and regions other than the characteristic region may be determined based on the ratio in the amount of codes before correction that is weighted based on the encoding difference explained with reference to FIG. 26.

With such a process, it is possible to reduce the amount of codes in a background region according to increase in the amount of codes entailed by improving the image quality of a characteristic region. Hence, it is possible to prevent increase in the amount of codes, by balancing the image quality between a characteristic region and a background region. It is preferred that the encoding manner storing section 3410 store quantizing step correction values $\Delta q$ that satisfy the above relationship. The compressing section 3240 may save the amount of fluctuation, per unit time, of the amount of quantization correction to equal to or lower than a predetermined amount, by applying a time-domain low-pass filter to the amount of quantization correction calculated according to the image complexity, the encoding difference, and the categories of objects.

FIG. 28 is a table showing another example data stored in the encoding manner storing section 3410. The encoding manner storing section 3410 stores the directions of intra-prediction and the degrees of priority in association with the categories of objects. The directions of intra-prediction have been explained with reference to FIG. 25, so will not be explained again. The degrees of priority indicate the degrees of priority according to which the directions of intra-prediction are selected.

The encoding manner storing section 3410 stores a plurality of encoding manners and the order in which the plurality of encoding manners are selected, in association with the categories of objects included in characteristic regions. The encoding manner selecting section 3420 selects, in the order, an encoding manner stored in the encoding manner storing section 3410 in association with a category of an object included in a characteristic region, for each of a plurality of characteristic regions.

The encoding manner selecting section 3420 selects an encoding manner as a manner to be used for compressing the image of a characteristic region, if the encoding manner can compress the image of the characteristic region to a compression amount balanced with image quality, which amount is higher than a predetermined compression rate. The compressing section 3240 compresses the images of a plurality of characteristic regions in the moving image constituent images by encoding manners selected by the encoding manner selecting section 3420.

As above, the encoding manner selecting section 3420 preferentially selects an encoding manner that can achieve a higher compression amount balanced with image quality from the plurality of encoding manners, for each of a plurality of moving image constituent images to be compressed. Therefore, by testing the encoding modes in the priority order matched to the categories of objects, the encoding manner selecting section 3420 can reduce the probability that any unnecessary encoding modes may be tested. Hence, the encoding manner selecting section 3420 can sometimes specify the direction of intra-prediction suitable for the categories of objects quickly.

The encoding manner storing section 3410 may store, in association with the categories of objects, various combinations of a plurality of encoding manners. In this case, the encoding manner selecting section 3420 preferentially selects an encoding manner that can achieve a higher compression amount balanced with image quality from the plurality of encoding manners, for each of a plurality of moving image constituent images to be compressed.

The encoding manner selecting section 3420 preferentially selects, for each of a plurality of characteristic regions, an encoding manner that can achieve a higher compression amount balanced with image quality in the image of the characteristic region, from the plurality of encoding manners stored in the encoding manner storing section 3410 in association with the categories of objects included in the characteristic regions.

The compressing section 3240 compresses the image of each of the plurality of characteristic regions in each of a plurality of moving image constituent images by an encoding manner selected by the encoding manner selecting section 3420. In this way too, the encoding manner selecting section 3420 can sometimes specify the direction of intra-prediction suitable for the categories of objects quickly.

Figure 29:
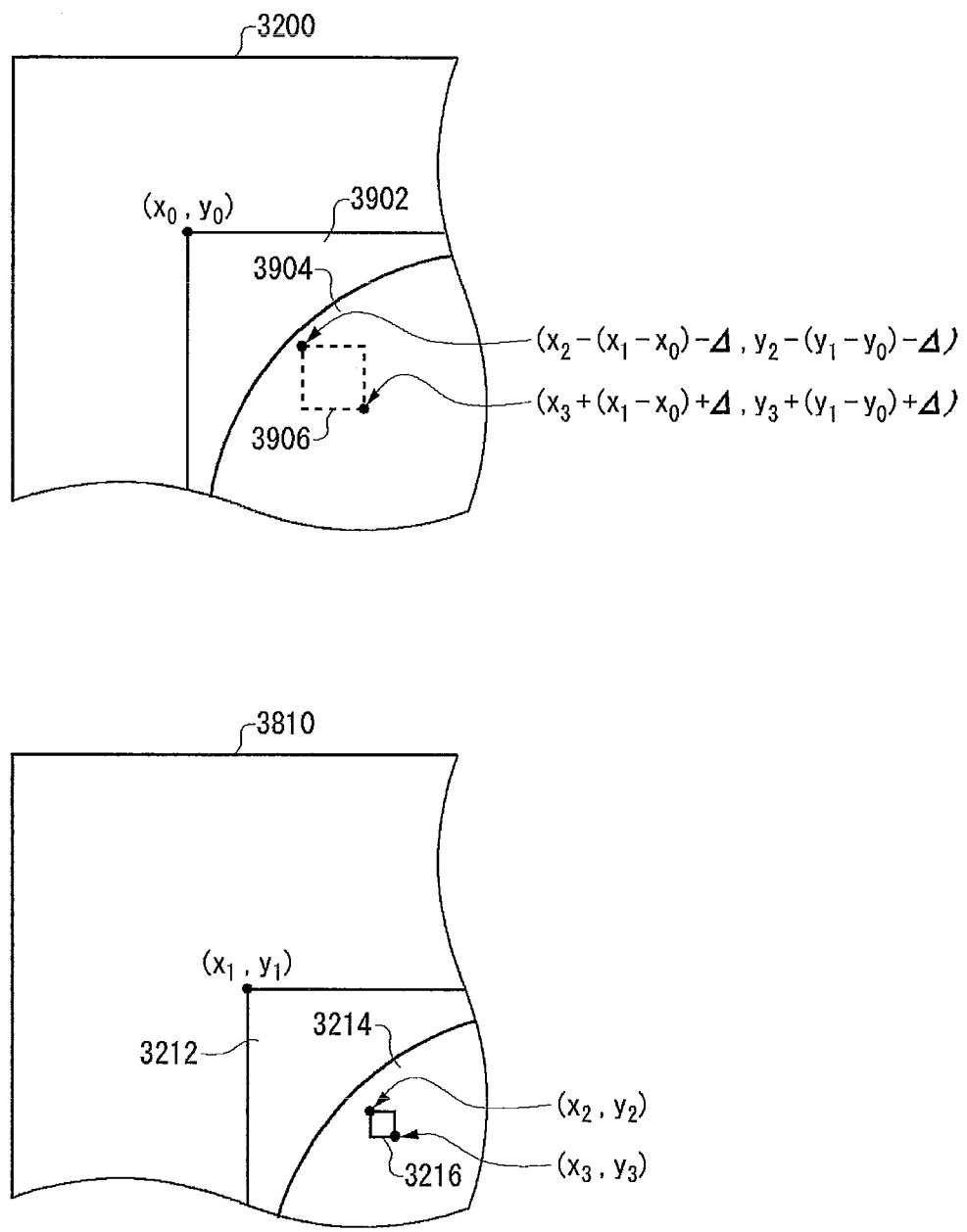
FIG. 29 shows an example determining method of a difference obtaining target region determining section 3294 for determining a difference obtaining target region.

FIG. 29 shows one example determining method of the difference obtaining target region determining section 3294 for determining a difference obtaining target region. Assume that the identical object region identifying section 3430 identifies a characteristic region 3902 and a characteristic region 3212 that include an object 3904 and an object 3214, which are the same object, from a moving image constituent image 3200 and a moving image constituent image 3810 respectively. In this case, the positional difference calculating section 3440 calculates a positional difference between the positions of the characteristic regions, which is the difference between the leftmost uppermost coordinates of the characteristic region 3902 and the leftmost uppermost coordinates of the characteristic region 3212.

In the example of FIG. 29, the positional difference calculating section 3440 derives a positional difference (x1−x0, y1−y0). The difference obtaining target region determining section 3294 determines a difference obtaining target region in the moving image constituent image 3200, in order to encode a macro-block 3216 included in the characteristic region 3212 by inter-encoding. When the leftmost uppermost coordinates of the macro-block 3216 are (x2, y2) and the rightmost and lowermost coordinates of the macro-block 3216 are (x3, y3), the difference obtaining target region determining section 3294 determines a difference obtaining target region in a rectangular region 3906, the opposing corners of which are (x2−(x1−x0)−Δ, y2−(y1−y0)−Δ) and (x3+(x1−x0)+Δ, y3+(y1−y0)+Δ) in the moving image constituent image 3200. Here, the origin is on the leftmost uppermost position of both the moving image constituent image 3200 and the moving image constituent image 3810.

The area of a track range in which a difference obtaining target region is to be determined is defined by Δ. The value Δ may be a predetermined number of pixels. Alternatively, the value Δ may be predefined according to the categories of objects included in the characteristic regions 3902 and 3212. For example, the difference obtaining target region determining section 3294 may determine a difference obtaining target region by using a larger value Δ for a category of an object that is expected to move at a higher speed. In this way, the compressing section 3240 compresses the image of at least a partial region of a characteristic region in another moving image constituent image identified by the identical object region identifying section 3430, by comparing the image of at least the partial region with the image of a region within a range that is distanced by the predetermined number of pixels from a position in one moving image constituent image, which position is distanced by the calculated positional difference from the position of that partial region.

The difference obtaining target region determining section 3294 may determine, according to a reliability degree obtained when a characteristic region is detected, whether or not to determine a difference obtaining target region based on the positional difference between characteristic regions. For example, the difference obtaining target region determining section 3294 may determine a difference obtaining target region based on the positional difference between characteristic regions, on the condition that the reliability degree is higher than a predetermined value.

As explained above, the difference obtaining target region determining section 3294 can narrow the range in which to track motion vectors, by using the positional difference between characteristic regions. Therefore, the difference obtaining target region determining section 3294 can quickly calculate motion vectors. The characteristic region 3212 can prevent the motion vectors therewithin from being directionally uneven. Therefore, when the motion encoding section 3286 encodes motion vectors based on the difference between motion vectors in adjacent macro-blocks, the difference can become more smaller. Therefore, the image processing apparatus 3170 can compress the motion vectors with a higher compression rate.

Figure 30:
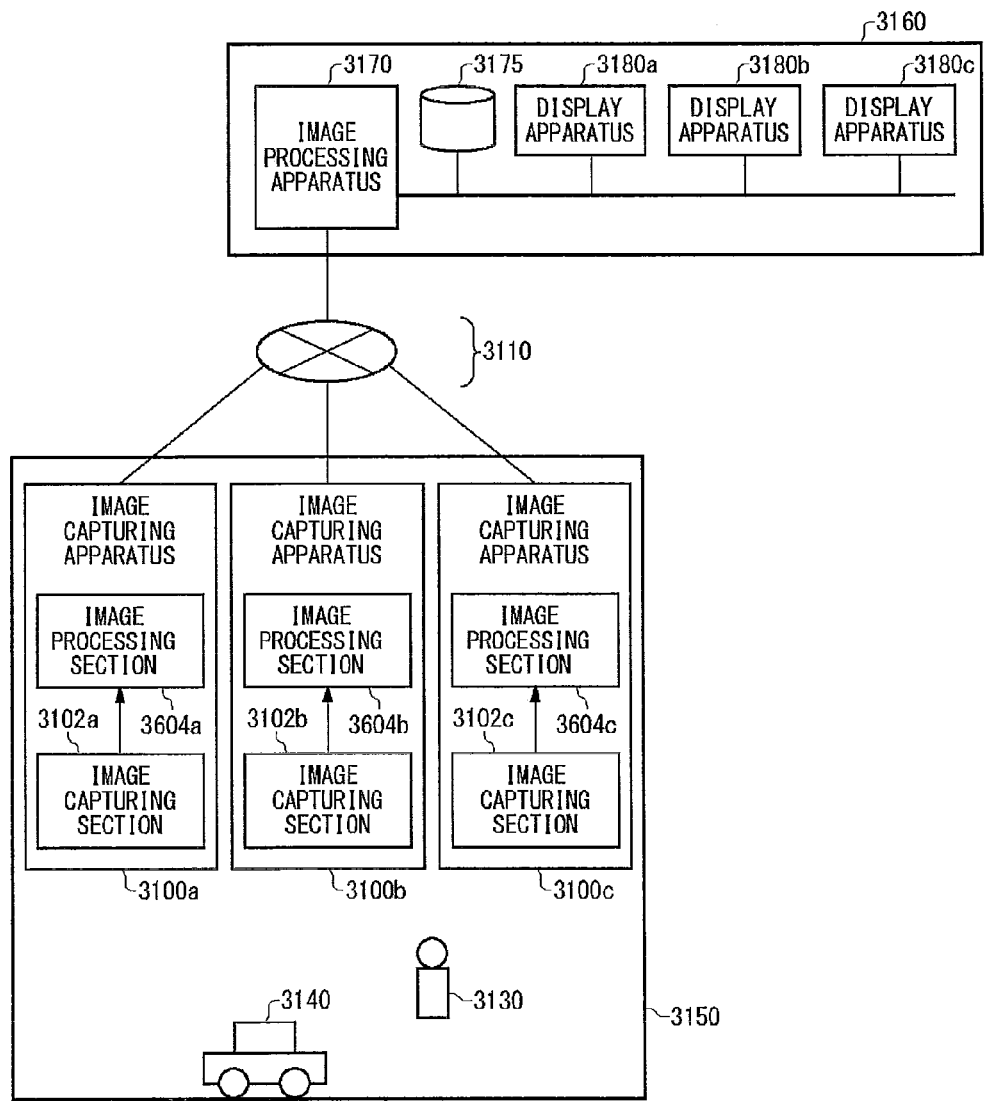
FIG. 30 shows an example of an image processing system 3020.

FIG. 30 shows one example of an image processing system 3020 according to another embodiment. The image processing system 3020 according to the present embodiment has the same configuration as that of the image processing system 3010 explained with reference to FIG. 1, except that the image processing apparatuses 3120 are removed but instead image capturing apparatuses 3100a to 3100d include image processing sections 3604a to 3604d, which may be hereinafter collectively referred to as image processing sections 3604.

The image processing section 3604 includes the components of the image processing apparatus 3120 except the compressed moving image acquiring section 3201 and the compressed moving image decompressing section 3202. The functions and operations of the respective components included in the image processing section 3604 may be substantially the same as those of the components included in the image processing apparatus 3120, except that the components of the image processing section 3604 process a captured moving image captured by the image capturing section 3102, not like the components of the image processing apparatus 3120 process a captured moving image resulting from the decompression by the compressed moving image decompressing section 3202. The image processing system 3020 with this configuration can also achieve effects similar to those explained in connection with the image processing system 3010 with reference to FIG. 18 to FIG. 29.

An encoding manner acquiring section 3412 included in the image capturing apparatus 3100 may acquire the encoding manners described above, from the image processing apparatus 3170, or from a user of the image capturing apparatus 3100. For example, the image capturing apparatus 3100 may have a display device that displays a setting screen thereon. This display device may display a setting screen from which to set an encoding manner suitable for the quantity of a characteristic of a characteristic region. The encoding manner acquiring section 3412 may acquire an encoding manner from the user via the setting screen. For example, the encoding manner acquiring section 3412 may acquire an encoding manner by acquiring information indicating a user operation while the setting screen is displayed on the display device.

The image processing section 3604 may acquire, from the image capturing section 3102, a captured moving image including a plurality of moving image constituent images represented in RAW format. The image processing section 3604 may detect one or more characteristic region(s) from each of the plurality of moving image constituent images represented in RAW format. The image processing section 3604 may compress the plurality of moving image constituent images in RAW format included in the acquired captured moving image, as they are in RAW format. At this time, the image processing section 3604 can compress the captured moving image by the compression method explained in connection with the operation of the image processing apparatus 3120 with reference to FIG. 18 to FIG. 29.

The image processing apparatus 3170 can acquire a plurality of moving image constituent images represented in RAW format, by decompressing a compressed moving image acquired from the image processing section 3604. The image processing apparatus 3170 may perform color estimation (a coinciding process) on the plurality of moving image constituent images in RAW format obtained from the decompression, in the unit of region, i.e., in the unit of each region other than characteristic regions and in the unit of each of a plurality of characteristic regions separately. At this time, the image processing apparatus 3170 may perform color estimation (a coinciding process) on the characteristic regions with higher accuracy than that on the region other than the characteristic regions.

The image processing apparatus 3170 may apply a super-resolution process to the image of a characteristic region in the moving image constituent images resulting from the synchronization. The super-resolution process by the image processing apparatus 3170 may be a process based on principal component analysis as described in Japanese Patent Application Publication No. 2006-350498, or a process based on the motion of an object as described in Japanese Patent Application Publication No. 2004-88615.

The image processing apparatus 3170 may apply a super-resolution process separately to each object in a characteristic region. For example, when a characteristic region includes an image of a human face, the image processing apparatus 3170 may apply a super-resolution process to each facial part such as eye, nose, mouth, etc., all of which are examples of objects. In this case, the image processing apparatus 3170 stores learning data such as a model based on principal component analysis (PCA) as described in Japanese Patent Application Publication No. 2006-350498, for each facial part such as eye, nose, mouth, etc. The image processing apparatus 3170 may apply a super-resolution process separately to the image of each facial part included in the characteristic region, by using the learning data selected for that facial part.

In this way, the image processing apparatus 3170 can reconfigure the image of a characteristic region by principal component analysis (PCA). As an image reconfiguration technique and a learning technique for the image reconfiguration technique, the image processing apparatus 3170 can use, in addition to the learning and image reconfiguration by principal component analysis (PCA), locality preserving projection (LPP), linear discriminant analysis (LDA), independent component analysis (ICA), multidimensional scaling (MDS), support vector machine (support vector regression), neural network, hidden Markov model, Bayes inference, maximum a posteriori probability estimation, iterative back projection, wavelet transform, locally linear embedding (LLE), Markov random field (MRF), etc.

The learning data may include, in addition to a model as described in Japanese Patent Application Publication No. 2006-350498, low-frequency components and high-frequency components in an image of an object, which are extracted from many sample images prepared for the object that category. Here, for each of a plurality of categories of objects, low-frequency components in images of the object may be clustered by K-means method or the like, so that the low-frequency components in the images of the object of each category may be clustered into a plurality of clusters. A representative low-frequency component such as the value of the median point of the cluster may be determined for each cluster.

The image processing apparatus 3170 extracts low-frequency components from the image of an object included in a characteristic region in the moving image constituent images. The image processing apparatus 3170 specifies, from clusters of low-frequency components extracted from sample images prepared for the object of the corresponding category, any cluster, the determined representative low-frequency component of which is a value matching any of the extracted low-frequency components. The image processing apparatus 3170 specifies a cluster of high-frequency components that are associated with the low-frequency components included in the specified cluster. In this way, the image processing apparatus 3170 can specify a cluster of high-frequency components correlated with the low-frequency components extracted from the object included in the moving image constituent images.

The image processing apparatus 3170 may change the image of the object into an image with a higher image quality, by using a representative high-frequency component of the specified cluster of high-frequency components. For example, the image processing apparatus 3170 may add, to the image of each object, a high-frequency component selected for the object based on a weight corresponding to the distance from the center of the object to the position of the processing target on the face. The representative high-frequency component may be generated by closed loop learning. Since the image processing apparatus 3170 uses desired learning data selected for each object from learning data generated from learning about each object, the image processing apparatus 3170 can sometimes make the object a high-quality image with a higher accuracy. Also in the image processing system 3010 explained with reference to FIG. 18 to FIG. 29, the image processing apparatus 3170 can apply the above-described super-resolution process to the images of characteristic regions.

In the super-resolution process based on principal component analysis as described in Japanese Patent Application Publication No. 2006-350498, the image of an object is expressed by principal component vectors and weighting coefficients. The data amount of the weighting coefficients and principal component vectors is significantly smaller than the data amount of the pixel data included in the image of the object. Hence, in the process of compressing the images of characteristic regions in a plurality of moving image constituent images acquired from the image capturing section 3102, the image processing section 3604 may calculate weighting coefficients from the images of objects included in the characteristic regions. That is, the image processing section 3604 can compress the images of the objects included in the characteristic regions by expressing the images with principal component vectors and weighting coefficients. The image processing section 3604 may send the principal component vectors and weighting coefficients to the image processing apparatus 3170.

In this case, the image processing apparatus 3170 can reconfigure the images of the objects included in the characteristic regions by using the principal component vectors and weighting coefficients acquired from the image processing section 3604. Needless to say, the image processing section 3604 can compress the images of objects included in characteristic regions by using a model that expresses the objects with various characteristic parameters, instead of the model based on principal component analysis as described in Japanese Patent Application Publication No. 2006-350498.

Figure 31:
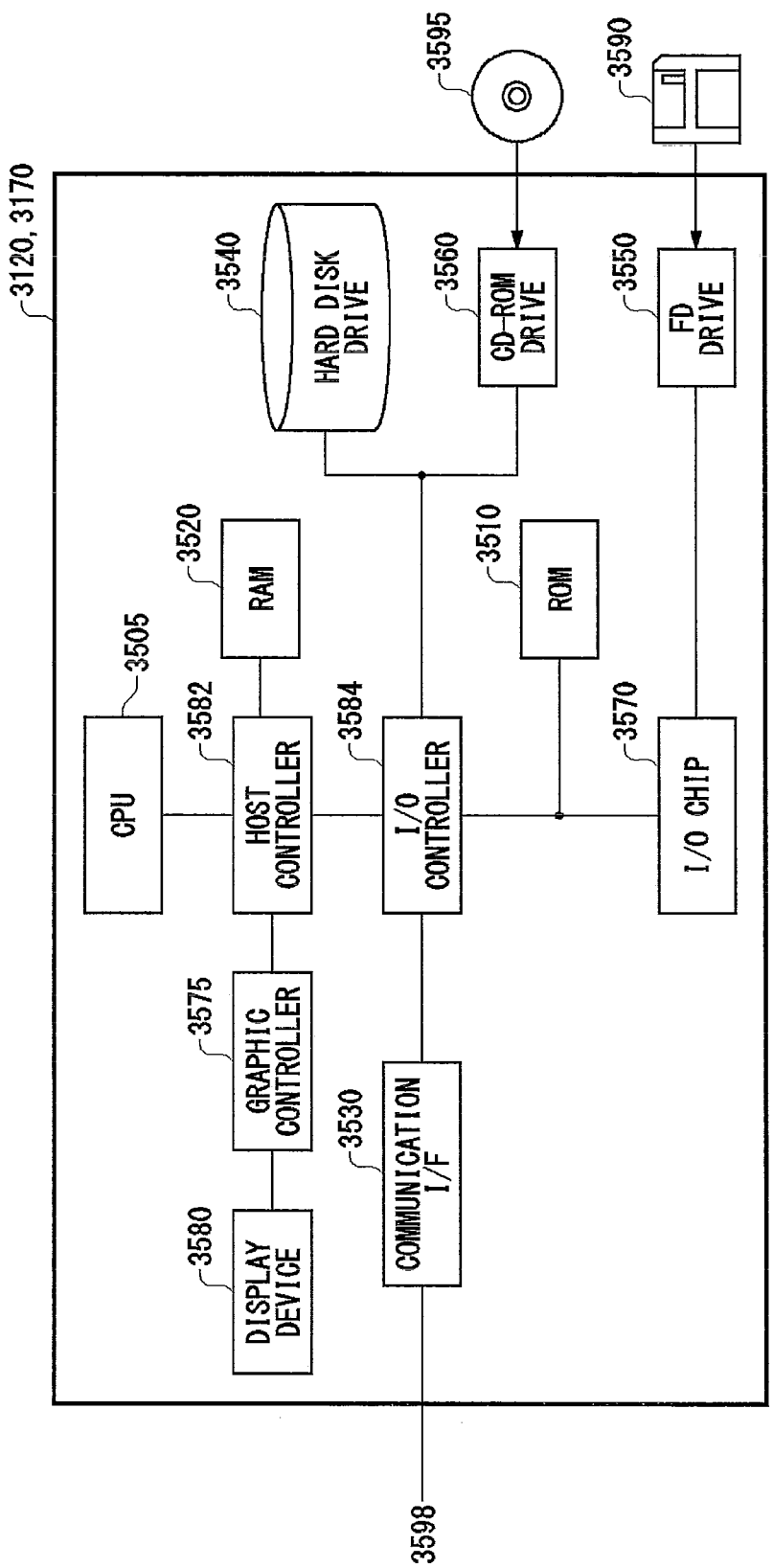
FIG. 31 shows one example hardware configuration of the image processing apparatus 3120 and the image processing apparatus 3170.

FIG. 31 shows one example hardware configuration of the image processing apparatus 3120 and the image processing apparatus 3170. The image processing apparatus 3120 and the image processing apparatus 3170 include a CPU peripheral section, an input/output section, and a legacy input/output section. The CPU peripheral section includes a CPU 3505, a RAM 3520, a graphic controller 3575, and a display device 3580, which are interconnected via a host controller 3582. The input/output section includes a communication interface 3530, a hard disk drive 3540, and a CD-ROM drive 3560, which are connected to the host controller 3582 via an input/output controller 3584. The legacy input/output section includes a ROM 3510, a flexible disk drive 3550, and an input/output chip 3570, which are connected to the input/output controller 3584.

The host controller 3582 connects the CPU 3505 and graphic controller 3575, which access the RAM 3520 at a high transfer rate, to the RAM 3520. The CPU 3505 operates based on programs stored in the ROM 3510 and the RAM 3520 to control each component. The graphic controller 3575 acquires image data generated by the CPU 3505 or the like in a frame buffer provided in the RAM 3520, and displays the image on the display device 3580. Instead, the graphic controller 3575 may include therein a frame buffer for storing image data generated by the CPU 3505 or the like.

The input/output controller 3584 connects the hard disk drive 3540, the communication interface 3530, and the CD-ROM drive 3560, which are relatively high-rate input/output devices, to the host controller 3582. The hard disk drive 3540 stores programs and data used by the CPU 3505. The communication interface 3530 connects with a network communication device 3598 to send or receive programs or data. The CD-ROM drive 3560 reads out a program or data from a CD-ROM 3595, and provides it to the hard disk drive 3540 and the communication interface 3530 via the RAM 3520.

The ROM 3510 and relatively low-rate input/output devices such as the flexible disk drive 3550 and the input/output chip 3570 are connected to the input/output controller 3584. The ROM 3510 stores a boot program executed when the image processing apparatus 3120 and the image processing apparatus 3170 are activated, or programs compliant to the hardware of the image processing apparatus 3120 and image processing apparatus 3170. The flexible disk drive 3550 reads out a program or data from a flexible disk 3590, and supplies it to the hard disk drive 3540 or the communication interface 3530 via the RAM 3520. The input/output chip 3570 is a connection interface for input/output devices of various kinds, by means of the flexible disk drive 3550, a parallel port, a serial port, a keyboard port, a mouse port, etc.

A program executed by the CPU 3505 is provided from a user in a recording medium such as the flexible disk 3590, the CD-ROM 3595, an IC card, and the like. The program stored in the recording medium may be compressed or may not be compressed. The program in the recording medium is installed onto the hard disk drive 3540, read out into the RAM 3520 and executed by the CPU 3505. The program executed by the CPU 3505 causes the image processing apparatus 3120 to function as the image processing apparatus 3120 explained with reference to FIG. 18 to FIG. 30. The program also causes the image processing apparatus 3170 to function as the image processing apparatus 3170 explained with reference to FIG. 18 to FIG. 30.

The program may be stored in an external recording medium. The recording medium may be the flexible disk 3590 or the CD-ROM 3595, or alternatively, an optical recording medium such as a DVD and a PD, a magneto-optical recording medium such as an MD, a tape medium, or a semiconductor memory such as an IC card. A memory device such as a hard disk, a RAM, or the like that is installed on a server system connected to a special-purpose communication network or the Internet may be used as a recording medium, so that the program may be provided to the image processing apparatus 3120 and the image processing apparatus 3170 via the network.

Although some aspects of the present invention have been described by way of the exemplary embodiments, it should be understood that those skilled in the art might make many changes and substitutions without departing from the spirit and the scope of the present invention which is defined only by the appended claims.

The invention claimed is:

1. An image processing apparatus, comprising:
a characteristic region detecting section that detects a plurality of characteristic regions from an image;
an encoding manner storing section that stores encoding manners in association with quantities of characteristics of objects; and
a compressing section that compresses images of the plurality of characteristic regions by different encoding manners stored in the encoding manner storing section in association with the quantities of characteristics of objects included in the plurality of characteristic regions respectively, wherein
the encoding manner storing section stores encoding manners in association with categories of objects,
the compressing section compresses the images of the plurality of characteristic regions by encoding manners stored in the encoding manner storing section in association with categories of the objects included in the plurality of characteristic regions respectively.

2. The image processing apparatus according to claim 1, wherein the characteristic region detecting section detects the plurality of characteristic regions from each of a plurality of moving image constituent images included in a moving image, which is said image, and
the compressing section compresses the images of the plurality of characteristic regions in each of the plurality of moving image constituent images, by encoding manners stored in the encoding manner storing section in association with the categories of the objects included in the plurality of characteristic regions respectively.

3. The image processing apparatus according to claim 2, wherein the encoding manner storing section stores encoding manners of either intra-encoding type or inter-encoding type in association with categories of objects, and
the compressing section compresses the images of the plurality of characteristic regions in each of the plurality of moving image constituent images by either an intra-encoding manner or an inter-encoding manner stored in the encoding manner storing section in association with the categories of the objects included in the plurality of characteristic regions respectively.

4. The image processing apparatus according to claim 3, wherein the encoding manner storing section stores encoding manners that indicate directions of intra-prediction for intra-encoding, in association with categories of objects, and the compressing section compresses the images of the plurality of characteristic regions in each of the plurality of moving image constituent images, by performing intra-prediction in directions stored in the encoding manner storing section in association with the categories of the objects included in the plurality of characteristic regions respectively.

5. The image processing apparatus according to claim 3, wherein the encoding manner storing section stores encoding manners that indicate units of motion prediction for inter-encoding, in association with categories of objects, and the compressing section compresses the images of the plurality of characteristic regions n each of the plurality of moving image constituent images, by performing motion prediction in units of motion prediction stored in the encoding manner storing section in association with the categories of the objects included in the plurality of characteristic regions respectively.

6. The image processing apparatus according to claim 3, wherein the encoding manner storing section stores sizes of partial regions to be used as encoding units for encoding moving image constituent images, in association with categories of objects, and the compressing section compresses the images of the plurality of characteristic regions in each of the plurality of moving image constituent images, by dividing the image of each object included in the characteristic region into partial regions having a size stored in the encoding manner storing section in association with the category of the object included in that characteristic region.

7. The image processing apparatus according to claim 1, wherein the encoding manner storing section further stores sizes of partial regions to be used as encoding units for encoding moving image constituent images, in association with sizes of objects, and the compressing section compresses the images of the plurality of characteristic regions in each of the plurality of moving image constituent images, by dividing the image of each object included in the characteristic region into partial regions having a size stored in the encoding manner storing section in association with a size of the object included in that characteristic region.

8. The image processing apparatus according to claim 1, further comprising an encoding manner selecting section that preferentially selects, for each of a plurality of moving image constituent images, an encoding manner that can achieve a higher compression amount balanced with image quality, from a plurality of encoding manners, as an encoding manner to be used for compressing that moving image constituent image, wherein the encoding manner storing section stores different combinations of a plurality of encoding manners, in association with categories of objects, the encoding manner selecting section preferentially selects, for each of the plurality of characteristic regions, an encoding manner that can achieve a higher compression amount balanced with image quality in the image of that characteristic region, from a plurality of encoding manners stored in the encoding manner storing section in association with the category of the object included in that characteristic region, and the compressing section compresses the images of the plurality of characteristic regions in each of a plurality of moving image constituent images, by the encoding manners selected by the encoding manner selecting section.

9. The image processing apparatus according to claim 1, further comprising an encoding manner selecting section that preferentially selects, for each of a plurality of moving image constituent images, an encoding manner that can achieve a higher compression amount balanced with image quality, from a plurality of encoding manners, as an encoding manner to be used for compressing that moving image constituent image, wherein the encoding manner storing section stores a plurality of encoding manners and an order in which the encoding manners should be selected, in association with categories of objects included in the characteristic regions, the encoding manner selecting section selects in the order, for each of the plurality of characteristic regions, an encoding manner stored in the encoding manner storing section in association with the category of the object included in that characteristic region, as an encoding manner to be used for compressing the image of that characteristic region, if the selected encoding manner can compress the image of that characteristic region to a compression amount balanced with image quality, which amount is higher than a predetermined compression rate, and the compressing section compresses the images of the plurality of characteristic regions in each moving image constituent image by the encoding manners selected by the encoding manner selecting section.

10. The image processing apparatus according to claim 1, wherein the encoding manner storing section stores encoding manners that indicate target amounts of codes, in association with categories of objects, and the compressing section compresses the images of the plurality of characteristic regions in said image, by encoding manners stored in the encoding manner storing section in association with the categories of the objects included in the plurality of characteristic regions respectively.

11. The image processing apparatus according to claim 10, wherein the encoding manner storing section stores encoding manners that indicate quantizing steps, in association with categories of objects, and the compressing section compresses the images of the plurality of characteristic regions in said image, by quantizing the images by quantizing steps stored in the encoding manner storing section in association with the categories of the objects included in the plurality of characteristic regions respectively.

12. The image processing apparatus according to claim 1, further comprising an encoding manner acquiring section that acquires an encoding manner in association with a category of an object, wherein the encoding manner storing section stores the encoding manner acquired by the encoding manner acquiring section in association with the category of the object, in association with the category of the object.

13. An image processing method, comprising:
storing encoding manners in association with quantities of characteristics of objects;
detecting a plurality of characteristic regions from an image; and
compressing images of the plurality of characteristic regions by different encoding manners stored in association with the quantities of characteristics of objects included in the plurality of characteristic regions respectively, wherein the storing encoding manners comprises storing encoding manners in association with categories of objects, the compressing images of the plurality of characteristic regions comprises compressing the images of the plurality of characteristic regions by encoding manners stored in association with categories of the objects included in the plurality of characteristic regions respectively.

14. A non-transitory computer readable medium storing therein a program for an image processing apparatus, the program causing a computer to function as:

a characteristic region detecting section that detects a plurality of characteristic regions from an image;

an encoding manner storing section that stores encoding manners in association with quantities of characteristics of objects; and a compressing section that compresses images of the plurality of characteristic regions by different encoding manners stored in the encoding manner storing section in association with the quantities of characteristics of objects included in the plurality of characteristic regions respectively, wherein the encoding manner storing section stores encoding manners in association with categories of objects, the compressing section compresses the images of the plurality of characteristic regions by encoding manners stored in the encoding manner storing section in association with categories of the objects included in the plurality of characteristic regions respectively.

* * * * *